(12) United States Patent  (10) Patent No.: US 7,440,637 B2
Schechner et al.  (45) Date of Patent: Oct. 21, 2008

(54) METHOD AND APPARATUS FOR IMAGE MOSAICING

(75) Inventors: Yoav Y. Schechner, Kiriaf-Bialik (IL); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1248 days.

(21) Appl. No.: 10/312,891

(22) PCT Filed: Jul. 23, 2001

(86) PCT No.: PCT/US01/23159

§ 371 (c)(1),
(2), (4) Date: Sep. 9, 2003

(87) PCT Pub. No.: WO02/09424

PCT Pub. Date: Jan. 31, 2002

(65) Prior Publication Data

US 2004/0056966 A1  Mar. 25, 2004

Related U.S. Application Data

(60) Provisional application No. 60/220,025, filed on Jul. 21, 2000.

(51) Int. Cl.
*G06K 9/36* (2006.01)
*G06K 9/32* (2006.01)

(52) U.S. Cl. .................................................... 382/284
(58) Field of Classification Search ................ 382/284, 382/294–299, 274, 162, 154, 254; 348/36–39, 348/42–60, 229.1; 358/540, 528, 451, 447, 358/450, 3.27; 351/206, 210
See application file for complete search history.

(56) References Cited

U.S. PATENT DOCUMENTS 6,078,701 A * 6/2000 Hsu et al. .................... 382/294
6,454,410 B1 * 9/2002 Berger et al. ................ 351/206
6,909,459 B2 * 6/2005 Watson et al. ............ 348/229.1

FOREIGN PATENT DOCUMENTS

JP  01115808  5/1989
WO  0013421  3/2000

* cited by examiner

*Primary Examiner*—Sherali Ishrat
(74) *Attorney, Agent, or Firm*—Baker Botts L.L.P.

(57) ABSTRACT

A method and apparatus is provided for capturing images using a camera or other imager having imaging sensitivity characteristics which vary across the imager's viewing angle. The imager's characteristics can be non-uniform with respect to exposure, color sensitivity, polarization sensitivity, focal distance, and/or any other aspect of image detection. The imager is rotated or translated in order to capture different portions of the scene being imaged. Because the imager is in multiple positions when the respective scene portions are captured, each scene portion is imaged by multiple portions of the imager's sensitivity profile.

14 Claims, 25 Drawing Sheets

METHOD AND APPARATUS FOR IMAGE MOSAICING

CROSS-REFERENCE TO RELATED APPLICATION

This application claims priority to U.S. Provisional Patent Application entitled "Multidimensional Image Mosaics," Serial No. 60/220,025, which was filedi on Jul. 21, 2000 and is incorporated herein by reference.

STATEMENT REGARDING FEDERALLY SPONSORED RESEARCH OR DEVELOPMENT

This invention was partially made with U.S. Government support from the National Science Foundation Research Award No. IIS-00-85864. Accordingly, the U.S. Government may have certain rights in this invention.

BACKGROUND OF THE INVENTION

1. Field of the Invention

The present invention relates generally to image mosaicing, and more particularly to methods and systems for using image mosaicing to enhance the dynamic range of images and/or to determine additional characteristics of radiation signals received from scenes.

2. Description of the Related Art

Major limitations of imaging systems (e.g., cameras) include limited field of view, limited dynamic range, limited spectral (e.g., color) resolution, and limited depth of field (i.e., limited range of distances at which scene points remain are adequately in focus in the image plane). In addition, conventional imaging systems typically measure only the intensity of incoming light as a function of the direction from which the light is received, and are unable to measure other characteristics such as depth (e.g., the distance of objects from the camera), and the polarization state of the light—which would be useful for remote recognition of materials, shapes and illumination conditions, and for the analysis of reflections. Furthermore, the quality of the measurements made by conventional cameras tends to be relatively low. For example, in typical CCD cameras, the intensity definition has only 8 bits, and the spectral definition is very poor, consisting of only three broad band channels—typically red, green, and blue channels.

Even when attempts have been made to overcome the above-described limitations, the resulting system has been complex, and has addressed only a narrow problem, while ignoring the other limitations. For example, imaging spectrometers provide high resolution in the spectral dimension, but do not extend the intensity dynamic range of the sensor.

A common way to obtain images having a large field of view without compromising spatial resolution is by using "image mosaics." Such technique involves combining smaller images, each of which covers a different view of the scene, to obtain a larger image having a wider field of view. The method has been used in various scientific fields such as radio astronomy, remote sensing by synthetic aperture radar (SAR), optical observational astronomy, and remote optical sensing of the Earth and other objects in the solar system. Recently, algorithms have been developed to cope with arbitrary camera motions, and such algorithms have enabled image mosaics to be used in video cameras. In regions where the smaller, component images overlap, the raw data can be processed to enhance its spatial resolution. However, conventional image mosaic techniques are unable to enhance resolution (e.g., dynamic range) with regard to the spectrum, polarization, and brightness of each pixel. Depth is recoverable from image mosaics if parallax is introduced into a sequence of images. However, parallax methods are usually less robust and more complex than methods which estimate depth using focus/defocus cues.

Nonlinear detectors have been used to extend the optical dynamic range of images. For example, CMOS detectors have been manufactured which: (1) yield an electronic output signal which is logarithmic with respect to light intensity, or (2) combine two images having different integration times. The intensity dynamic ranges of such sensors tend to be on the order of 1:106, which enables unsaturated detection of large (i.e., high irradiance) signals. However, the intensity information in such a device is compressed, because in order to sample (sparsely) the high intensity range, the detector uses quantization levels which would otherwise be dedicated to the lower intensities. Thus, the output still has only 8-12 bits of intensity resolution.

Nonlinear transmittance hardware which has a lower transmittance for higher light intensities can extend the dynamic range of any given detector. However, the intensity dynamic range is still quantized according to the limited definition of the detector—i.e., the 8 bits of definition in an ordinary CCD are simply nonlinearly stretched to cover a higher irradiance range. Consequently, the nonlinear compression sacrifices resolution in the lower intensity range.

Automatic gain control (AGC) is common in video and digital cameras, and is analogous to automatic exposures in still-image cameras. However, a major drawback of AGC is that its effect is global, and as a result, the gain setting is likely to be too high for some portions of the image, yet too low for other portions. For example, a bright point is likely to be saturated if it is within a relatively dark image, and a dim point is likely to be too dark for proper detection if it is within a relatively bright image. Image mosaics can be constructed from sequences in which AGC adaptively changes the sensor gain as the scene is scanned. However, although some enhancement of dynamic range has been achieved by this technique, such methods still suffer from an inability to properly measure bright points in mostly dark images, and dark points in mostly bright images.

Mounting spatially varying optical filters on a camera is a common practice in amateur and professional photography. However, such filters have primarily been used to alter raw images to produce special visual effects. Such filters have not been used in connection with resolution enhancement algorithms.

It has been proposed that the dynamic range of each pixel of an image can be enhanced by using a set of multiple, differently exposed images. One such method involves estimating, for each pixel, the value that best agrees with the data from the multiple samples of the pixel. Another approach is to select, for each pixel, the value that maximizes the local contrast. However, such approaches use a stationary camera to capture the sequence of images, and consequently, provide no enlargement of the field of view.

An additional approach uses a mosaic array of small filters which cover the detector array of the imager. Each filter covers a particular detector pixel. The result is a spatially inhomogeneous mask which modulates the light impinging on the detector. In order to extend the intensity dynamic range, the sensor array can be covered with a spatial mosaic array of neutral (i.e., color independent) density filters. However, such a configuration sacrifices spatial resolution in order to extend the dynamic range. Spectral information can be obtained by covering the detector with a mosaic array of color filters. However, such a configuration sacrifices spatial resolution in order to obtain some spectral resolution (i.e., color information). In addition, a detector can be covered with a mosaic of linear polarizers oriented in various different directions. However, such a configuration sacrifices spatial resolution for the polarization information.

High resolution spectral filtering has been obtained by covering a detector array with a spatially varying spectral filter—i.e., a filter having a spectral passband which changes across the vertical and/or horizontal viewing angle of the detector. In such a system, different points in the field of view are filtered differently. The spectrum at each point is obtained by scanning the camera's field of view across the scene. However, placing the filter directly on the detector array reduces the flexibility of the system by making it difficult to change the effective characteristics of the spectral filtering or to measure other properties of the light received from the scene.

If the scene is scanned line by line with a linear scanner, spatial resolution is not sacrificed to obtain spectral information. For example, in trilinear scanners, each linear portion of the image is sensed consecutively with red, green, and blue filters. Pushbroom cameras, which are often used in remote sensing work, operate similarly; each scene line is diffracted by a dispersive element onto a 2D detector array, and as a result, each line is simultaneously measured in multiple spectral channels. However such scanners and pushbrooms are limited to one-dimensional (1-D) scanning at constant speed. Furthermore, an image formed by such a system is not foveated; the entire image is scanned using the same detector characteristics. Accordingly, to capture a significant field of view, numerous acquisitions need to be taken, because each acquisition captures only a 1-pixel wide column.

Images have been captured with different focus settings, and then combined to generate an image with a large depth of field. An approach using a tilted sensor has succeeded in capturing all scene points in focus while extending the field of view. However, this approach does not enhance the dynamic range of the image.

It is common practice in optics to revolve spatially varying choppers and reticles in front of, or within, an imaging system. However, such systems require the imager to have additional internal or external parts which move during image acquisition.

SUMMARY OF THE INVENTION

It is therefore an object of the present invention to provide an imaging technique which provides both an enlarged field of view and enhanced brightness dynamic range.

It is a further object of the present invention to provide an imaging technique which provides both an enlarged field of view and spectral, polarization, and/or depth information about a scene.

These and other objects are accomplished by the following aspects of the present invention.

In accordance with one aspect of the present invention, a method for generating enhanced-resolution data comprises: A method for imaging, comprising: a first step of using an imager to perform a first set of measurements for generating a first image value, the first set of measurements including at least one measurement of an intensity of a first radiation ray bundle from a first scene region, the first radiation ray bundle having a first chief ray in a reference frame of the imager, the imager having a first intensity sensitivity characteristic with respect to radiation ray bundles having the first chief ray, and the imager having a first dynamic range with respect to intensities of the radiation ray bundles having the first chief ray; a second step of using the imager to perform a set of second measurements for generating a second image value, the second set of measurements comprising at least one measurement of an intensity of a second radiation ray bundle emanating from the first scene region, the second radiation ray bundle having a second chief ray in the reference frame of the imager, the second chief ray being different from the first chief ray, the imager having a second intensity sensitivity characteristic with respect to radiation ray bundles having the second chief ray, the second intensity sensitivity characteristic being different from the first intensity sensitivity characteristic, and the imager having a second dynamic range with respect to intensities of the radiation ray bundles having the second chief ray; and applying a mosaicing operation to the first and second image values, for generating a third image value having associated therewith a third dynamic range of the imager with respect to at least one of the intensities of the first and second radiation ray bundles, the third dynamic range being greater than at least one of the first and second dynamic ranges of the imager.

In accordance with an additional aspect of the present invention a method for imaging, comprising: a first step of using an imager to perform a first set of measurements for generating a first image value, the first set of measurements comprising at least one measurement of an intensity of at least one selected polarization component of a first radiation ray bundle emanating from a first scene region, the first radiation ray bundle having a first chief ray in a reference frame of the imager, the imager having a first polarization sensitivity characteristic with respect to radiation ray bundles having the first chief ray, and the first polarization sensitivity characteristic comprising reduced sensitivity to signal components having polarization angles outside a first angular range, the at least one selected polarization component of the first radiation ray bundle having a polarization angle within the first angular range; a second step of using the imager to perform a second set of measurements for generating a second image value, the second set of measurements comprising at least one measurement of an intensity of at least one selected polarization component of a second radiation ray bundle emanating from the first scene region, the second radiation ray bundle having a second chief ray in the reference frame of the imager, the second chief ray being different from the first chief ray, the imager having a second polarization sensitivity characteristic with respect to radiation ray bundles having the second chief ray, the second polarization sensitivity characteristic comprising reduced sensitivity to signal components having polarization angles outside a second angular range, the at least one selected polarization component of the second radiation ray bundle having a polarization angle within the second angular range, and the second angular range being different from the first angular range; a third step of moving the imager, comprising one of: rotating the imager with respect to the first scene region between the first and second steps; and translating the imager with respect to the first scene region between the first and second steps; and using the first and second image values to determine a polarization state of one of the first and second radiation ray bundles.

BRIEF DESCRIPTION OF THE DRAWINGS

Further objects, features, and advantages of the present invention will become apparent from the following detailed description taken in conjunction with the accompanying figures showing illustrative embodiments of the present invention, in which.

Figure 1:
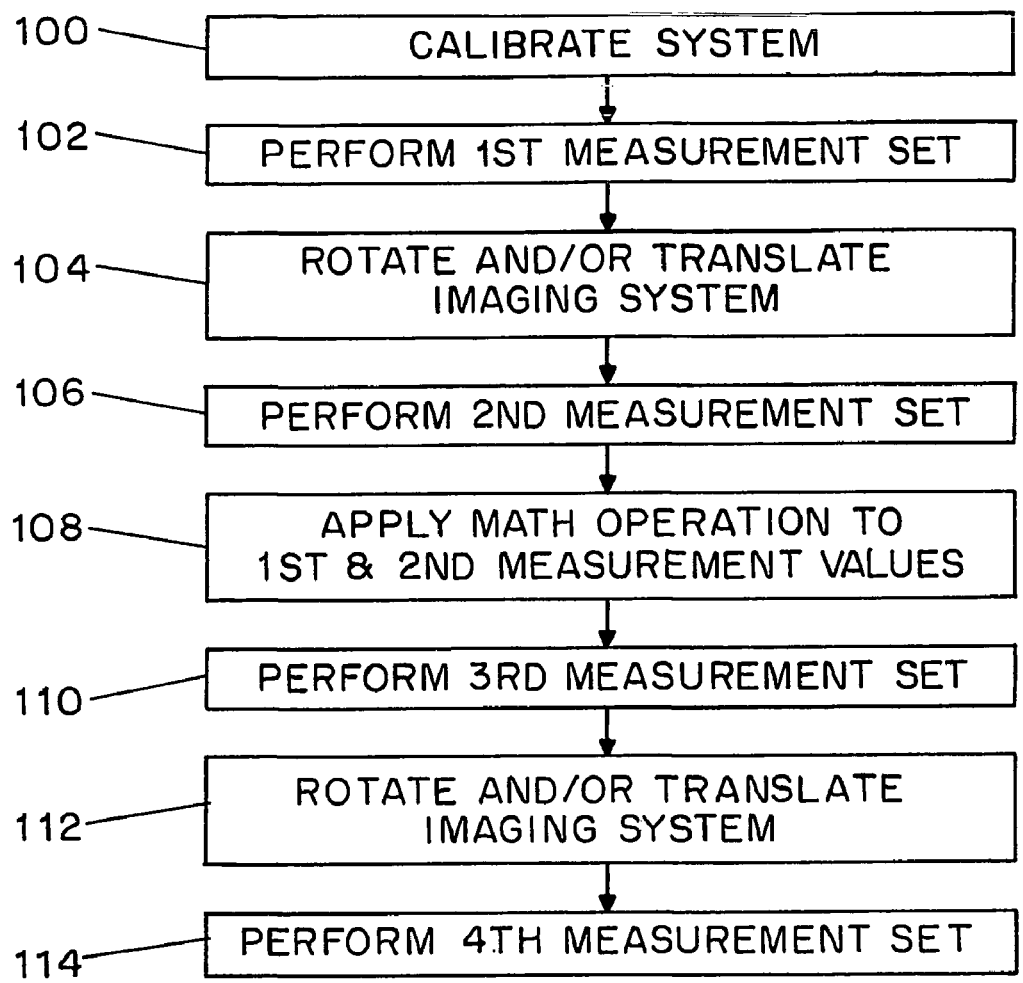
FIG. 1 is a flow diagram illustrating an exemplary procedure for image mosaicing in accordance with the present invention.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrated embodiments, changes and modifications can be made to the described embodiments without departing from the true scope and spirit of the subject invention as defined by the appended claims.

DETAILED DESCRIPTION OF THE INVENTION

In accordance with the present invention, an imager—which can include an electronic still-image camera or a moving-image camera such as a video camera—can be configured such that one or more of the imager's detection characteristics varies across the vertical and/or horizontal viewing angle. For example, the left side of the field of view of the imager can be configured to have characteristics which differ from those of the right side of the field of view, or the top portion of the field of view can be configured to have characteristics which differ from those of the bottom portion of the field of view. The non-uniform (i.e., spatially varying) sensitivity characteristics of the imager can include, for example, sensitivity to scene brightness, sensitivity to light having a particular color, sensitivity to light having a particular polarization angle, and/or focal distance (i.e., the distance at which objects are in focus). By rotating an/or translating the imager between successive snapshots or frames, the successive snapshots or frames can be combined to form a larger image having a wider field of view. Such combining of different views of a scene can be referred to as "image mosaicing." In addition, if the motion of the camera between snapshots or frames is sufficiently small, some regions of the scene are captured multiple times, each time through a different portion of the field of view of the camera. Because each portion of the imager's field of view has a different sensitivity characteristic, the resulting "multisampled" scene portions (i.e., portions sampled multiple times) are captured using a variety of imaging sensitivity characteristics. Therefore, additional information can be obtained about each portion of the scene. For example, a scene portion can be sampled multiple times using a wide range of intensity sensitivity characteristics—e.g., by capturing multiple frames while panning vertically or horizontally (or at any angle) across the scene with a camera having a spatially non-uniform attenuator mounted on the lens. Each portion of the scene is thus effectively captured with an enhanced dynamic range. In addition, spectral information about each scene portion can be obtained by panning across a scene while taking multiple snapshots using an imager having spatially non-uniform color sensitivity characteristics. Similarly, polarization information can be obtained by using an imager having non-uniform polarization sensitivity characteristics (e.g., a camera with a non-uniform polarizing filter), and depth (i.e., distance) information can be obtained using an imager having a non-uniform focal distance.

Figure 5:
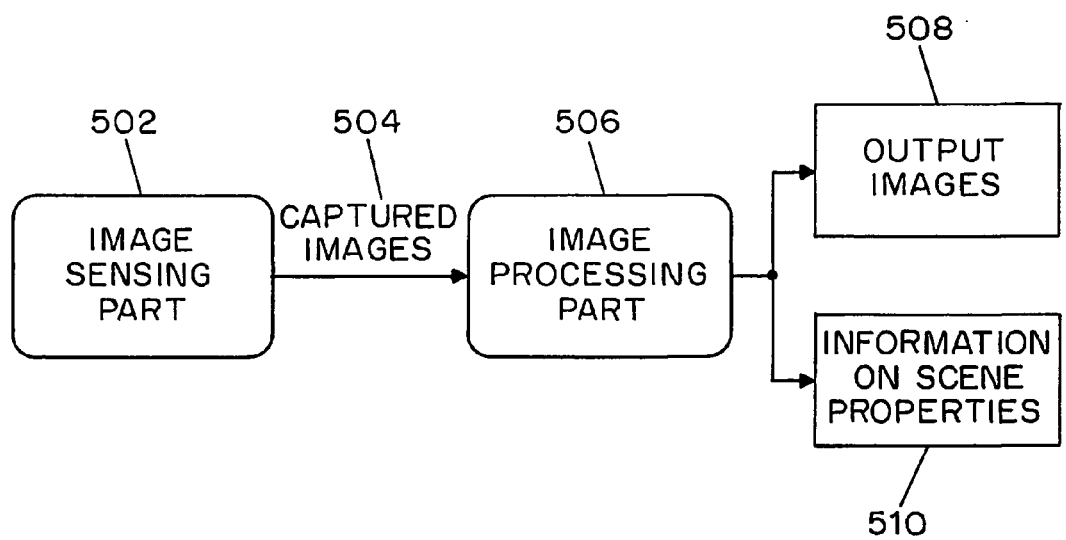
FIG. 5 is a block diagram illustrating an exemplary image mosaicing technique in accordance with the present invention.
Figure 6:
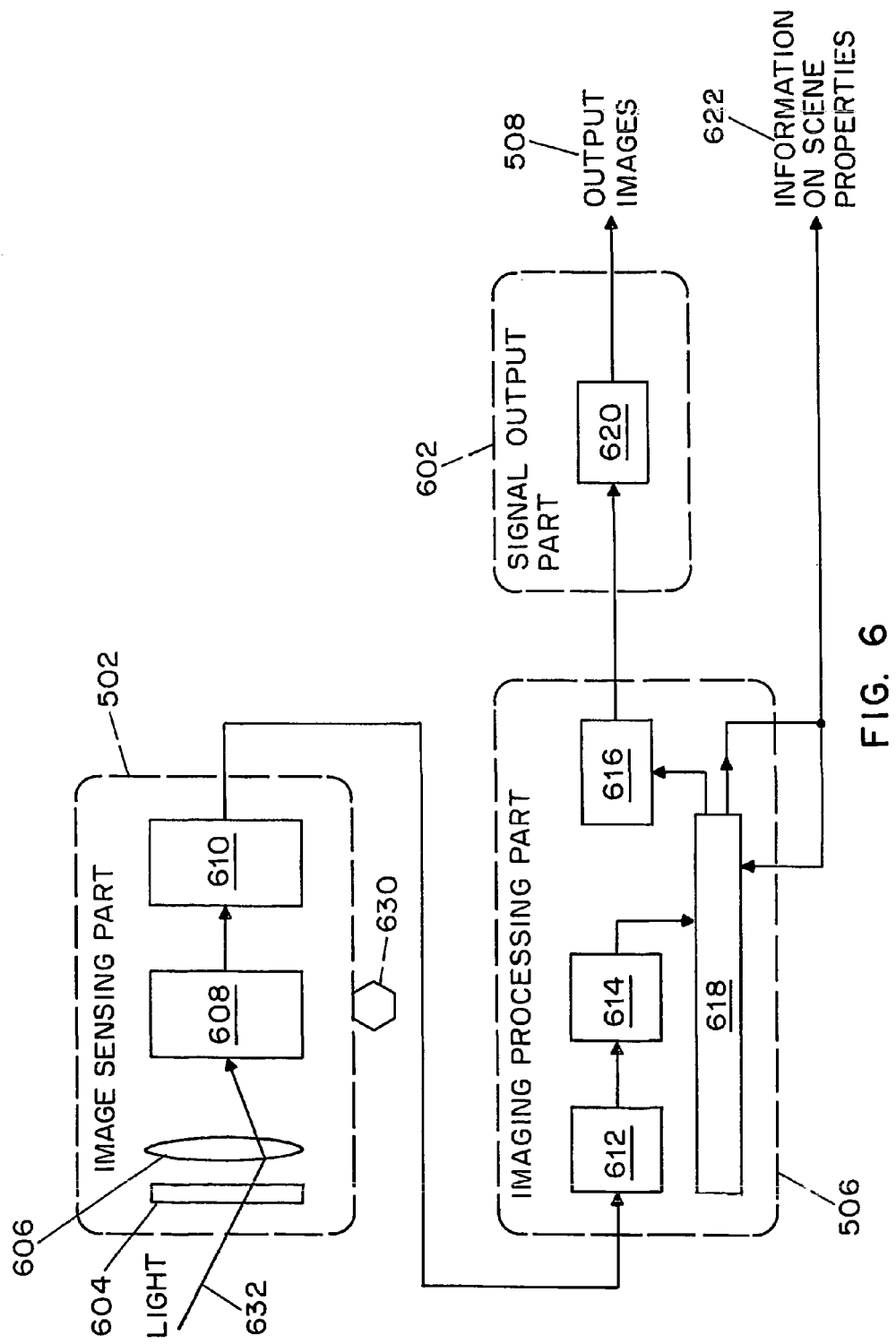
FIG. 6 is a block diagram illustrating an exemplary image mosaicing system in accordance with the present invention.

A system in accordance with the present invention can be viewed generally as having two parts, as illustrated in the block diagram of FIG. 5. The system includes a hardware part which comprises an imager (e.g., a camera) 502 which is used to capture images 504. The images 504 are processed by an image processing part executing software comprising one or more image processing algorithms 506, which provide enhanced output images 508 and/or information 510 regarding the properties of the scene being imaged. FIG. 6 illustrates such a system in further detail. The imager 502 comprises one or more filters 604 which filter light signals (e.g., light bundles) 632 entering the imager 502. The imager 502 includes imaging optics 606 and a detector array 608, such as a CCD or a CMOS image sensing array. The detector array 608 generates signals which can be processed by circuits 610. In order to rotate and/or translate the imager 502, the imager 502 can be mounted on a motorized rotation and/or translation support 630 and/or can be carried by a moving platform such as an airplane.

Analog signals generated by the camera circuitry 610 are processed by an analog-to-digital converter 612 which converts the analog signals into digital signals which can be stored in a frame memory 614. The images are analyzed and processed using a processor 618 which can be the processor of computer. The processor 618 executes the various algorithms in accordance with the present invention. The processor 618 can also be used to "render" (i.e., generate) new images of the scene. A converter 616 can be used to convert images into a format which can be processed by an external device 602 to generate output images 508. The external device 602 can include, for example, a converter 620 for converting the images into a video signal, a printer signal, or other output format. The processor 618 can also extract information 622 regarding the properties of the scene being imaged. Examples of the aforementioned techniques are described in further detail below.

Figure 8:
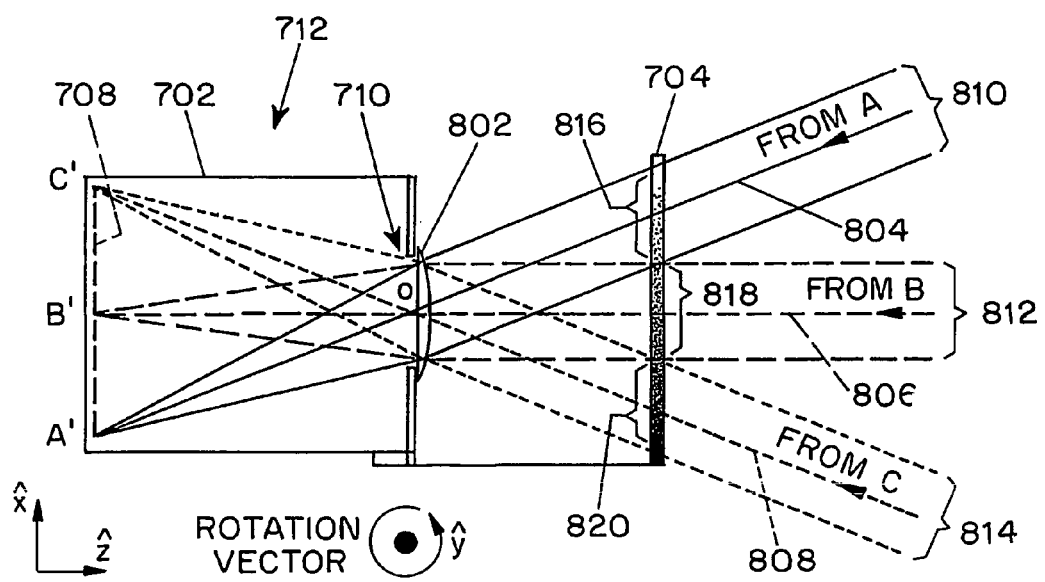
FIG. 8 is a diagram illustrating yet another system for image mosaicing in accordance with the present invention.

FIG. 8 illustrates an example of an imager for performing image mosaicing in accordance with the present invention. The imager 712 includes a camera 702 having an aperture 710, an objective lens 802, and an image detector 708 which can be, for example, a CCD detector array. Also included is a spatially varying, neutral (i.e., wavelength-independent) density filter 704 which, in the illustrated example, has lower attenuation near its top portion 816, and greater attenuation near its bottom portion 820. The imager 712 receives radiation ray bundles 810, 812, and 814 (in this example, bundles of light) from scene points A, B and C, respectively. In the reference frame of the imager 712, there are a number of chief rays—e.g., rays 804, 806 and 808—which define the respective directions from which radiation ray bundles 810, 812 and 814 or other sets of radiation signals are received by the imager 712. As is well known in optics, a bundle of light is also typically considered to have a chief ray which can be used to define the path along which the bundle propagates. In the illustrated example, the chief rays of bundles 810, 812, and 814, respectively, are the chief rays 804, 806 and 808 of the imager 712. Furthermore, although only three chief rays 804, 806 and 808 are illustrated in FIG. 8, an imager will in theory have an infinite number of chief rays in its reference frame. In addition, although the exemplary imager 712 illustrated in FIG. 8 is used primarily to image light, the techniques of the invention are applicable to the imaging of any electromagnetic radiation or any other radiation, including, but not limited to, infra-red (IR) radiation, X-ray radiation, synthetic aperture radar (SAR) signals, particle beams (e.g., electron beams for electron microscopy), and acoustic (e.g., ultrasound) radiation.

Figure 7:
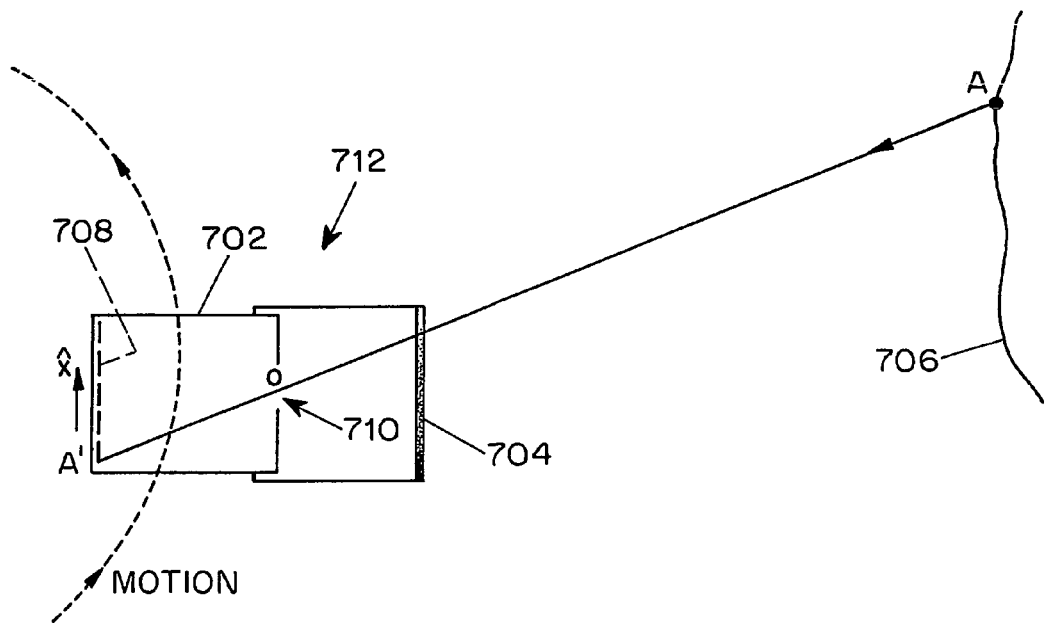
FIG. 7 is a diagram illustrating an additional exemplary system for image mosaicing in accordance with the present invention.

The signal sets 810, 812, and 814 which respectively comprise signals emanating from points A, B, and C of the scene are focused by the objective lens 802 onto points A', B', and C', respectively, on the detector 708. The imager 712 can be rotated about a rotation vector ŷ to thereby enable the imager 712 to receive any one of the radiation ray bundles 810, 812, and 814 along any one of the chief rays 804, 806, and 808, or along any other chief ray in the field of view of the imager 712. For example, a first snapshot can be taken with the imager 712 oriented as illustrated in FIG. 8, in which case signal set 810 is received along chief ray 804 as illustrated. The imager 712 can then be rotated in a counterclockwise direction such that ray bundle 810 is received along chief ray 806. An additional snapshot can then be taken. The imager 712 can then be further rotated such that signal set 810 is being received along chief ray 808, and a third snapshot can be taken. Accordingly, in the respective three snapshots, ray bundle 810 has been received through three portions 816, 818 and 820 of the filter 704, and accordingly, has been received at three points A', B', and C' of the detector 708. Furthermore, it is to be noted that although FIG. 8 illustrates an imager 712 which is rotated in order to pan across a scene, the imager 712 can in addition, or alternatively, be translated as illustrated in FIG. 7. In fact, any arbitrary motion can be used to pan the imager 712 across a scene 706, thereby enabling the imager 712 to receive radiation signals from a scene point A along any chief ray of the field of view of the imager 712. Once the multiple snapshots of the scene 706 have been taken, the snapshots can be used for an image mosaicing procedure in accordance with the invention. For example, as discussed in further detail below with reference to FIG. 1, an image mosaicing procedure can be used to enhance the dynamic range of images representing the intensities of light signal sets received from various regions of a scene 706.

FIG. 1 illustrates an exemplary procedure for image mosaicing in accordance with the present invention. The procedure preferably includes a calibration step 100, examples of which are discussed in further detail below. An imager (e.g., a camera with a spatially varying attenuating filter)—item 712 in FIGS. 7-19, 23, and 31—is used to perform a first set or measurements of a scene being imaged (step 102). In the reference frame of the imager 712, there is a first chief ray (e.g., chief ray 804 illustrated in FIGS. 8-18), and for signals received along the first chief ray—e.g., light bundles having the first chief ray—the imager 712 has a first intensity sensitivity characteristic and a first dynamic range imaging system has a first intensity sensitivity characteristic and a first dynamic range. For example, the first chief ray can correspond to a particular viewing direction within the field of view of the imager 712, and this portion of the field of view can be covered by an attenuating filter having a first amount of attenuation. The sensitivity of the imager with respect to a light bundle passing through a particular portion of the attenuating filter depends on the amount of attenuation of that particular portion of the filter. The dynamic range of the imager with respect to the light bundle is typically determined by the dynamic range of the portion of the detector (e.g., the CCD cell) onto which the bundle is focused.

The output of the first measurement set is a first measurement value which can represent, for example, the intensity (i.e., the brightness) of a first light ray bundle or other radiation emanating from a first region or point within the scene. The first light ray bundle has a chief ray which corresponds, or is identical, to the first chief ray of the imager.

The imager 712 is moved (e.g., by rotation and/or translation) so that a different portion of the scene is captured (step 104). The second portion of the scene overlaps the first portion such that the first scene point or scene region is still within the field of view of the imager 712, but a light ray bundle from the first scene region is now being received along a second chief ray (e.g., chief ray 806 illustrated in FIGS. 8-18) in the reference frame of the imager 712. A second measurement set is performed by the imager (step 106), thereby generating a second measurement value. The second measurement value represents the intensity of a second light ray bundle from the first scene region. The imager 712 has a second intensity sensitivity characteristic with respect to radiation signal sets received along the second chief ray. For example, if the second chief ray passes through attenuator having a second amount of attenuation which is different from the first amount of attenuation, the sensitivity of the imager 712 with respect to the second light ray bundle is different from the sensitivity of the imager 712 with respect to the first light ray bundle.

A third measurement value is generated by applying a mathematical operation to the first and second measurement values (step 108). For example, if the imager 712 includes a CCD detector array 708 which is used to capture images, a first cell, or group of cells, of the CCD array 708 are used to measure the first light ray bundle, thereby generating the first measurement value, and a second cell, or group of cells, of the CCD array 708 are used to measure the second light ray bundle, thereby generating the second measurement value. Depending upon the characteristics of the imager 712 with respect to signals received along the first and second chief rays, the signal received by either the first or the second cell may be too bright or too dim, thereby causing the signal to be outside the accurate range of the cell. If the first measurement value indicates that the first light ray bundle has been measured accurately, but the second measurement value indicates that the second light ray bundle has been measured less accurately, the second measurement value can be discarded and the first measurement can be used as the third measurement value which will serve as the output value for the pixel representing the first scene region. If the characteristics of the region of the imager 712 impinged by the first chief ray are different from those of the region impinged by the second chief ray—e.g., if light received along the first chief ray are more highly attenuated than light received along the second chief ray—then the dynamic range of the imager 712 is effectively enhanced, because high intensity light will be measured accurately when received along the first chief ray, and low intensity light will be measured accurately when received along the second chief ray. Because light emanating from the first scene region is capered along both chief rays, the light is more likely to be measured accurately by at least one of the two regions of the detector. Accordingly, the third measurement value can be viewed as having a third effective dynamic range which is greater than one or both of the respective effective dynamic ranges of the first and second measurement values.

In addition to the above-described steps for effectively enhancing the dynamic range of intensity measurements, the exemplary image mosaicing procedure illustrated in FIG. 1 can also include steps for measuring additional characteristics of light ray bundles received from the first scene region. Such additional characteristics can include, for example, spectral characteristics, polarization, and/or focal characteristics—which can be used to infer distances from the camera to various scene features. For example, a third measurement set can be performed to measure the intensity of at least one spectral component of a third light ray bundle from the first scene region (step 110). The third measurement set generates a fourth measurement value. The third light ray bundle can be received along a third chief ray of the imager 712 which is configured to have a first spectral sensitivity characteristic with respect to light ray bundles having the third chief ray. The first spectral sensitivity characteristic preferably comprises a bandpass characteristic having a first wavelength sensitivity band in order to select the spectral component of the third light ray bundle. In other words, the selected spectral component has a wavelength or wavelengths which are within the first wavelength sensitivity band. The selected spectral component may or may not have sufficient energy to generate a signal above the detector noise.

The camera is then rotated or translated (step 112), and a fourth measurement set is performed (step 114). The fourth measurement set, which generates a fifth measurement value, includes at least one measurement of the intensity of a spectral component of a fourth light ray bundle from the first scene region. The fourth light ray bundle is received along a fourth chief ray of the imager 712. The imager 712 has a second spectral sensitivity characteristic with respect to radiation signals having the fourth chief ray. The second spectral sensitivity characteristic preferably comprises a bandpass characteristic including a second wavelength sensitivity band in order to select components having wavelengths within the second wavelength sensitivity band.

In addition, an image mosaicing procedure in accordance with the present invention can be used to measure the polarization of light emanating from the first scene region. In such a system, the third measurement set (step 110) comprises at least one measurement of an intensity of a selected polarization component of a third light ray bundle. The third light ray bundle, which has the above-described third chief ray, comprises a third radiation signal from the first scene region. The imager 712 has a first polarization sensitivity characteristic with respect to radiation ray bundles received along the third chief ray. The first polarization sensitivity characteristic comprises a reduced sensitivity to light rays having polarization angles which are outside a first angular range. The selected polarization component of the third light ray bundle is detected because it has a polarization angle within the first angular range. The imager 712 is then rotated or translated (step 112), and is then used to perform a fourth measurement set, thereby generating a fifth measurement value (step 114). The fourth measurement set comprises at least one measurement of an intensity of a selected polarization component of a fourth light ray bundle from the first scene region. The fourth light ray bundle is received along the fourth chief ray of the imager 712. The imager 712 has a second polarization sensitivity characteristic with respect to radiation ray bundles received along the fourth chief ray. The second polarization sensitivity characteristic comprises reduced sensitivity to signal components having polarization angles outside a second angular range. The selected polarization component of the fourth light ray bundle is detected by the imager 712 because the component has a polarization angle within the second angular range.

Furthermore, it is possible to determine how far the first scene region is from the imager 712 by using an imager having non-uniform focal characteristics. In particular, the imager 712 can be configured to have a first focal characteristic with respect to light received along a third chief ray, and a second focal characteristic with respect to light received along a fourth chief ray. A third measurement set can be performed to generate a fourth measurement value, the third measurement set comprising at least one measurement of an intensity of the third light ray bundle from the first scene region (step 110). The third radiation ray bundle is received along the third chief ray. The first focal characteristic of the camera comprises a first focal distance at which objects are in focus. The imager 712 is rotated or translated (step 112), and a fourth measurement set is performed to generate a fifth measurement value (step 114). The fourth measurement set comprises at least one measurement of an intensity of a fourth light ray bundle from the first scene region. The fourth signal set is received along the fourth chief ray. The second focal characteristic of the camera comprises a second focal distance at which objects are in focus if imaged along the fourth chief ray. The second focal distance is different from the first focal distance.

Figure 2:
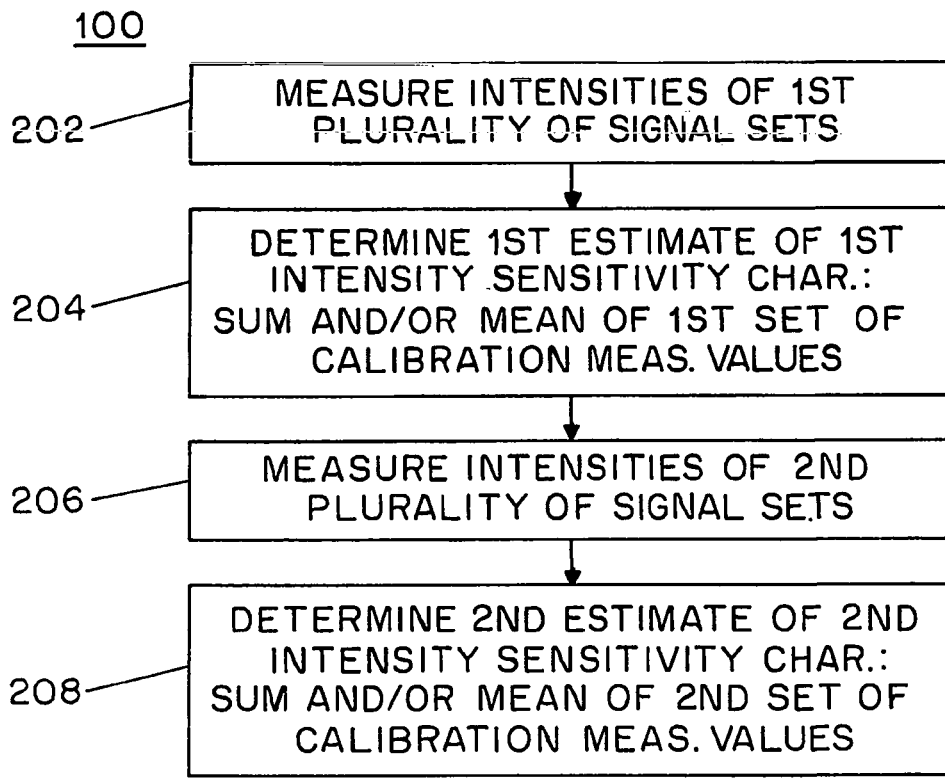
FIG. 2 is a flow diagram illustrating an exemplary calibration procedure in accordance with the present invention.

For image mosaicing using an imager having non-uniform intensity sensitivity characteristics, it can be beneficial to calibrate the imager by obtaining an estimate of how the intensity sensitivity characteristics of the camera vary across the field of view. One technique for performing such a calibration is to capture a variety of different scenes and scene portions with the imager, and then add or average the measurements generated by each portion of the detector—e.g., each detector cell. The result is a set of relative and/or scaled values representing the imager characteristics along various chief rays. FIG. 2 illustrates an example of such a calibration procedure 100 which can be used in the procedure illustrated in FIG. 1. Similarly to the other steps of the procedure illustrated in FIG. 1, the sequence of steps 100 illustrated in FIG. 2 is performed using an imager receiving first and second chief rays in the reference frame of the imager 712. The imager 712 is used to perform measurements of intensities of a first plurality of radiation ray bundles (e.g., light ray bundles) having the first chief ray, to thereby generate a first set of calibration measurement values (step 202). The first set of calibration measurement values is used to determine a first estimate of the first intensity sensitivity characteristic of the imager 712 with respect to signals received along the first chief ray (step 204). The first estimate is determined by calculating a sum and/or a mean of the first set of calibration measurement values. The imager 712 is also used to perform measurements of intensities of a second plurality of radiation ray bundles having the second chief ray, to thereby generate a second set of calibration measurement values (step 206). The second set of calibration measurement values is used to determine a second estimate of the second intensity sensitivity characteristic of the imager 712 with respect to signals received along the second chief ray (step 208). The second estimate is determined by calculating a sum and/or a mean of the second set of calibration measurement values.

Figure 3:
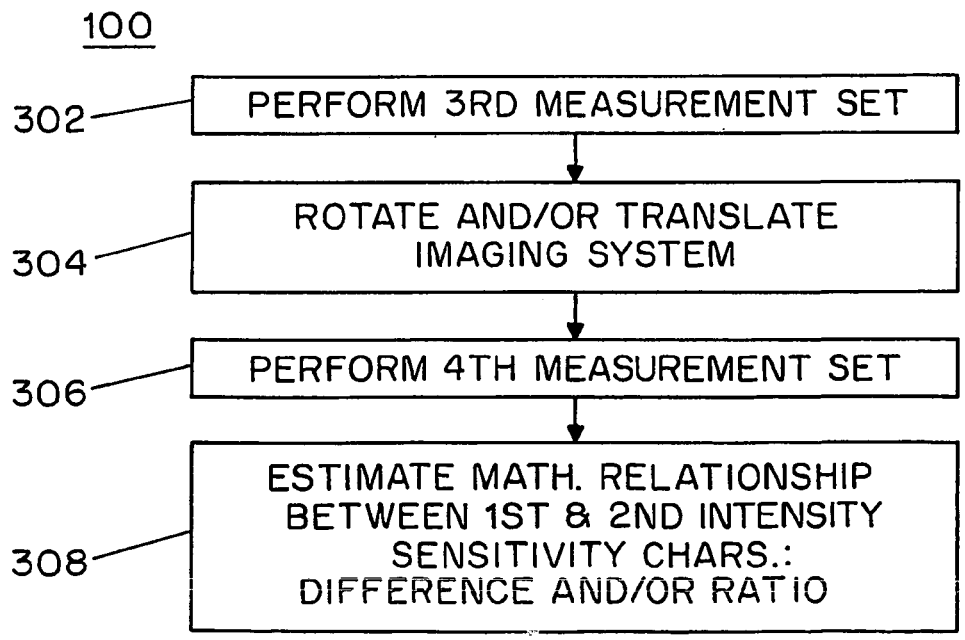
FIG. 3 is a flow diagram illustrating an additional exemplary calibration procedure in accordance with the present invention.

In addition, the intensity sensitivity characteristic of the imager can be calibrated by tracking a scene region as it travels across the field of view of the imager. For example, FIG. 3 illustrates a calibration procedure 300 which uses measurements of radiation ray bundles (e.g., light ray bundles) received from a selected portion of a scene along multiple chief rays received by the imager. The calibration procedure 100 illustrated in FIG. 3 can be used in the image mosaicing procedure illustrated in FIG. 3. In the illustrated calibration procedure 300, the imager 712 is used to perform a third measurement set, thereby generating a fourth measurement value (step 302). The third measurement set comprises at least one measurement of an intensity of a third light ray bundle from a second scene region. The third light ray bundle is received along the first chief ray received by the imager. The imager is then rotated or translated to enable the imager to receive light rays from the second scene region along the second chief ray of the imager (step 304). A fourth measurement set is performed by the imager, thereby generating a fifth measurement value (step 306). The fourth measurement set comprises at least one measurement of an intensity of a fourth light ray bundle from the second scene region. The fourth light ray bundle is received along the second chief ray received by the imager. The fourth and fifth measurement values are used to estimate a mathematical relationship between the first intensity sensitivity characteristic of the imager 712 (i.e., the imager's sensitivity with respect to light ray bundle having the first chief ray) and the second intensity sensitivity characteristic of the imager (i.e., the imager's sensitivity with respect to light rays received along the second chief ray) (step 308). The mathematical relationship is estimated by calculating either a difference of the fourth and fifth measurement values or a ratio of the fourth and fifth measurement values.

The above-described calibration procedure can be understood in further detail as follows. Consider a neutral density mask M(x) which changes transmissivity only along the x axis. A scene point is represented in image k as image point $x_k$; the linearized intensity of image point $x_k$ is $\hat{g}_k$. The same scene point is represented in image p as image point $x_p$; the intensity of image point $x_p$ is $\hat{g}_p$. Both points should obey the following relationship:

$$M(x_k)\hat{g}_p - M(x_p)\hat{g}_k = 0. \tag{1}$$

Tracking some of the scene points in several images can provide many equations which the mask should obey at each image pixel x. The equations can be expressed in matrix form as FM=0. An example of matrix F is:

$$F = \begin{bmatrix} 0 & 0 & g_{p=1}^{x=50} & 0 & \ldots & \ldots & \ldots & 0 & g_{p=2}^{x=3} & 0 & \ldots & \ldots & 0 & 0 & 0 \\ 0 & \ldots & 0 & \ldots & 0 & g_{p=1}^{x=87} & 0 & \ldots & \ldots & \ldots & 0 & g_{p=2}^{x=40} & 0 & \ldots & 0 \\ \vdots & & & & & & & & & & & & & & \vdots \\ g_{p=15}^{x=144} & 0 & \ldots & \ldots & & & & & & & & \ldots & 0 & g_{p=18}^{x=1} & 0 \end{bmatrix} \tag{2}$$

The frame number is indexed by p. Some points may not have reliable data, and therefore, it can be beneficial to impose additional equations of smoothness in order to regularize the solution. For example, the equations for penalizing $|\nabla^2 M|^2$ can be formalized as seeking LM=0, where:

$$L = \begin{bmatrix} 1 & -2 & 1 & 0 & \ldots & \ldots & \ldots & \ldots & \ldots & \ldots & 0 \\ 0 & 1 & -2 & 1 & 0 & \ldots & \ldots & \ldots & \ldots & \ldots & 0 \\ 0 & 0 & 1 & -2 & 1 & 0 & \ldots & \ldots & \ldots & \ldots & 0 \\ \vdots & & & & & & & & & & \vdots \\ 0 & \ldots & \ldots & \ldots & \ldots & \ldots & \ldots & 0 & 1 & -2 & 1 \end{bmatrix}, \tag{3}$$

Generally the above equations will contradict each other, and accordingly, the algorithm seeks an optimal solution using a least squares method, a robust statistics method, or another method for optimization. For the least squares method, the optimal solution is:

$$\hat{M} = \arg\min_M (M'A'AM), \tag{4}$$

where $$A = \begin{bmatrix} F \\ \beta L \end{bmatrix}, \tag{5}$$

and β is a parameter weighting the penalty for non-smooth solutions relative to the penalty for disagreement with the data.

The nontrivial solution is found using singular value decomposition (SVD), and then max $\hat{M}$ (i.e., the maximum of $\hat{M}$) is set equal to 1. The covariance matrix of M is estimated from the above equations:

$$Cov(M) = (A'A)^{-1}\hat{M}'A'A\hat{M}(n_r*+1-l)^{-1} \tag{6}$$

where l is the number of elements of M, and $n_r$ is the number of rows in A. This can be viewed as a weighted least squares problem: rows that belong to L are weighted by β, while the rows that belong to F are generally more accurate for more intense pixels (i.e., larger g). This is equivalent to using normalized rows, and then weighting each row r by $\sqrt{\Sigma_c A^2(r,c)}$. Accordingly, the algorithm uses $n_r = \Sigma_{r,c} A^2(r, c)$ thereby adding the squared weights of each row.

The variance of M given by the diagonal of Cov(M) leads to the confidence intervals of $\hat{M}$. Note that this formulation is not in the log M domain. Thus, it does not penalize strongly relative disagreements among the data at very low M, or fluctuations which may be relatively significant at low M. As a final post-processing step, smoothing of log $\hat{M}$ is also performed, which primarily affects the estimation of areas having strong light attenuation.

It is to be noted that the self calibration of the mask can, in fact, be based on the same image sequence which will ultimately be processed to obtain an mage representing the scene, in which case the estimate of the mask at a point x is not statistically independent of the measured signal at point x in a specific frame. However, it is to be noted that the estimation of M at each point is affected by hundreds, or even tens of thousands of equations (rows of A), based on tracking numerous points in several frames. Therefore, when registering and fusing the images, it is valid to assume that the signal at each specific sample is, for practical purposes, independent of the estimated mask.

Figure 36A:
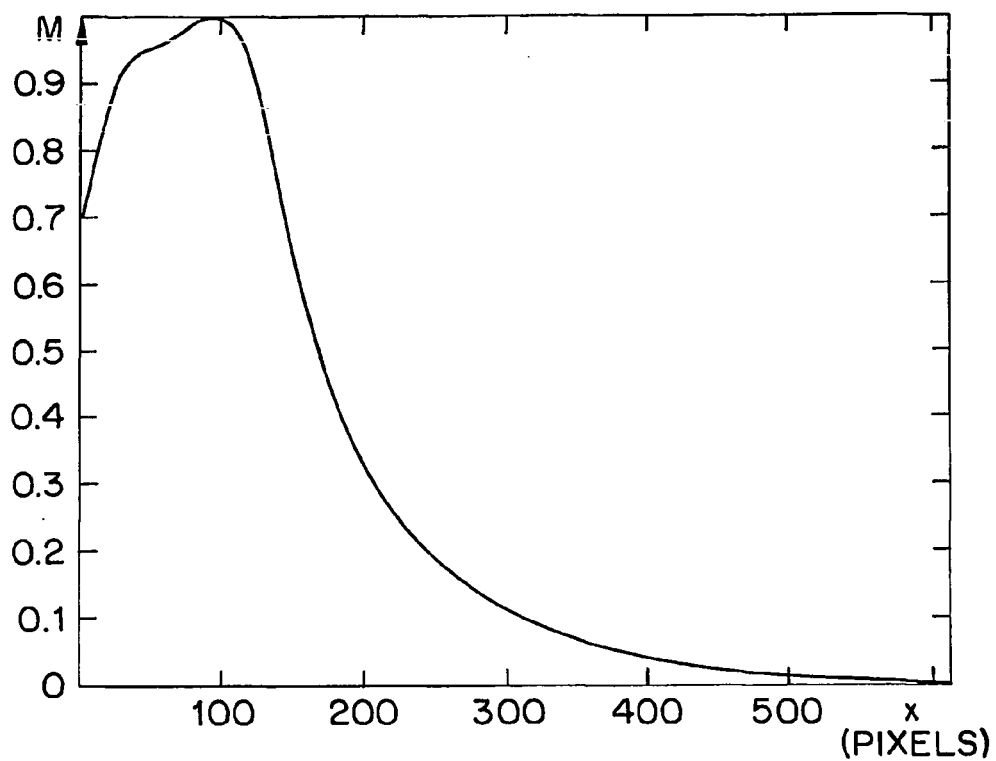
FIG. 36A is a graph illustrating an attenuation profile of an exemplary mask in accordance with the present invention.
Figure 36B:
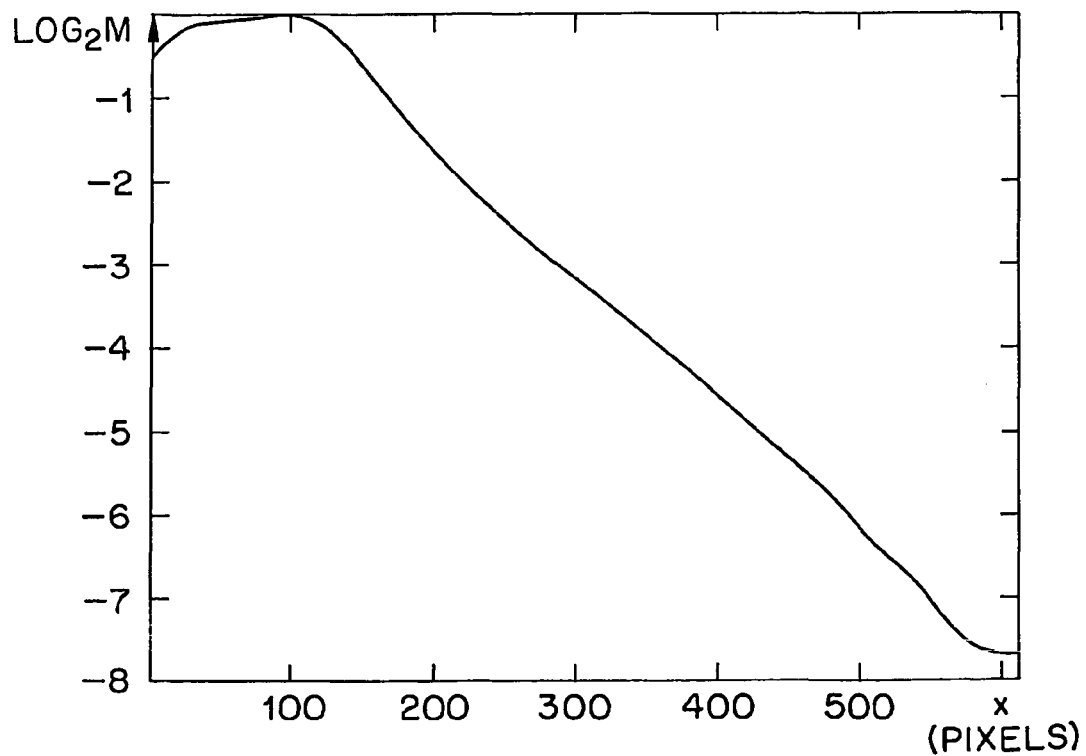
FIG. 36B is a graph illustrating a logarithmic characteristic of the attenuation profile illustrated in FIG. 36A.

A self-calibration procedure in accordance with the present invention has been tested experimentally. The test used a commercially available linear variable density filter, 3 cm long, rigidly attached approximately 30 cm in front of the 25 mm lens of a linear CCD camera. The filter had a maximum density of 2 (corresponding to attenuation by a factor of 100), although the effective mask characteristics had a wider range due to additional vignetting effects in the system. In the portion of the field of view in which the attenuation was lowest, M was approximately constant. The camera was rotated between frames so that each point was imaged 14 times across the field of view. Using a rough estimate of M, the images were registered as the registration procedure discussed below. Then, more than 50,000 equations were generated based on random corresponding unsaturated and non-dark points. The equations were used to determine the characteristic of the mask with a resolution of 614 pixels. The estimated mask function generated by the above-described self calibration procedure is illustrated in FIG. 36A. The logarithm, of the function is illustrated in FIG. 36B.

M can also be determined as a solution for a best fit, to the data, of a parametric curve such as a polynomial, sigmoid, or spline curve. Furthermore, alternatively, or in addition, to using the MSE criterion, other methods of optimization, such as robust statistics and iterative projection methods, can be used. Because M is multiplicative, log M can be used as an additive parameter which can be optimized using a linear optimization formalism in conjunction with the estimation of I at each scene point.

In addition, if the scene I changes only along the x axis (a 1-D signal), and each "frame" p is translated by an amount $t_p$ relative to the global coordinate system, then the sum of square errors is:

$$\sum_p \sum_x (\hat{g}_p(x) - M(x)I(x+t_p))^2 \quad (40)$$

for $\hat{g}_p(x)$ not saturated.

The algorithm optimizes the above error function with respect to the translation parameters $t_p$, the mask M, and the variables I. Additional parameters which can be adjusted as part of the optimization process can include: (1) the smoothness of M (or the number of coefficients needed to parameterize M), and (2) the smoothness of I, for the particular amount of motion between frames (i.e., how much $t_p$ differs from $t_{p+1}$). I and M are preferably constrained to be positive. The sum of the square errors in Eq. (7) can be weighted, e.g., as a function of M (making the problem non-linear), or the error can calculated in the log domain to make the above equation a linear optimization problem for unknown I and M.

In addition the mask can be calibrated iteratively. For example, the calibration procedure can begin with an initial estimated value for each point of the mask, and the initially estimated mask function can be used to estimate a fused value of the intensity of each image pixel. The fused image values are used to calculate an improved estimate for the mask using the above-described calibration procedure. Then, the improved mask estimate is used to derive a better estimate for the fused image, and so on.

Figure 4:
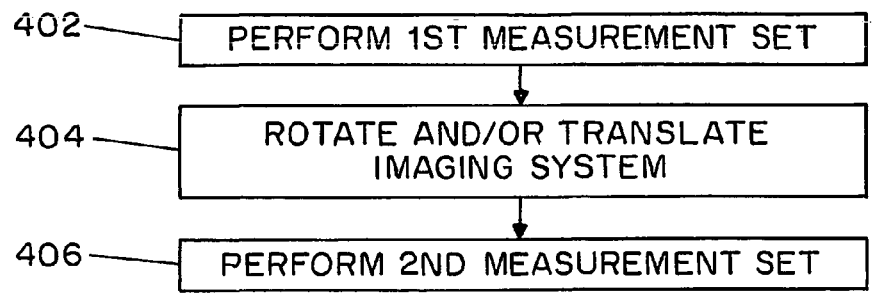
FIG. 4 is a flow diagram illustrating an exemplary procedure for image mosaicing in accordance with the present invention.
Figure 30A:
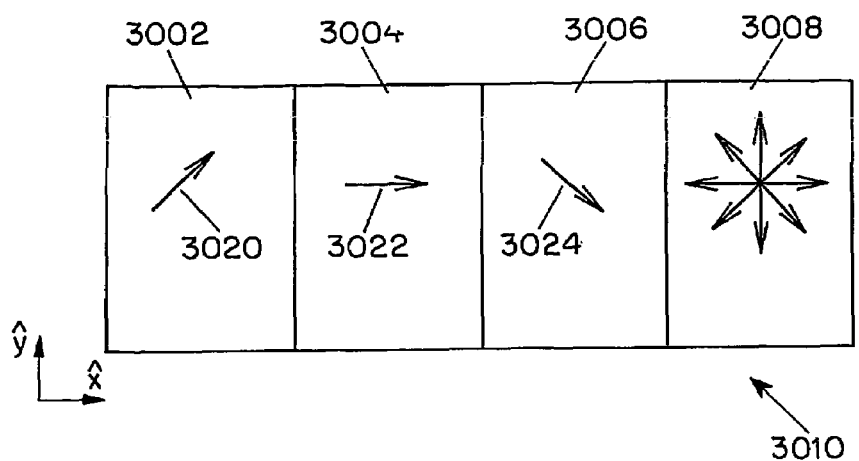
FIG. 30A is a diagram illustrating an exemplary polarizing filter array in accordance with the present invention.

In accordance with the present invention, an imager having spatially varying polarization sensitivity characteristics can be used to obtain information regarding the polarization of radiation (e.g., light or other electromagnetic radiation) emanating from a scene, regardless of whether the imager also has a spatially varying intensity sensitivity characteristic. An example of such a procedure is illustrated in FIG. 4. The illustrated procedure 400 uses an imager 712 having a first polarization sensitivity characteristic with respect to radiation signal sets received along a first chief ray of the imager 712, and a second polarization sensitivity characteristic with respect to radiation received along a second chief ray of the imager 712. For example, the imager 712 can comprise a camera 702 with a non-uniform polarizing filter which admits light having a first polarization angle in a first portion of the field of view, and which admits light having a second polarization angle in a second portion of the field of view. An example of such a filter is illustrated in FIG. 30A. The illustrated exemplary filter 3010 comprises three polarizing portions 3002, 3004, and 3006 which transmit light having polarization angles 3020, 3022, and 3024, respectively. The filter 3010 also includes a portion 3008 which passes light of any polarization through it. The filter 3010 illustrated in FIG. 30A can be mounted externally or internally to a camera 702 to form an imager 712 having a polarization sensitivity characteristic which varies between the left and right sides of the field of view. When the imager is panned across a scene, and multiple snapshots or frames of the scene are captured, each scene point is captured through more than one of the portions 3002, 3004, 3006, and 3008 of the spatially varying polarizing filter 3010.

Figure 30B:
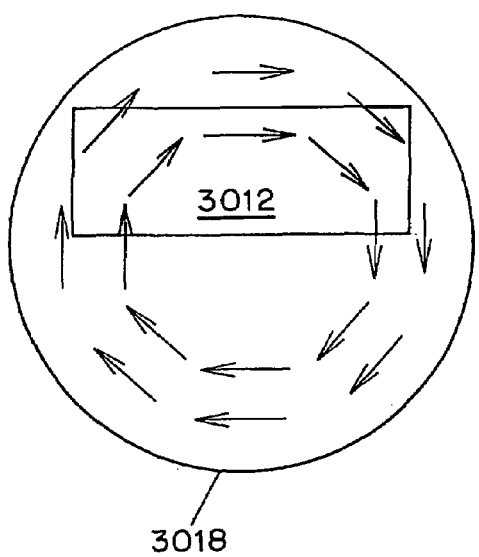
FIG. 30B is a diagram illustrating the fabrication of an exemplary polarizing filter in accordance with the present invention.
Figure 30C:
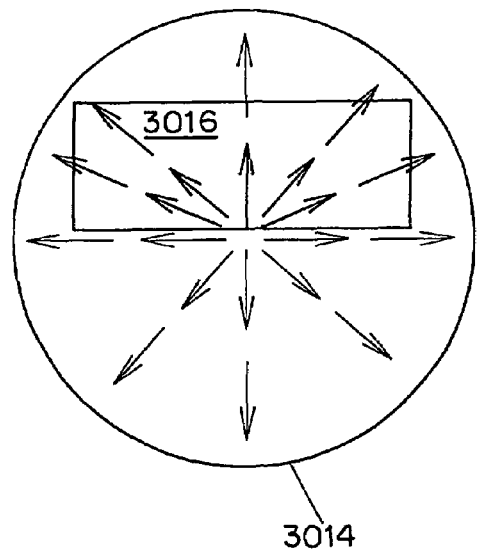
FIG. 30C is a diagram illustrating the fabrication of an additional exemplary polarizing filter in accordance with the present invention.

A spatially varying polarizing filter can be fabricated in a number of different ways. For example, in FIG. 30B, such polarizing filter 3012 is cut from a disk 3018 of material in which the polarization angle of transmitted light is in a direction azimuthal to the disk 3018. In FIG. 30C, a spatially varying polarizing filter 3016 is cut from a disk 3014 of material which transmits light having a polarization angle which is in a direction radial to the disk.

An imager 712 which includes one of the above-described filters will typically have spatially varying polarization sensitivity characteristics. In any case, regardless of how such an imager is formed, in the procedure 400 illustrated in FIG. 4, the imager 712 is used to perform a first measurement set, thereby generating a first measurement value (step 402). The first measurement set comprises at least one measurement of an intensity of at least one selected polarization component of a first light ray bundle from a first region of the scene. The first light ray bundle has a chief ray corresponding to a first chief ray received by the imager. The first polarization sensitivity characteristic of the imager—with respect to a light ray bundle having the first chief ray—comprises reduced sensitivity to light components having polarization angles outside a first angular range. The selected polarization component of the first signal is detected by the imager, because it has a polarization angle within the first angular range. The imager is rotated or translated in order to capture a different portion of the scene (step 404). The imager is used to perform a second measurement set, thereby generating a second measurement value (step 406). The second measurement set comprises at least one measurement of an intensity of at least one selected polarization component of a second light ray bundle from the first scene region. The second region has a chief ray which corresponds to the second chief ray received by the imager. The second polarization sensitivity characteristic of the imager—with respect to the light ray bundle having the second chief ray—comprises reduced sensitivity to signal components having polarization angles outside a second angular range. The selected polarization component of the second light ray bundle is detected because it has a polarization angle within the second angular range.

Once a set of snapshots and/or video frames have been captured, the resulting image data can be analyzed in a number of different ways. It is desirable to measure the properties of the scene with as much precision and accuracy as possible, but it is also desirable to perform the necessary measurements and computation in the most efficient manner possible. There is a tradeoff between the quantity of data acquired and the time and computing power required to capture and analyze the data. Greater precision can be achieved by taking a greater number of snapshots or frames per unit change in viewing angle. However, the capture and analysis of the resulting greater quantity of data is more time consuming and expensive. There are typically diminishing returns from capturing a larger number of images, because in practice, the scene properties being measured generally have limited degrees of freedom, and consequently, excessive sampling of the scene can result in redundant data. Furthermore, the effects of an externally mounted filter are typically somewhat blurred because the filter is defocused, and accordingly, using an extremely small angular change between snapshots may not result in enough additional information to justify the additional time and expense required to capture and process the data. Therefore, image mosaicing procedures in accordance with the present invention should preferably balance the tradeoff between additional information and additional time and expense. Methods for determining efficient and practical frame rates per unit change in viewing angle are discussed below with respect to image mosaicing procedures utilizing imagers having spatially varying sensitivity characteristics with respect to intensity, wavelength, polarization, and depth For example, consider an exemplary imager having a spatially varying intensity sensitivity characteristic resulting from a mask mounted on a camera. Let the transmissivity of the mask be M, and let the light intensity at a detector without the mask be I. Then the light falling on the detector after filtering is:

$$g(x,y)=M(x,y)I(x,y). \tag{8}$$

When viewing a scene having high contrast, it is typically useful to define the intensity in terms of orders of magnitude or octaves. For this reason, camera aperture "f-stops" are typically arranged in octaves such that each "stop" increase corresponds to a doubling of the measured intensity. In digital camera sensors this corresponds to a shifting of 1 bit in the binary representation of the measurement. For example, if an 8-bit camera measures the light intensity at a pixel position in an image as 00011010, then an increase of one stop will result in a corresponding reading of 0011010(0) in a second image, where the new least significant bit is the information added by the new image.

Consider, for example, the optimal mask for achieving an even division of orders of magnitude is one in which the attenuation octaves change linearly across the field of view— i.e., the attenuation changes exponentially. Then, $\log_2 M(x)$ is proportional to x. In this configuration, a constant scanning increment (e.g., a sequence of equal changes in the imager's viewing direction) will yield a constant change in the order of magnitude of the measured intensity, and all intensity ranges will be sampled equally. Such a behavior can be approximately achieved by attaching a linear variable density filter to the camera at some distance in front of the lens. It should, however, be noted that due to vignetting, perspective, and lens distortions, the linearity of the filter density will not be exactly conserved in log M(x).

Let I be the light intensity that falls on the detector (i.e., the irradiance) when the transmittance of the filter is at its maximum (i.e., M=1). A specific linear variable filter used in conjunction with a specific detector determines the minimal and maximal bounds of the scene radiance that can be sensed by the system without saturation. Let the minimal irradiance that can be sensed by the detector (for the given camera specifications) above the detector's noise in darkness be $$I_{min}^{detector}.$$

This determines the minimum irradiance that can be sensed by the entire system. Let the maximum irradiance that the detector can measure without saturation be $$I_{max}^{detector}.$$

The optical dynamic range of the detector in terms of octaves is then:

$$DR^{detector} = \log_2 \frac{I_{max}^{detector}}{I_{min}^{detector}} \tag{9}$$

Typically, $DR^{detector}$=8 bits. The maximum irradiance that the entire system can sense without being saturated is when the detector yields its maximum output under the strongest attenuation—i.e., with the smallest value of the mask M:

$$I_{max}^{system} = I_{max}^{detector} / \min M.$$

Therefore, the total optical dynamic range of the system is:

$$DR^{system} = \log_2 \frac{I_{max}^{system}}{I_{max}^{detector}} = DR^{detector} - \log_2(\min M) \tag{10}$$
$$= DR^{detector} + \log_2[\max(1/M)].$$

At issue is how to perform the most efficient sampling of scene information, assuming that the captured images will have an irradiance range between $$I_{min}^{detector} \text{ and } I_{max}^{system}.$$

Changing the viewing direction is effectively equivalent to changing the aperture stop through which a point is seen (in terms of the light power allowed into the detector), and each change of a full stop (i.e. a factor of 2 change of attenuation) is equivalent to a 1 bit shift in the binary representation of the measurement within the dynamic range $DR^{detector}$ of the detector. For some applications, it may be preferable to require that minimal information is lost in the scan. In such cases, when the scan is complete, no bits should be "missed" between those acquired at each frame increment. However, for applications requiring less redundancy, it is probably sufficient to use a "lossy" scan in which it is only required that when the scan is complete, no point is saturated and all points are above the detector's threshold (as long as $I \geq I_{min}^{detector}$).

Such a procedure yields the most efficient scan, in which the optical dynamic range of the measurements is extended maximally at each increment.

For example, consider an imaging system in which $\log_2[\max(1/M)]<DR^{detector}$, and in which and $DR^{detector}$=8 bits and min M=⅛, hence $DR^{system}$=11 bits. Let a scene point yield the binary value 11111111 when M=1 and 10111001 when M=½. Then the former measurement is saturated while the latter is not. Accordingly, for M=⅛ (a shift of 2 more bits to the right) the measurement will yield 00101110. The 11 bits representation of the irradiance is thus 0010111001(0). Assuming that the scene images may contain irradiance values throughout the optical dynamic range of the system, the least redundant scan which ensures minimal loss of information (bits) is a scan in which each point is sampled four times, at one-octave increments. If a linear variable filter is used, then there is a linear relationship between: (1) the displacement between consecutive frames, and (2) the attenuation with which a particular scene region is imaged.

For applications in which less dynamic range is required, it may, for example, be sufficient to perform, for each point, a single measurement which is unsaturated, yet which is above the detector's threshold if $$I \geq I_{\min}^{detector}.$$

In such a case, it may be sufficient to use only M=1 and M=⅛. This yields the value 00101110(000) for the above-described, exemplary pixel, while yielding a value such as, for example, 00000000011 for a rather dark point in the scene. In such a system, any point can be measured using one extreme value of the mask, and then using the other extreme value, while skipping the intermediate mask values. In other words, it is sufficient to sample each point only twice. The inter-frame increment can be large, provided that it is less than half the length of the frame, and provided that the transition region between M=1 and M=⅛ is less than the inter-frame increment.

Now, consider a system in which $\log_2[\max(1/M)] \geq DR^{de}_{tector}$. Including the mask, the system's optical dynamic range is at least double that of the detector alone. Sampling each point at one-octave increments ensures a minimal loss of bits. For a lossy, but most efficient, scan it is preferable to measure each point without overlapping intensity information between consecutive scan increments. For example, if $DR^{de}_{tector}$=8 bits and $DR^{system}$=16 bits then two samples of each point suffice to acquire the entire range of values. The first sample senses, in high definition, each point for which the quantizer of the system produces an image value—as scaled by $$I_{\min}^{detector} -$$

which is smaller than 256, and the second sample captures, without saturation, each point for which the image value is larger than 255 but smaller than 65536.

Generally, for a "lossless" efficient scan, each point should be sampled $1+\log_2[\max(1/M)]$ times. For the most efficient scan, each point should be sampled $\xi=\lceil DR^{system}/DR^{detector}\rceil$ times where $\xi$ is always rounded up to the nearest integer. In practice it may be desirable to use the foregoing figures merely as a rule of thumb, and use a somewhat denser sampling rate, because the redundancy associated with denser sampling enables less noisy irradiance estimation, and furthermore assists in stable registration of the images within an image sequence. Moreover, it is to be noted that the above-described scene sampling procedures are not the only ways to sample scenes; other periodic and/or non-periodic sampling intervals can also be used.

Image mosaicing procedures in accordance with the invention can also be used to achieve "super-resolution" in the intensity domain, because a smoothly varying mask acts as an analog computational device, and can therefore, in many cases, provide better quantization accuracy than a single, quantized image measurement. For example, consider an imager having an integer quantizer for which the image values 96.8 and 97.2 are indistinguishable—i.e., both image values will yield an output value of 97. By attenuating the signal by a factor of 2—i.e., by using M=½—the imager outputs the values 48 and 49, respectively, thus providing enhanced discrimination. In another example, 95.8 and 96.2 can be distinguished using the results of sensing with M=$2^{-6}$, that is, using 7 images. In general, if more images are used, the intensity resolution of the fused estimate is better. [Specifically, how are the multiple samples combined to give an accurate result here?] This is another advantage of sampling the scene more densely than the rates discussed above. [Which rates?]

For image mosaicing used to measure the spectral characteristics of a scene, the optimal spacing of selected viewing angles depends upon how quickly the intensity vs. wavelength function of the detector each pixel position varies with respect to wavelength. This consideration is similar to sampling issues in the context of many types of signals: if the samples are too sparse to sense the signal fluctuations, aliasing occurs. Hence, if the spectrum of each scene point or scene region is smooth—as is the case for blackbody radiation, it may be sampled sparsely. On the other hand, if the spectrum contains fine lines such as emission and absorption lines of atomic vapors, the spectrum should be sampled densely, and accordingly, the amount of rotation or translation of the imager between frames should be small.

However, even if the spectrum of light coming from the scene has narrow spectral bands, when these bands are measured, the measured profile is likely to be smoothed by the defocus blurring of an externally mounted filter. Consider, for example, a linearly varying spectral filter. The blurring of the measurements can be modeled as a convolution of the spectrum $s(\lambda)$ with a window function $h(\lambda)$ of width $\Delta\lambda_{blur}$. Let $S(v_\lambda)$ and $H(v_\lambda)$ be the Fourier transforms of $s(\lambda)$ and $h(\lambda)$, respectively. H is a lowpass filter having a cutoff frequency which is $\approx 1/\Delta\lambda_{blur}$. If the filter's transmission characteristic H extends infinitely in frequency, the cutoff frequency can be defined as: (1) the frequency at which the signal energy is very low, (2) the first zero of H, or (3) a quantity proportional to the standard deviation of the function H. In any case, this "cutoff" frequency will be $\approx 1/\Delta\lambda_{blur}$. The required sampling interval is:

$$\lambda(x)_{sample} \approx \Delta\lambda_{blur}/2. \quad (11)$$

The above sampling criterion can be expressed in terms of the physical dimensions of the system. For a linear variable filter of length L, $$\lambda(x) = \frac{\lambda_{\max}+\lambda_{\min}}{2} + \frac{B}{L}x, \quad x \in \left[-\frac{L}{2}, \frac{L}{2}\right], \quad (12)$$

where $\lambda_{max}$ and $\lambda_{min}$ are the maximum and minimum wavelengths that the entire filter passes, respectively, and B=$\lambda_{max}-\lambda_{min}$ in is the total bandwidth of the filter. If the model for the filter defocus blur is convolution by a window kernel of width $\Delta x_{blur}$, then $\Delta x_{blur}$=$B\Delta x_{blur}$/L. Hence:

$$\Delta\lambda_{sample} \approx \frac{B\Delta x_{blur}}{2L}. \quad (13)$$

For example, consider the imager 712 illustrated in FIG. 8. If the imager 712 is focused at infinity, then the external filter 704 is blurred by kernel having a width that is equal to the width of the object light beam (e.g., beam 810, 812, or 814) passing through the aperture 710. Therefore, for the illustrated arrangement of lens 802 and external filter 704, $\Delta x_{blur}$=D, where D is the diameter of the aperture 710. Therefore:

$$\Delta\lambda_{sample} \approx \frac{BD}{2L}. \quad (14)$$

The above result can be explained qualitatively as follows. If the band B is stretched over a long filter so that the blur-kernel is insignificant in size—i.e., D<<L—then the fine details of the original spectrum (which may have sharp lines) remain, and thus the sampling should preferably be dense. Quantitatively, it can be seen from that Eq. (14) that the sampling period $\Delta\lambda_{sample}$ becomes small when D<<L.

Suppose that the imager 712 rotates with an angle increment of $\Delta\phi_{sample}$ between image acquisitions. Let the filter 704 be situated at a distance A from the rotation axis—which can be, for example, the center of projection O in the system illustrated in FIG. 8. Furthermore, let the filter 704 be normal to the optical axis. Each ray of light propagating from the scene to the center of projection is then displaced by $\Delta x_{sample} \approx A\Delta\phi_{sample}$ sample between samples, assuming that the total angle θ of the field of view is small—i.e., assuming that sin θ≈θ. Referring to Eq. (11), $$\Delta\lambda_{sample} \approx \frac{B}{L}\Delta x_{sample} \approx \frac{B}{L}A\Delta\phi_{sample}. \quad (15)$$

Comparing Eqs. (14) and (15), and noting that the f-stop number f#≡F/D where F is the focal length, it can be seen that:

$$\Delta\phi_{sample} \approx \frac{D}{2A} = \frac{F}{2Af\#}, \quad (16)$$

irrespective of the dimensions or total bandwidth of the filter. A qualitative explanation corresponding to Eq. (16) is that a larger aperture D introduces larger defocus blur; accordingly, fewer samples are needed, and therefore, $\Delta\phi_{sample}$ can be increased. Furthermore, a smaller distance A between the filter and the center of projection results in a smaller change in the wavelength λ of a light ray passing through the center of projection O for a given rotation increment, thereby decreasing the resulting effective wavelength sampling period. Therefore, for a desired $\Delta\lambda_{sample}$, $\Delta\phi_{sample}$ should preferably increase as A decreases.

Eq. (16) demonstrates an advantage of using an externally mounted filter, rather than placing a filter directly on the detector array: with an externally mounted filter, the user can select his/her desired frame sampling rate simply by changing either the lens aperture size or the distance of the external filter from the lens. If the application requires high resolution with respect to spectral content, then the filter is preferably placed farther away from the center of projection, and the aperture size is preferably small. On the other hand, if the user would like to scan the scene quickly—which generally entails fewer frames for a given field of view—then $\Delta\phi_{sample}$ should be large. Accordingly, the aperture should be large and/or the filter should be positioned relatively close to the lens.

As an additional example, consider an application which requires a 360° panoramic view of a scene, and assume that the imager being used includes a filter of length L which covers the entire field of view of the imager. The length of the imager is denoted by $L_d$. Then, F/A=$L_d$/L. Therefore:

$$\Delta\phi_{sample} \approx \frac{1}{2f\#}\frac{L_d}{L}. \quad (17)$$

In order to capture a 360° panorama, the required number of images is:

$$N_{360°panoram} = \frac{2\pi}{\Delta\phi_{sample}} \approx \frac{4\pi f\#L}{L_d}. \quad (18)$$

It is to be noted that although the foregoing analysis is based upon assumptions of a simple lens camera system, small angles, an external bandpass filter mask which is linear as a function of wavelength, the general principles applied above can also be used to derive similar relations for other systems. Furthermore, for an imager having a simple lens, or for any other system, the sampling intervals can be different, and can in fact be non-periodic.

In addition, a set of images captured by an imager having a spatially varying polarization sensitivity characteristic can be analyzed to determine the polarization characteristics of radiation (e.g., light) emanating from a scene. The polarization state of the light coming from a scene point has four degrees of freedom—i.e., the 4 Stokes parameters, which are well known in the art. Thus, if a detector makes four or more measurements of light emanating from a scene point, each measurement having different polarization filtering, it is possible to estimate the polarization state of the light. In many cases, elliptic and circular polarization states can be neglected, leaving only three degrees of freedom: intensity, partial polarization, and polarization plane (i.e., polarization angle). Let a linear polarizer be tuned to pass the polarization component at angle α about the optical axis. Let the polarization plane of the incident light be at angle θ. Let the intensity of the incident light be I and its partial polarization be P. Then, the intensity of light passing through the filter is:

$$g = C + A\cos[2(\alpha-\theta)], \quad (19)$$

where C=I/2 and A=PC. In this case three measurements generally suffice to estimate the polarization state of the light. For example, if in each measurement (corresponding to frame p) only the polarizer angle $\alpha_p$ changes, then $$[1 \ \cos(2\alpha_p) \ \sin(2\alpha_p)]\begin{bmatrix} C \\ A_c \\ A_s \end{bmatrix} = g_p, \quad (20)$$

where $A_c$=A cos(2θ) and $A_s$=A sin(2θ). Thus:

$$M\begin{bmatrix} C \\ A_c \\ A_s \end{bmatrix} = \vec{g}, \quad (21)$$

where

-continued $$M = \begin{bmatrix} 1 & \cos(2\alpha_1) & \sin(2\alpha_1) \\ 1 & \cos(2\alpha_2) & \sin(2\alpha_2) \\ \vdots & \vdots & \vdots \\ 1 & \cos(2\alpha_m) & \sin(2\alpha_m) \end{bmatrix}, \quad (22)$$

and m is the number of frames in which the scene point was measured, and $$\vec{g} = \begin{bmatrix} g_1 \\ g_2 \\ \vdots \\ g_m \end{bmatrix}. \quad (23)$$

Neglecting the elliptic polarization component, Eq. (21) can be inverted using m=3 equations:

$$\begin{bmatrix} C \\ A_c \\ A_s \end{bmatrix} = M^{-1} \vec{g}. \quad (24)$$

Eq. (24) can be used to calculate the values of the light intensity I, the partial polarization P, and the angle of the plane of polarization θ. If, for example, the imager employs a filter covering the field of view $\phi_{FOV}$, and the polarization filtering changes across the field of view $\phi_{FOV}$, then between each frame, the imager should preferably change its viewing direction by $\Delta\phi_{sample} \approx \phi_{FOV}/3$.

It is to be noted that in some cases, two measurements of the polarized light from each scene point suffice to gain polarization information regarding the scene. This is particularly the case if there is some a priori information available regarding the polarization. Such a priori information can include information regarding the polarization properties of typical scene objects which can be expected to be present in the scene.

The polarization angle of detected radiation need not be the only sensitivity characteristic which changes between frames. For example, the total attenuation of the radiation (which affects I) can also change. Moreover, a polarizer used in an imager need not be completely polarizing, but can merely have a bias in favor of one polarization component over another. In such cases, the analysis is similar, but each row of the matrix M must be normalized to compensate for the attenuation associated with the row. In some conventional systems, polarization is measured by using polarizing beamsplitters to split a light beam and send the resulting separate components to separate sensors. Other systems employ a rotating linear polarizer, or an electrically controlled polarizing apparatus such as a liquid crystal element. However, in accordance with the present invention, polarization measurements can be performed using an imager having a spatially varying polarization sensitivity characteristic—e.g., a camera with a spatially varying polarizing filter. Such an imager allows polarization measurements to be performed without adding additional sensors, without moving any of the internal parts of the imager during the image acquisition, and without using an electronic filter. The avoidance of additional moving, internal parts reduces energy consumption and increases reliability.

Figure 9:
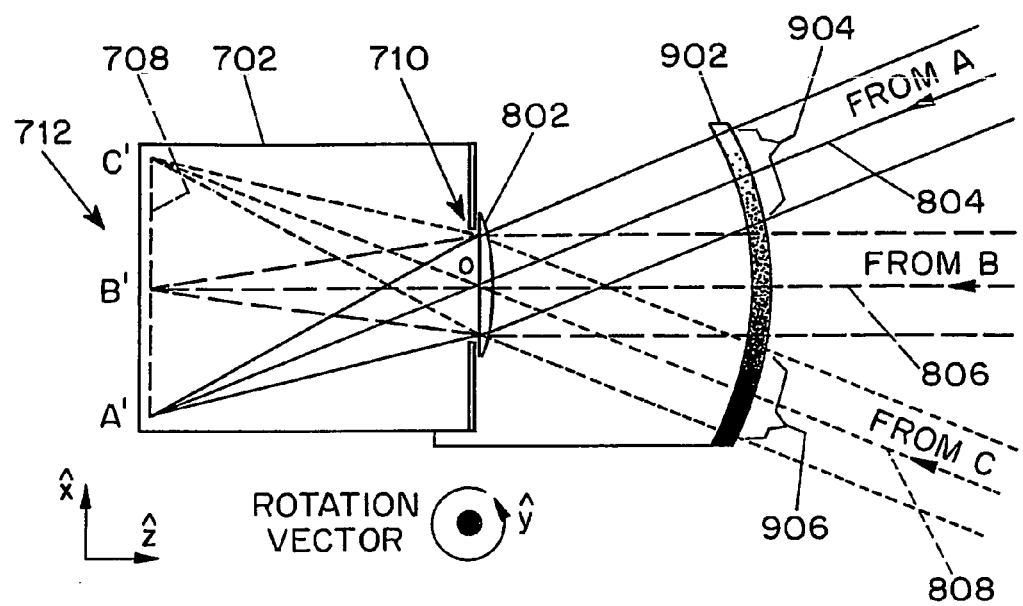
FIG. 9 is a diagram illustrating a further exemplary system for image mosaicing in accordance with the present invention.
Figure 10:
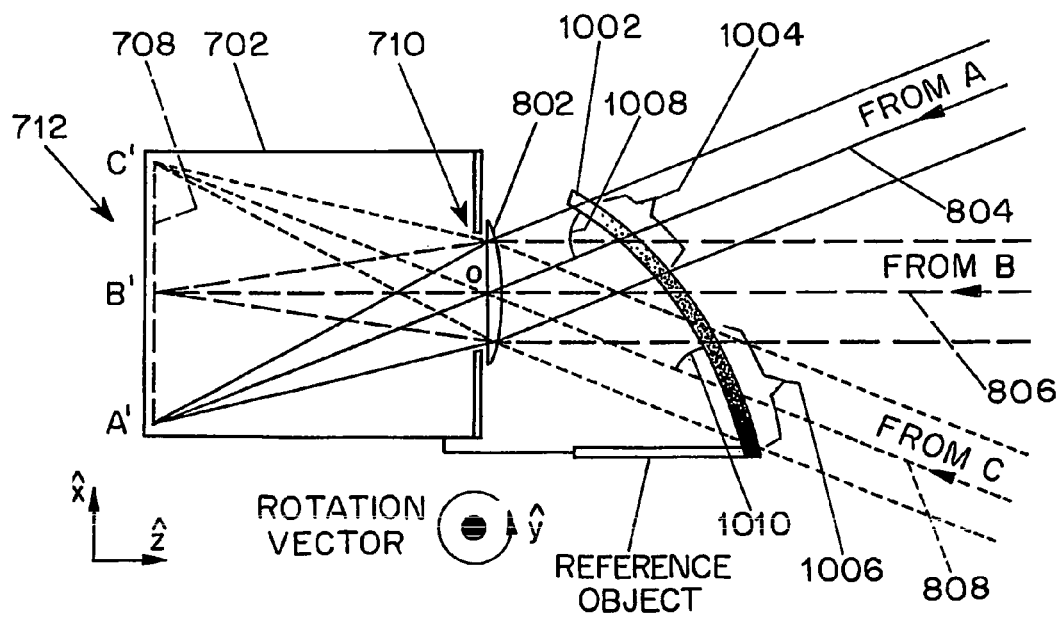
FIG. 10 is a diagram illustrating still another exemplary system for image mosaicing in accordance with the present invention.

In performing an image mosaicing procedure in accordance with the invention, it is particularly advantageous to employ an imager 712 comprising a spatially non-uniform filter 704 mounted externally on a camera 702, as illustrated in FIGS. 7 and 8, because such an arrangement allows the imager 712 to be easily modified by merely modifying or replacing the externally mounted filter 704. Additional examples of imagers having externally mounted filters are illustrated in FIGS. 9 and 10. The imager 712 illustrated in FIG. 9 includes an externally mounted spatially varying filter 902 which is curved such that every portion of the filter 902 has approximately the same distance from the center of projection O of the aperture 710. In the system illustrated in FIG. 9, the projections, onto the aperture 710, of any two equal-sized portions of the filter 902—e.g., portions 904 and 906—have approximately the same size. Therefore, the sensitivity characteristics of the imager 712 depend primarily upon the characteristics and/or thickness of the material from which the filter 902 is formed.

The system of FIG. 10 includes a filter 1002 which is oriented such that the distance between the filter 1002 and the center of projection O of the aperture 710 varies with viewing angle. In particular, a first portion 1004 of the filter 1002 is closer to the center of projection O than a second portion 1006 of the filter 1002. As illustrated in FIG. 10, portion 1006 is oriented at an angle 1010 with respect to chief ray 808 which passes through both portion 1006 and the center of projection O. Portion 1004 is oriented at a different angle 1008 with respect to chief ray 804 which passes through both portion 1004 and the center of projection O. Angle 1010 is smaller than angle 1008, and as a result, although portion 1006 is larger in area than portion 1004, the two portions 1004 and 1006 have the same area of projection upon the center of projection O of the aperture 710.

In the case of an attenuating filter, the effective attenuation of a particular portion of the filter increases with the sharpness of the angle at which light passes through the filter. In the case of a wavelength-selecting filter such as an interference filter, the wavelength that is transmitted by the filter can depend upon the angle of incidence. Therefore, an externally mounted filter can be particularly advantageous because, if the filter is either flexible or movably mounted, the angular orientation of the filter can be easily modified, thereby enabling easy modification of the characteristics of the imager.

Figure 11:
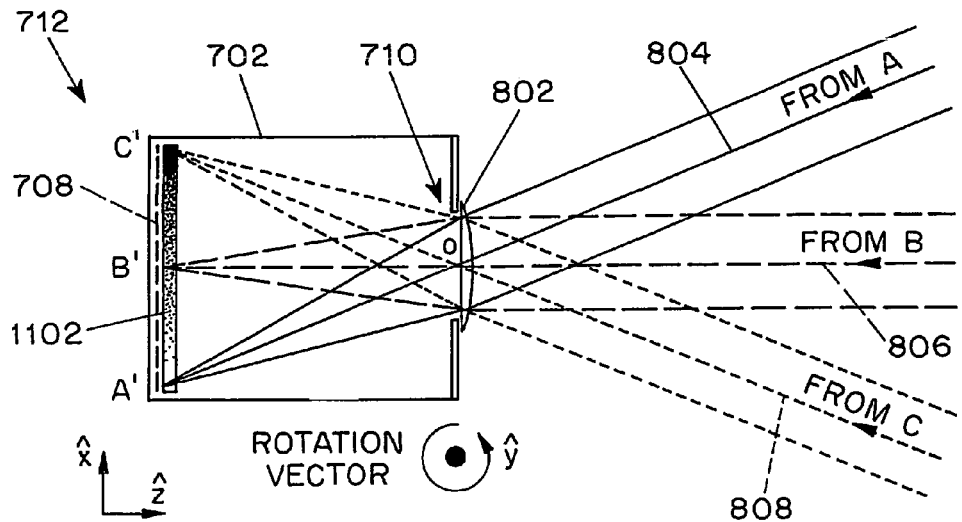
FIG. 11 is a diagram illustrating an additional system for image mosaicing in accordance with the present invention.

Although the foregoing discussion has emphasized the use of cameras having external filters, a spatially varying filter need not be external to the camera. For example, FIG. 11 illustrates an image 712 having a filter 1102 which is positioned directly on the detector 708. An advantage of placing the filter 1102 directly on the detector 708 is that because the detector 708 is at the focal plane of the lens 802, and because the filter 1102 is extremely close to the detector 708, there is very little blurring of the characteristics of the filter 1102. As a result, the characteristics of the imager 712 are more accurately defined by the filter 1102, thereby making it practical to use a filter having finer variations in its filtering characteristics. However, a tradeoff for this benefit is a loss of flexibility in changing or altering the filter which is typically associated with a camera having an internal, rather than an external, filter.

Figure 12:
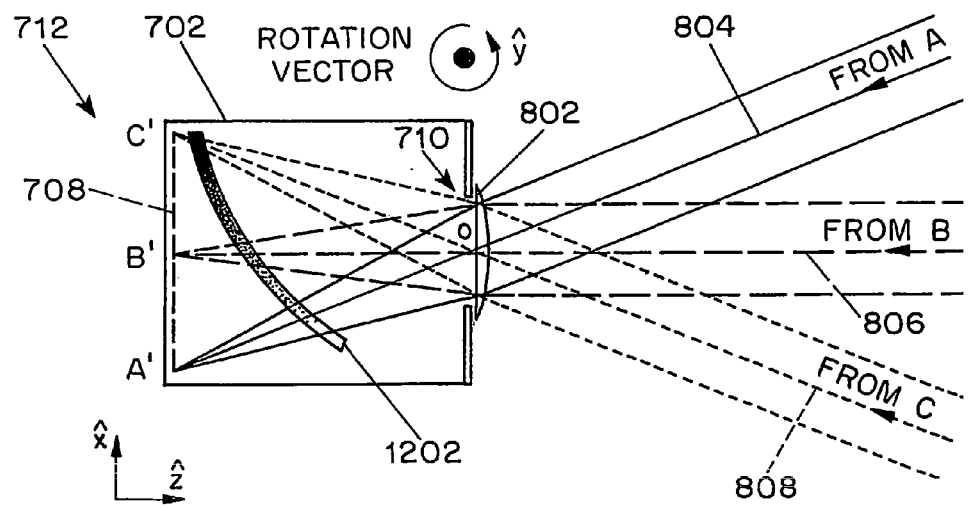
FIG. 12 is a diagram illustrating another exemplary system for image mosaicing in accordance with the present invention.

FIG. 12 illustrates a camera in which a filter 1202 is located inside the camera, but is not in direct contact with the sensor 708. The arrangement of FIG. 12 enables use of a curved or tilted filter.

Figure 13:
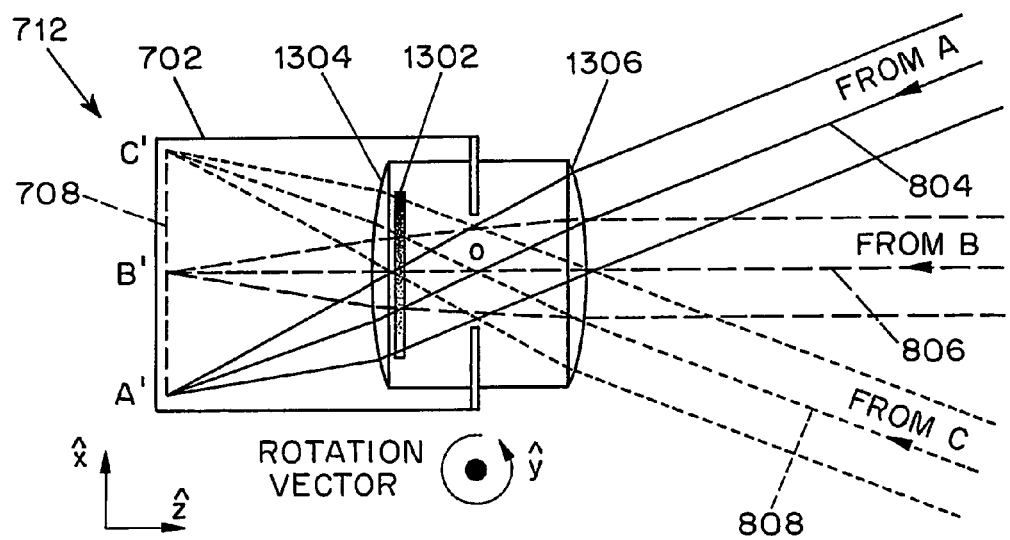
FIG. 13 is a diagram illustrating still another exemplary system for image mosaicing in accordance with the present invention.

In a camera system having a compound lens, as illustrated in FIG. 13, a spatially varying filter 1302 can be placed between elements 1306 and 1304 of the compound lens. In the example illustrated in FIG. 13, the objective lens 1306 forms an image of the object, and the additional lens 1304 projects the image onto the detector 708. The filter 1302 is preferably placed close to the additional lens 1304. Virtually all camera lenses are compound for correcting aberrations etc. and usually have more than two elements.

Figure 14:
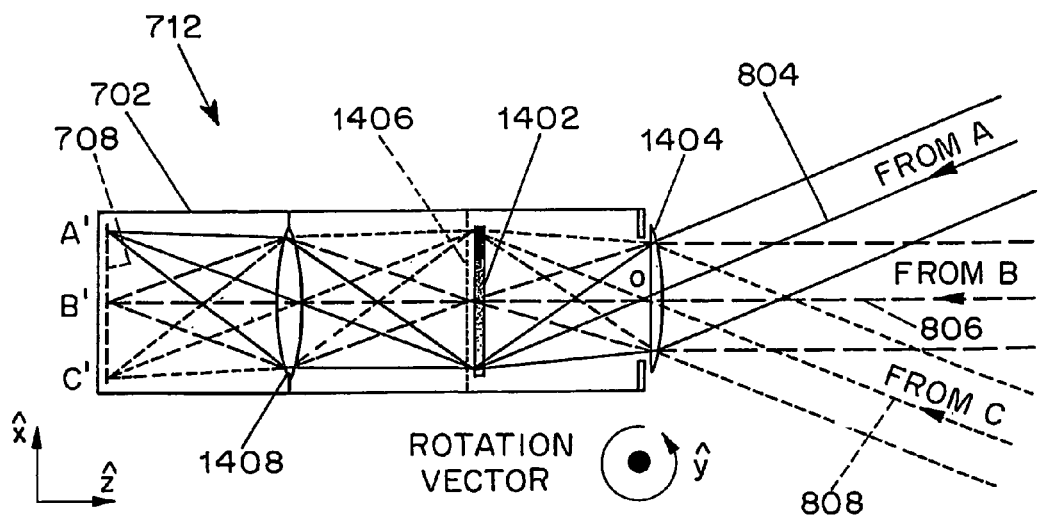
FIG. 14 is a diagram illustrating a further exemplary system for image mosaicing in accordance with the present invention.

As illustrated in FIG. 14, an imager having a compound lens can also include a diffuser 1406 which is positioned at the focal plane of an objective lens 1404. A filter 1402 having a spatially varying characteristic is placed as close as possible to the diffuser 1406. The objective lens 1404 forms, on the diffuser 1406, a focused image which is modified by the spatially varying filter 1402. An additional lens 1408 projects the focused image from the diffuser 1406 to the detector 708.

Figure 15:
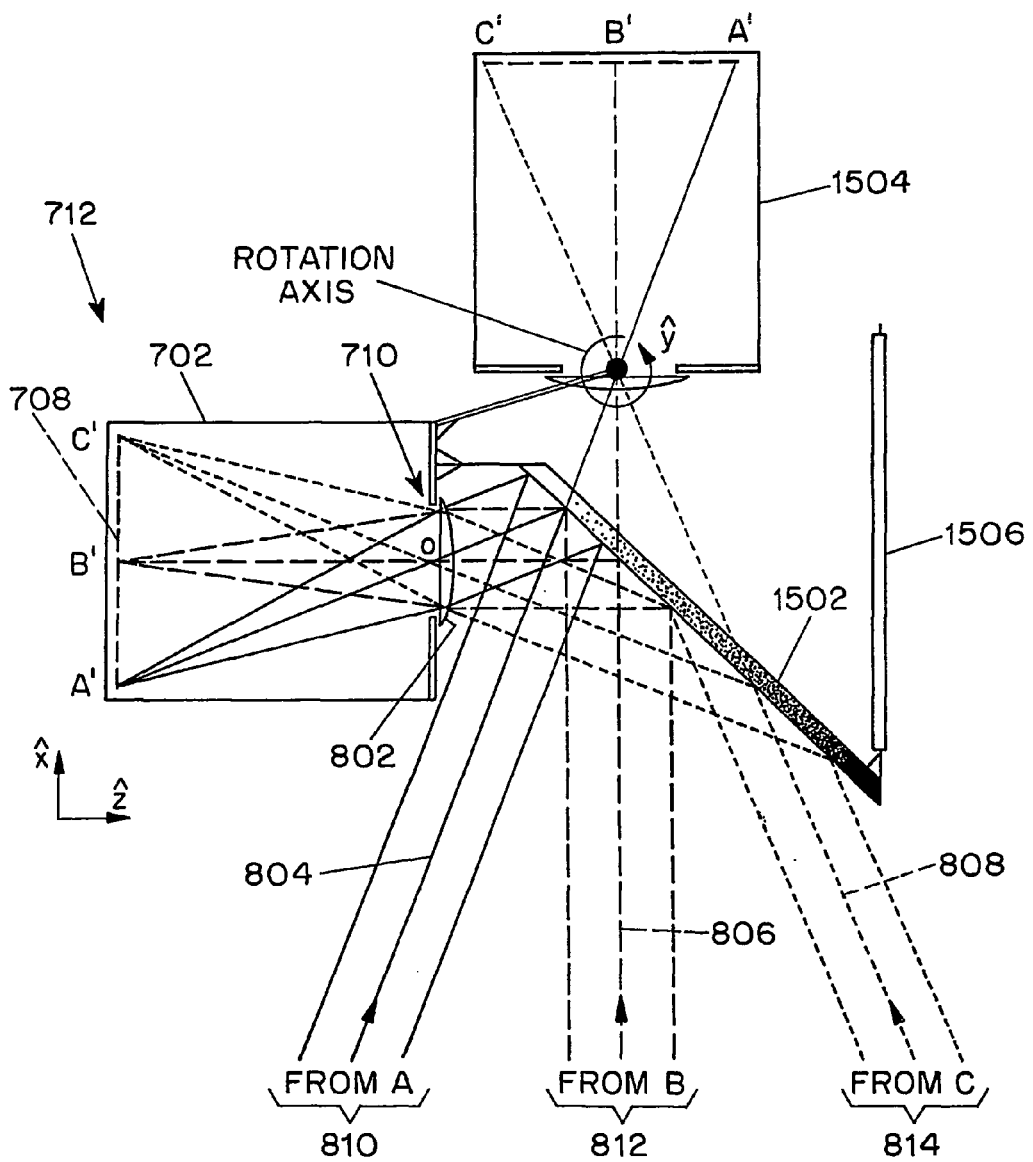
FIG. 15 is a diagram illustrating yet another exemplary system for image mosaicing in accordance with the present invention.

An imager in accordance with the present invention can be configured to receive radiation (e.g., light) rays from the scene using a reflector having a spatially varying reflectance. In such a system, an example of which is illustrated in FIG. 15, the reflector 1502 having the spatially varying reflectance is used to reflect light signals 810, 812, and 814 from the scene (i.e., from points A, B, and C) into the camera aperture 710. If the reflector 1502 having the spatially varying reflectance is partially transmissive (i.e., transmits some light), the reflector 1502 can be arranged between the camera aperture 710 and a reference object 1506 which can be used to calibrate the system or to absorb spurious reflections from the camera 702. For example, a well-known calibration technique uses a known light source to calibrate the characteristics of the detector in the camera. The arrangement of FIG. 15 can be viewed as functionally equivalent to a virtual camera 1504 which is oriented at an angle different from that of the actual camera 702, and which effectively receives the light ray bundles 810, 812, and 814 directly—i.e., not by reflection.

An additional advantage of using an externally mounted reflector 1502 in the imager 712 is that the reflector 1502 can optionally be curved in order to control the field of view and/or the magnification of the imager 712.

Figure 16:
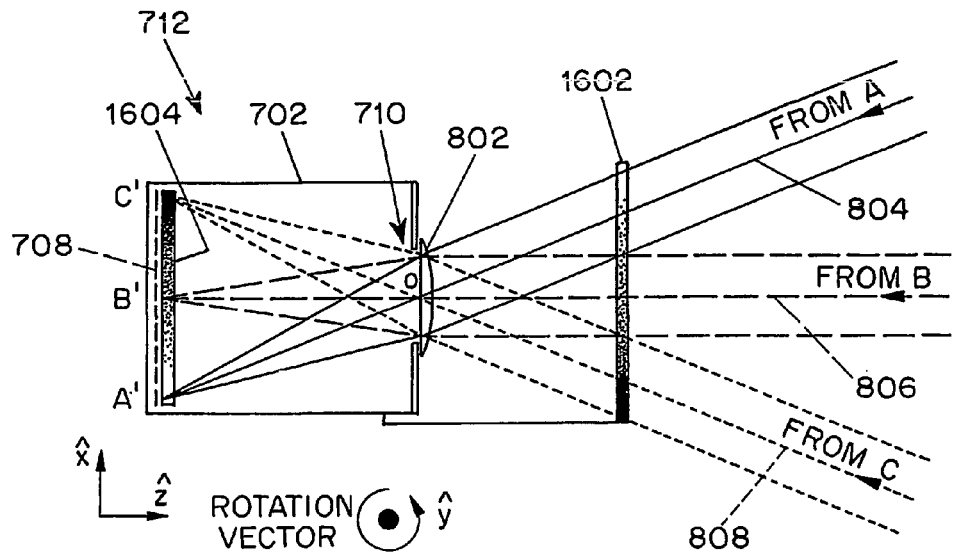
FIG. 16 is a diagram illustrating a further exemplary system for image mosaicing in accordance with the present invention.

FIG. 16 illustrates an imager 712 having a filter 1602 outside the camera 702, and an additional filter 1604 inside the camera 102.

Figure 17:
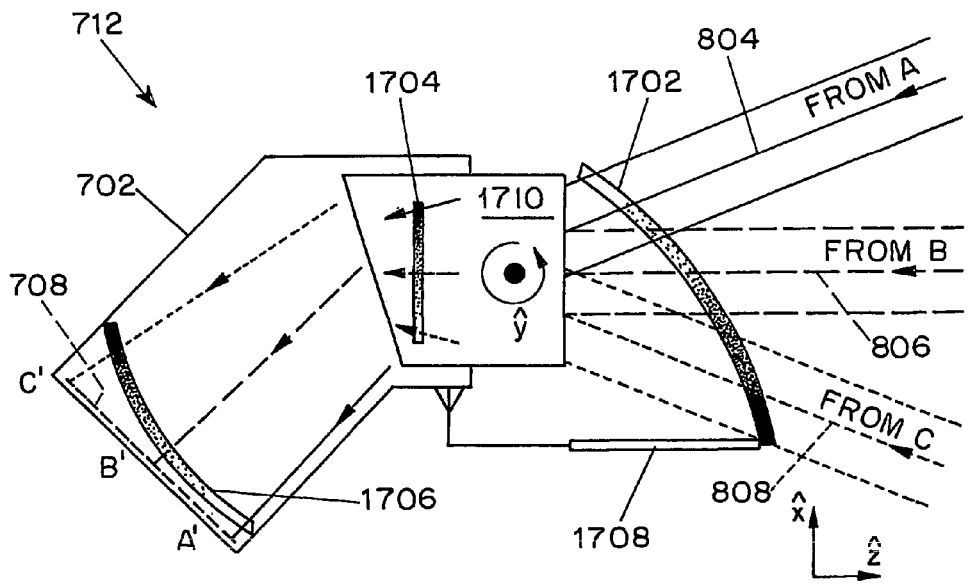
FIG. 17 is a diagram illustrating an additional system for image mosaicing in accordance with the present invention.

FIG. 17 illustrates an imager 712 having a filter 1702 and a reference object 1708 outside the camera 702, an additional filter 1704 within the optical components 1710 of the camera 702, and yet another filter 1706 inside the camera 702 and positioned near the detector 708.

Figure 18:
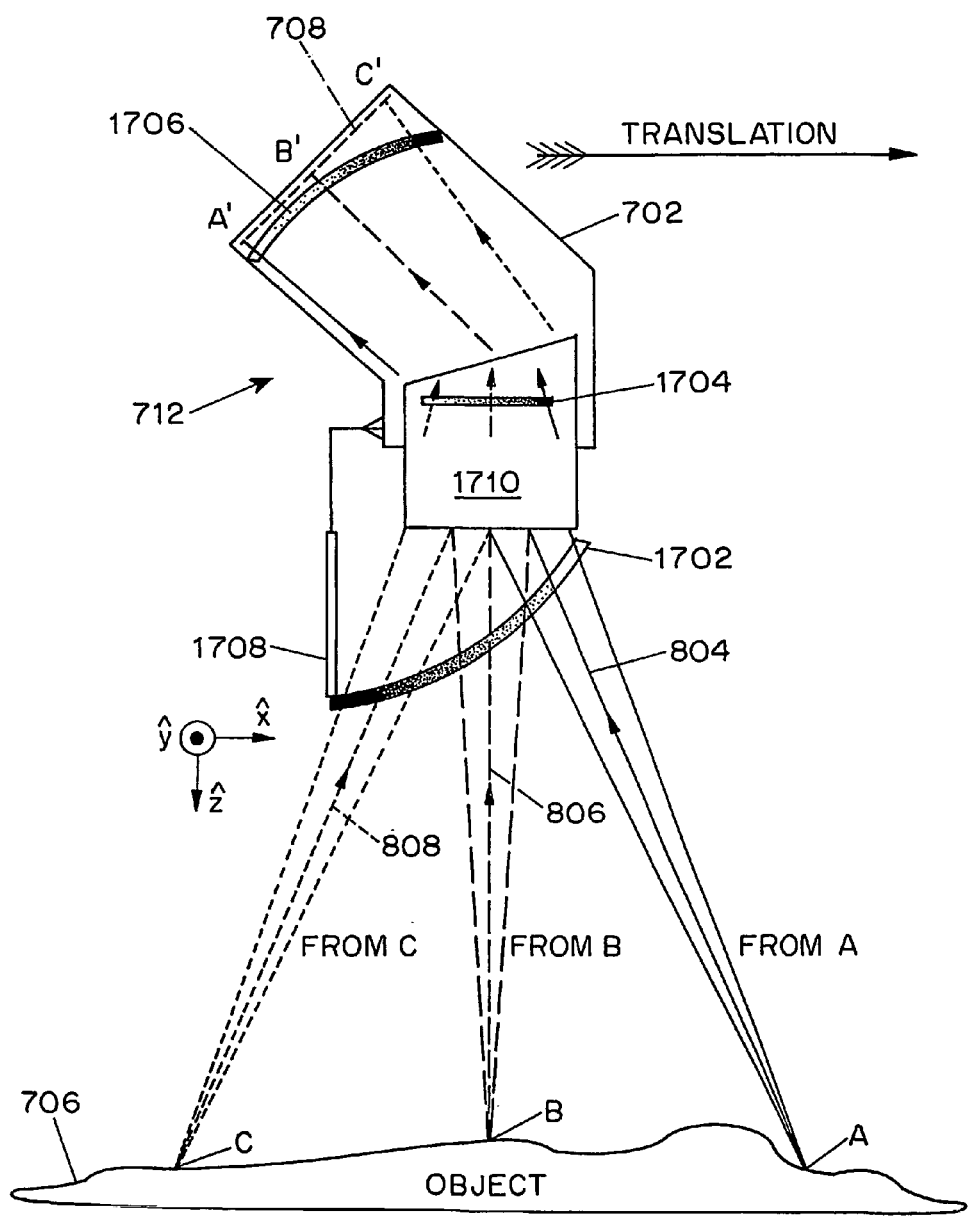
FIG. 18 is a diagram illustrating another exemplary system for image mosaicing in accordance with the present invention.
Figure 19:
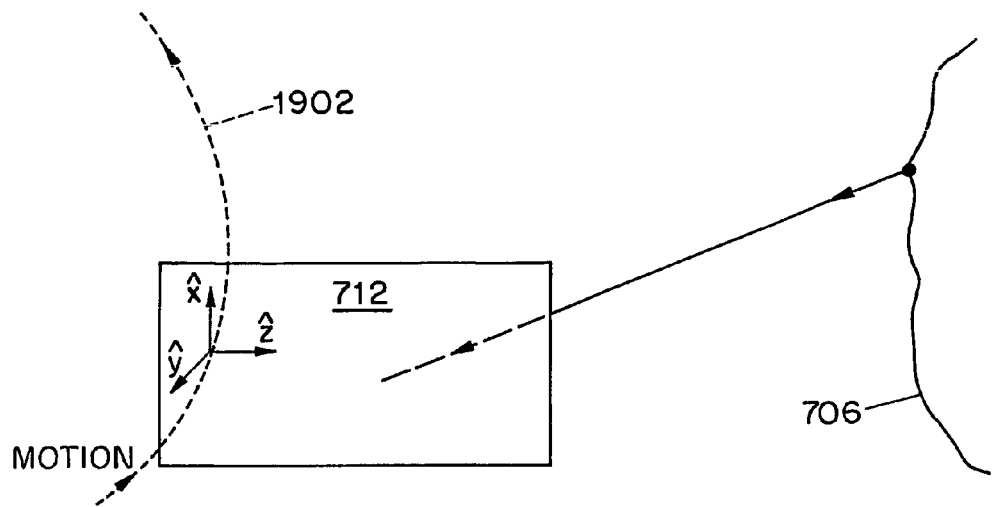
FIG. 19 is a diagram illustrating a further exemplary system for image mosaicing in accordance with the present invention.

An imager in accordance with the present invention—such as, for example, the imager 712 illustrated in FIG. 17—can be translated in order to scan a scene 706, as is illustrated in FIG. 18., As the imager 712 translates in the illustrated direction, any particular point in the scene 706—e.g., point A in FIG. 18—is imaged along multiple chief rays 804, 806 and 808 in the reference frame of the imager 712. In addition, as illustrated in FIG. 19, the imager 712 need not move in a straight line, but can travel along any path 1902, and furthermore, can be simultaneously translated and rotated. In addition, although the filters illustrated in FIGS. 7-18 are primarily depicted as varying from top to bottom, a filter 704 in accordance with the present invention can vary in any and all directions. For example, the properties of the filter 704 can vary azimuthally, in which case the mosaic procedure can include rotating the imager 712 about its optical axis in order to capture the images for processing. Furthermore, although a filter 704 can be mounted to the camera in a non-flexing and/or non-moving manner, a filter which flexes or moves with respect to the camera 702 can also be used. In such a system, the filter can be flexed or moved between each frame of a sequence of images.

Figure 20A:
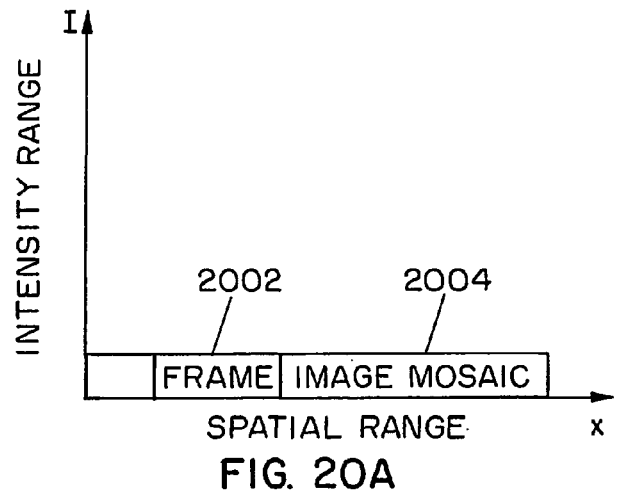
FIG. 20A is a graph illustrating the spatial and intensity ranges of an exemplary procedure for image mosaicing in accordance with the present invention.
Figure 20B:
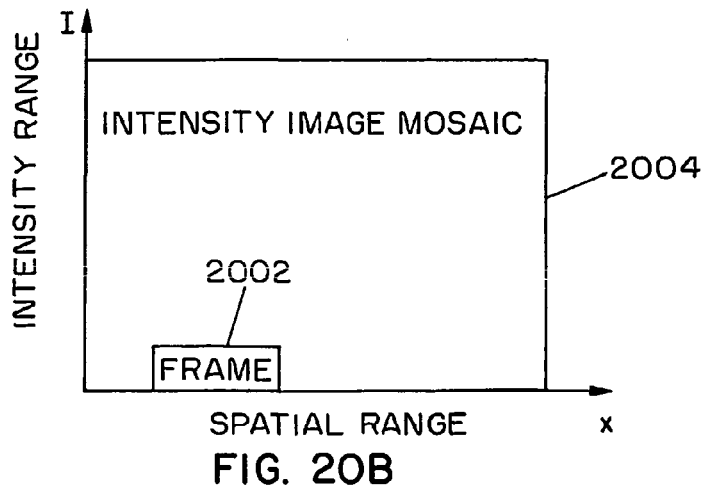
FIG. 20B is a graph illustrating the spatial and intensity ranges of an additional exemplary procedure for image mosaicing in accordance with the present invention.
Figure 21:
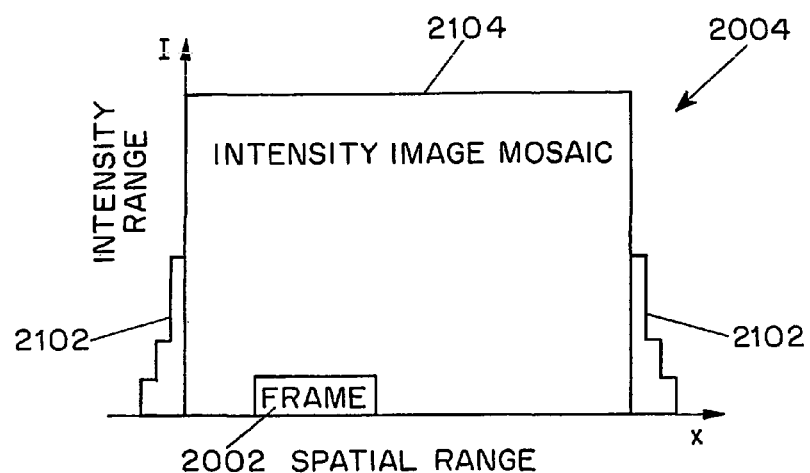
FIG. 21 is a graph illustrating the spatial and intensity ranges of yet another exemplary procedure for image mosaicing in accordance with the present invention.

As illustrated in FIGS. 20A and 20B, image mosaicing techniques in accordance with the present invention can be used to extend both the spatial range (i.e., the width or height of the field of view) and the total intensity range (and accordingly, the dynamic range) of the image measurements. FIG. 20A illustrates the difference in the spatial ranges of a single frame 2002 and an image mosaic 2004. The image mosaic 2004 has been constructed from multiple frames. FIG. 20B illustrates the enhanced spatial range and enhanced intensity range of an image mosaic 2004. In practice, because the pixels near the edges of the mosaic 2004 are sampled fewer times, the total intensity range of the edge pixels is likely to be less than the intensity range of pixels in the center of image mosaic 2004. This effect can be seen in the graph of FIG. 21, which illustrates that in the regions 2102 near the edges of the spatial range of the image mosaic 2004, the total intensity range falls off. However, in the portion 2104 which is further away from the edges, the intensity range is uniformly high. This effect is analogous to the foveated vision of the human eye—which has greater resolution near the center of the field of view—and can be advantageous for applications in which the center portions of a scene are of greater interest than the edge portions, and are therefore preferably imaged with higher resolution than the edge portions.

Figure 22A:
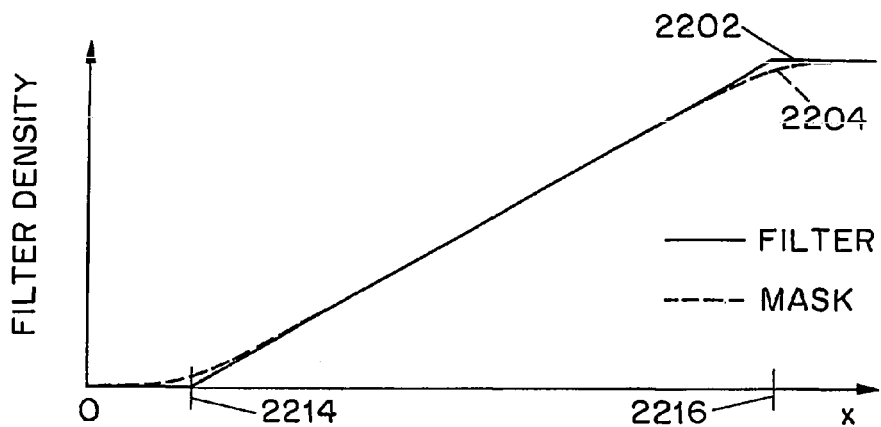
FIG. 22A is a graph illustrating a density profile of an exemplary filter and corresponding effective mask characteristic in accordance with the present invention.
Figure 22B:
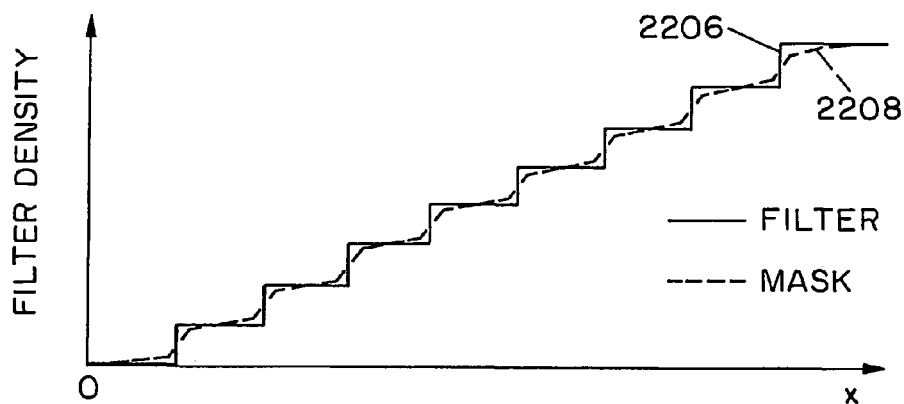
FIG. 22B is a graph illustrating a density profile of an additional exemplary filter and corresponding effective mask characteristic in accordance with the present invention.
Figure 22C:
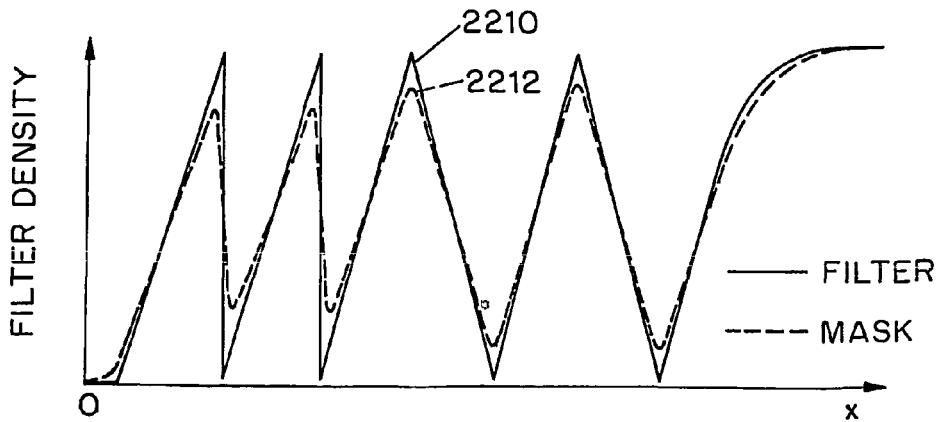
FIG. 22C is a graph illustrating a density profile of yet another exemplary filter and corresponding effective mask characteristic in accordance with the present invention.

As discussed above, because an externally mounted filter tends to be out of focus with respect to the detector of a camera, the effect of such a filter upon the camera characteristics tends to be blurred. For example, FIG. 22A illustrates a filter density function 2202 in which the density D varies linearly across one dimension of the surface of the filter, between a first position 2214 and a second position 2216, but is constant outside this range. The transmittance T equals $10^{-D}$, and therefore, the corresponding intensity sensitivity characteristic function of the resulting imager varies exponentially across the filter. The effective density function 2204 of the filter has rounded corners due to blurring of the filter density function 2202. Similarly, as illustrated in FIG. 22B, a filter having a density function 2206 with steps will have an effective density function 2208 with rounded corners. As illustrated in FIG. 22C, a filter mounted externally to a camera can have any arbitrary density function 2210, but if the function 2210 has sharp corners, the effective function 2212 will have rounded corners.

In general, for a spatially varying attenuation mask function f, the effective mask function M can be modeled as:

$$M(x,y)=f(x,y)*h(x,y) \qquad (25)$$

where h(x,y) is the defocus blur point spread function (PSF) of the camera for objects as close as the filter, when the system is focused at the distant scene. For circularly symmetric PSFs' the mask is effectively a one dimensional function of x, and f is convolved with ħ, the Abbel transform of h. For example, if the kernel is modeled as a Gaussian function, then h is a Gaussian function having a standard deviation r, and $M(x)=\text{erf}(-x/r)$. Since M(x) takes any value between 0 and 1, then in principle any scene point can be imaged without saturation, regardless of how bright the point is, if it is seen through the filter at the appropriate location. Therefore, this simple system theoretically can have an infinite dynamic range.

Figure 23:
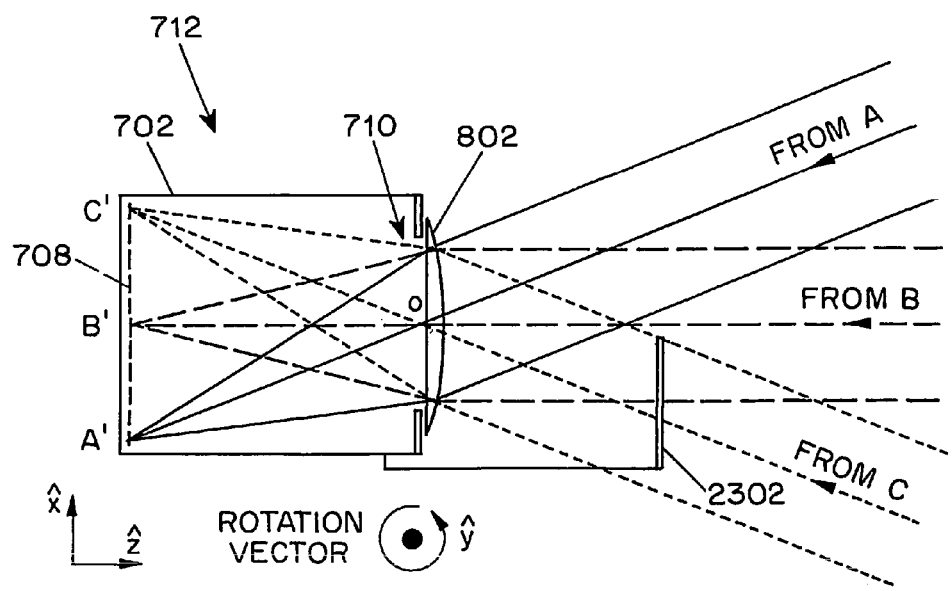
FIG. 23 is a diagram illustrating an exemplary system for image mosaicing in accordance with the present invention.
Figure 24A:
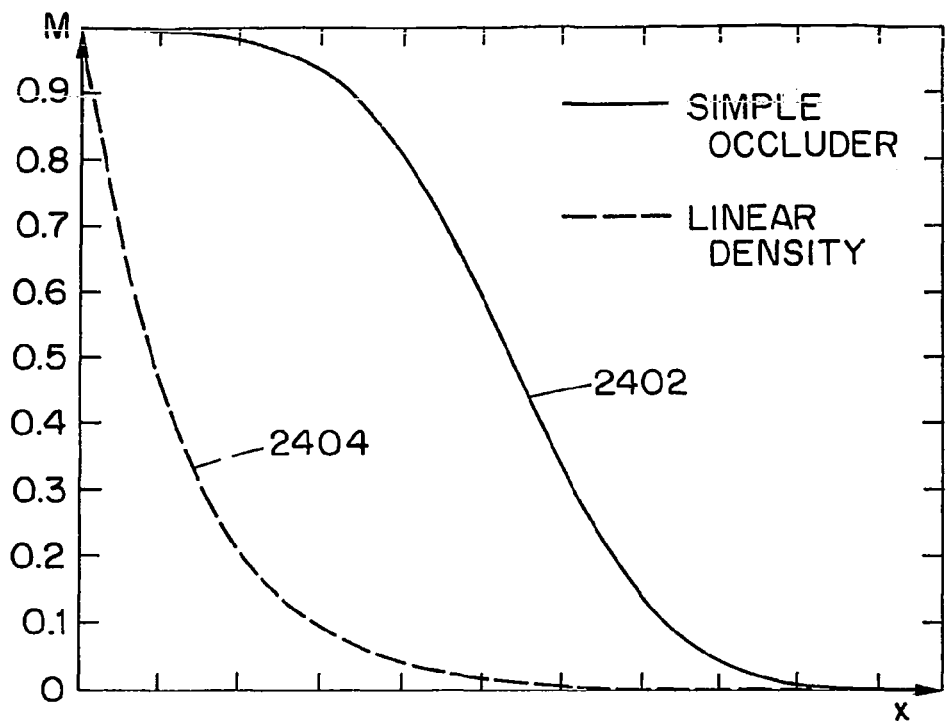
FIG. 24A is a graph illustrating effective density profiles of exemplary imager attachments in accordance with the present invention.
Figure 24B:
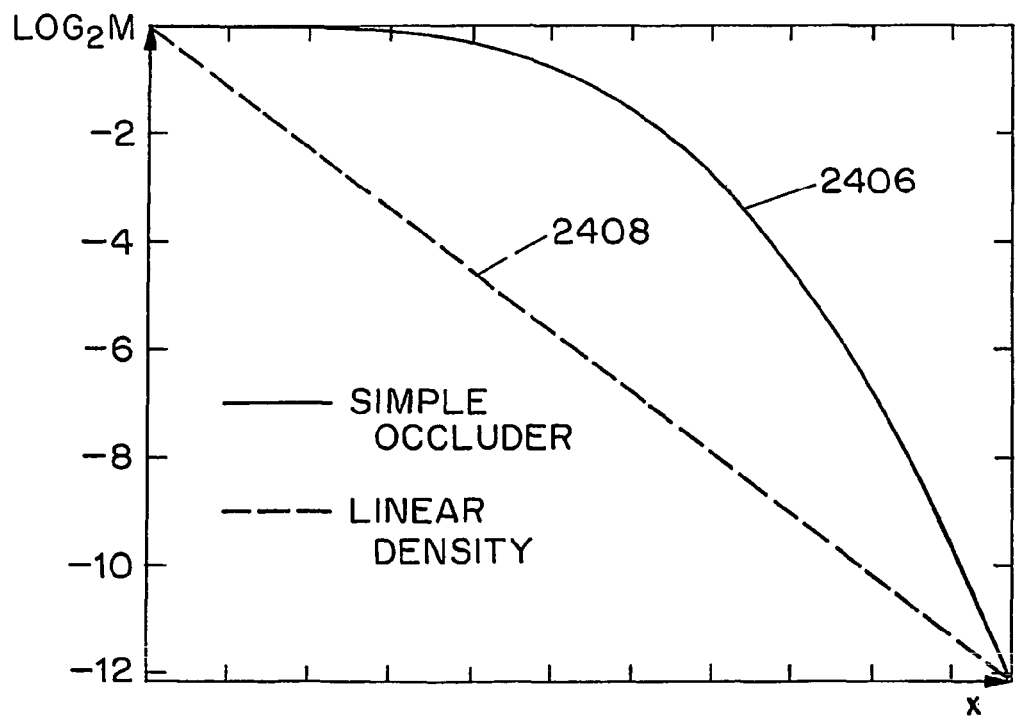
FIG. 24B is a graph illustrating logarithmic functions of the profiles illustrated in FIG. 24A.

The effect of the blurring of an externally mounted attachment can be further illustrated using as an example a simple occluder 2302, as depicted in FIG. 23. Although the occluder 2302 itself clearly has an abrupt spatially varying characteristic, its effect on the characteristics of the camera 702 varies more gradually across the field of view of the camera 702, as illustrated in FIGS. 24A and 24B. FIG. 24A illustrates the more rounded effective density function 2402 of the simple occluder 2302. FIG. 24B illustrates the logarithm of the effective density function 2406 of the simple occluder 2302. In addition, the blurring effect on the effective density function 2404 of a linearly varying density filter is also illustrated in FIG. 24A. The logarithm of 2408 of the effective density function 2404 of the linearly varying density filter is illustrated in FIG. 24B. The logarithmic function 2408 is a straight line.

The above-described blurring effect which tends to occur in imagers having externally mounted optical elements can be advantageous for the adjustability of an imager, because the optical characteristics of the imager can be altered merely by changing the position of the optical element, along the optical axis of the imager. For example, the slope near the middle of the effective density function 2402 of a simple occluder 2302 (see FIGS. 24A and 23) can be increased by moving the occluder 2302 closer to the focal distance of the camera 702 and decreased by moving the occluder 2302 farther away from the focal distance of the camera 702.

Figure 25A:
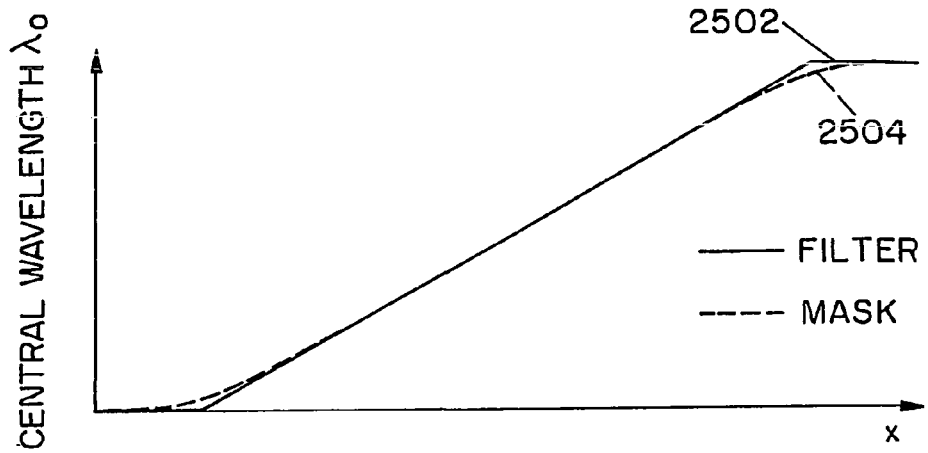
FIG. 25A is a graph illustrating a central wavelength profile of an exemplary filter and corresponding effective mask characteristic in accordance with the present invention.
Figure 25B:
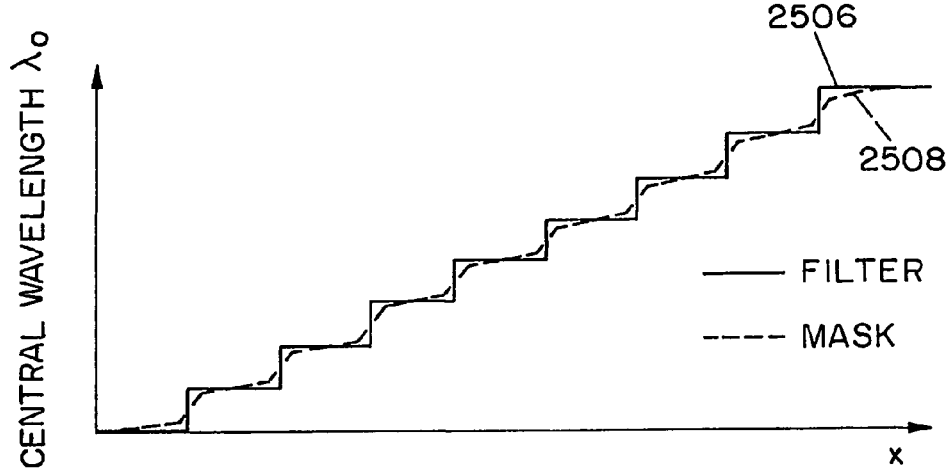
FIG. 25B is a graph illustrating a central wavelength profile of an additional exemplary filter and corresponding effective mask characteristic in accordance with the present invention.
Figure 25C:
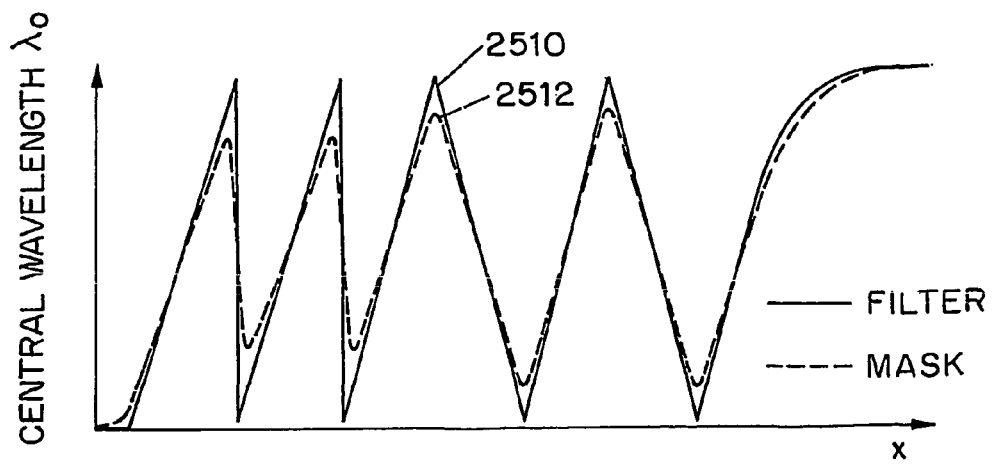
FIG. 25C is a graph illustrating a central wavelength profile of yet another exemplary filter and corresponding effective mask characteristic in accordance with the present invention.

Although the above discussion has emphasized spatially varying, wavelength-neutral density filters which result in imagers having spatially varying wavelength-neutral intensity sensitivity characteristics, it is also possible to employ a spatially varying color filter or other wavelength-based filter. Such a spatially varying wavelength filter can, for example, be a spatially varying bandpass filter (e.g., an interference filter) having a spatially varying central wavelength $\lambda_0$. FIG. 25A illustrates a function 2502 of central wavelength $\lambda_0$ versus position x across a filter having a central wavelength $\lambda_0$ which varies linearly across the field of view. The filter function 2502 produces an imager having a wavelength sensitivity characteristic function 2504 which also varies approximately linearly across the field of view, but has rounded corners. FIG. 25B illustrates an example of a filter having a central wavelength characteristic function 2506 which varies in steps across the field of view. Such a filter results in an imager having a wavelength sensitivity characteristic function 2508 which roughly corresponds to the step-wise function 2506 of the filter, but which has rounded corners dueto blurring, because the filter is somewhat out of focus with respect to the camera. As illustrated in FIG. 25C, a bandpass filter having any arbitrary central wavelength function 2510 can be used, but if the function 2510 of the filter has sharp corners, the resulting imager will have a wavelength sensitivity characteristic function 2512 with more rounded corners.

Figure 26A:
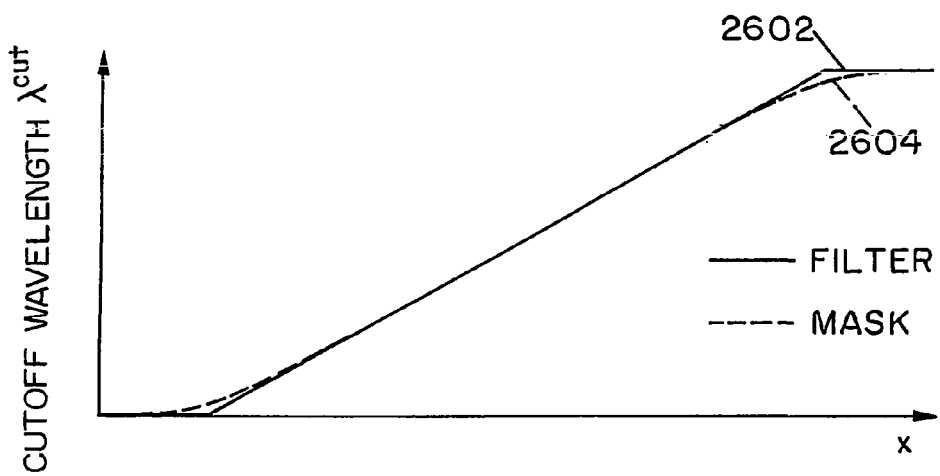
FIG. 26A is a graph illustrating a cutoff wavelength profile of an exemplary filter and corresponding effective mask characteristic in accordance with the present invention.
Figure 26B:
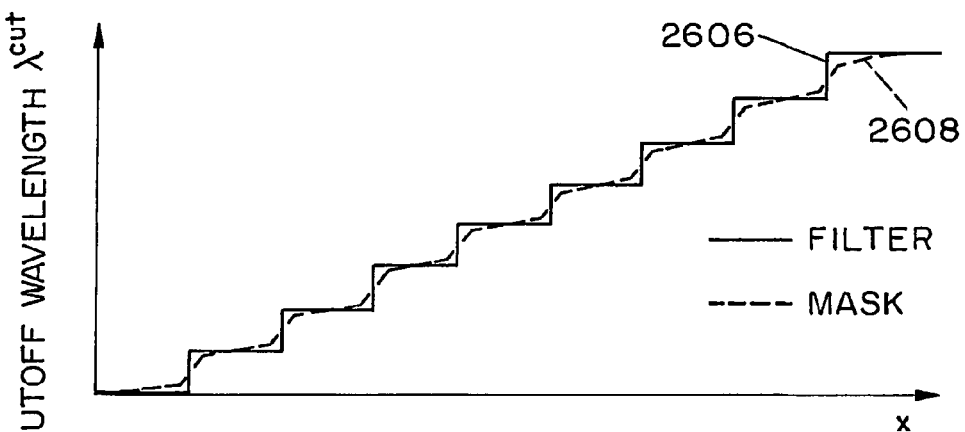
FIG. 26B is a graph illustrating a cutoff wavelength profile of an additional exemplary filter and corresponding effective mask characteristic in accordance with the present invention.
Figure 26C:
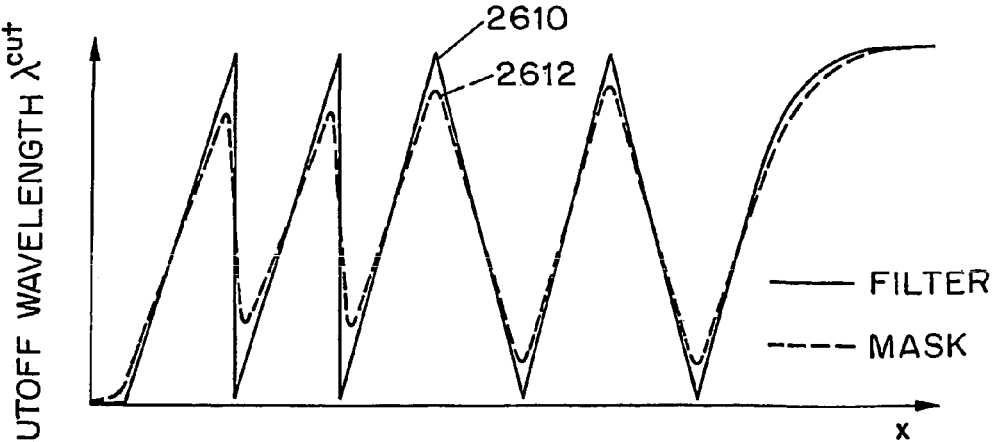
FIG. 26C is a graph illustrating a cutoff wavelength profile of yet another exemplary filter and corresponding effective mask characteristic in accordance with the present invention.

An imaging system in accordance with the present invention can also employ a spatially varying low pass or high pass filter. For example, FIGS. 26A-26C illustrate exemplary functions 2602, 2606, and 2610 of cutoff wavelength $\lambda^{cut}$ versus position x across exemplary low pass or high pass filters. Similarly to the filters illustrated in FIGS. 22A-22C and 25A-25C, blurring causes rounding of the respective wavelength sensitivity characteristic functions 2604, 2608, and 2612 of the imagers formed using the respective filters.

Figure 27:
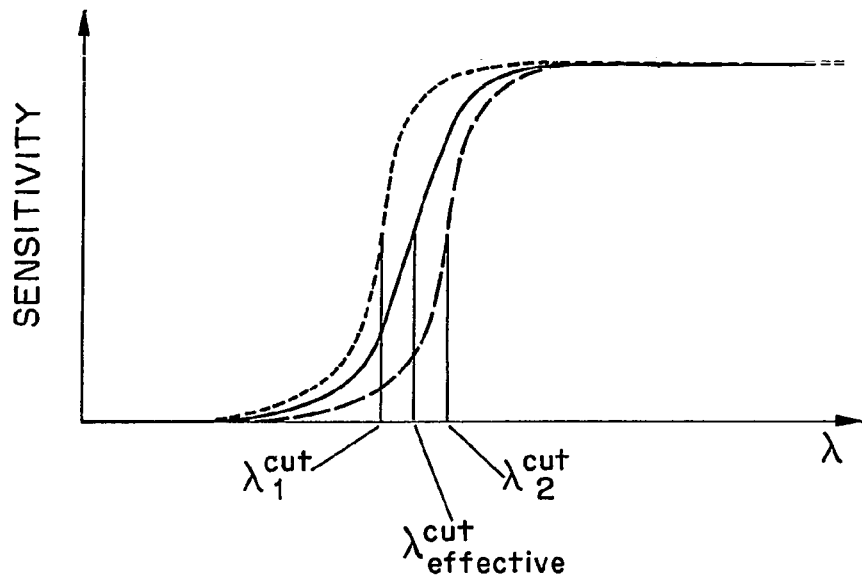
FIG. 27 is a graph illustrating a portion of a sensitivity characteristic of an exemplary imager having a high pass filter array in accordance with the present invention.

The blurring effect is further illustrated by FIG. 27 which is a graph of detector sensitivity versus wavelength $\lambda$ for a light ray bundle having a chief ray near the border of two segments of a high pass filter array. Half of the light in the beam passes through a segment having a cutoff wavelength of $\lambda_1^{cut}$, and the other half of the beam passes through a segment having a cutoff wavelength of $\lambda_2^{cut}$.

The effective cutoff wavelength of the detector is $\lambda_{effective}^{cut}$, which is between $\lambda_1^{cut}$ and $\lambda_2^{cut}$.

Compared to the respective transition bands of the two individual segments, the transition band for the beam having a chief ray on the border is broader.

Similarly to spatially varying attenuating filters, discussed above, the effective characteristics of a wavelength filter can also be adjusted by changing the filter's position along the optical axis of the imager. In particular, the filter's features become sharper, less rounded, and more highly sloped if the filter is closer to the focal distance of the camera, and the features become more rounded and less highly sloped as the filter is moved away from the focal distance of the camera. In fact, a step-wise array of wavelength filters—of which exemplary characteristics 2506 and 2606 are illustrated in FIGS. 25B and 26B, respectively—can, if sufficiently out of focus, be used to approximate a linearly varying filter—of which exemplary characteristics 2502 and 2602 are illustrated in FIGS. 25A and 26A, respectively.

Figure 28:
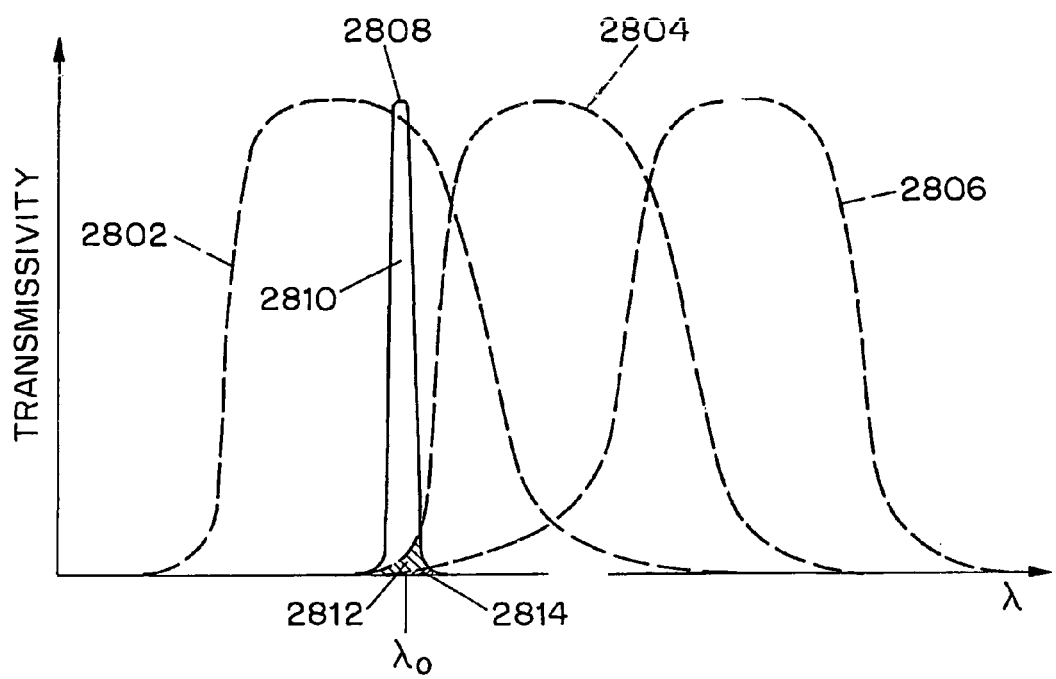
FIG. 28 is a graph illustrating sensitivity characteristics of an exemplary imager having a narrow band filter in accordance with the present invention.

A spatially varying bandpass filter in accordance with the present invention can also be used to enhance the precision (i.e., the dynamic range) of a color imager with respect to discrimination among the wavelengths of signals received from a scene. As illustrated in FIG. 28, a typical color imager (e.g., a color camera) has three relatively broad color channels 2802, 2804, and 2806, receiving blue, green, and red light, respectively. By attaching to the imager a filter having a relatively narrower pass band 2808, the imager's ability to discriminate among wavelengths is enhanced. For example, if the pass band 2808 of the narrow band filter is within the broader blue band 2802 of the camera, the blue light 2810 ultimately detected by the camera is much stronger than the green and red light 2812 and 2814. Accordingly, because the characteristic 2808 of the narrow hand filter is not as broad as the characteristics 2802, 2804 and 2806 of the original camera, color is determined with finer detail than merely designating a signal as "blue." The central wavelength $\lambda_0$ of the pass band 2808 of the narrow band filter varies across the field of view, and therefore, by panning the imager across the scene and capturing multiple images, each point of the scene is imaged within multiple color bands, each having a different central wavelength $\lambda_0$. As a result, the spectral characteristics of light emanating from each point of the scene are determined with greater color resolution.

Figure 29:
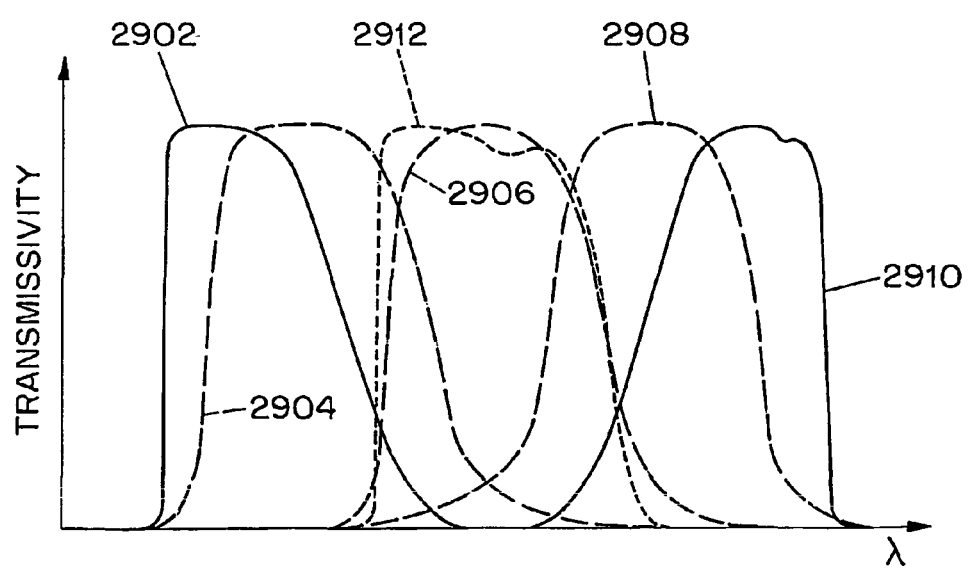
FIG. 29 is a graph illustrating sensitivity characteristics of an exemplary imager having a set of broad band filters in accordance with the present invention.

FIG. 29 illustrates the use of an external color filter divided into three large portions, a blue filter portion having a blue bandpass characteristic 2904, a green filter portion having a green bandpass characteristic 2906, and a red filter portion having a red bandpass characteristic 2908. The three-color filter array is mounted externally to a color camera having its own set of three-color channels, as defined by the band pass characteristics 2902, 2912, and 2910 of the blue, green and red light, respectively, passed through to the detector in the camera. As the imager pans across a scene, each portion of the scene is viewed and imaged through the external blue filter portion, the external green filter portion, and the external red filter portion. As a result, each of the blue, green, and red characteristics 2904, 2906, and 2908 of the respective filter portions is used in combination with each of the blue, green, and red characteristics, 2902, 2912, and 2910 of the camera itself. The imager therefore effectively has nine color bands, representing all of the possible combinations of sensor channels and external filter element characteristics. Accordingly, the color resolution of the camera is enhanced. In general, if the camera itself has $N_s$ bands, and the additional mask has $N_m$ bands, then the imager as a whole can measure $N_s N_m$ bands.

Figure 31:
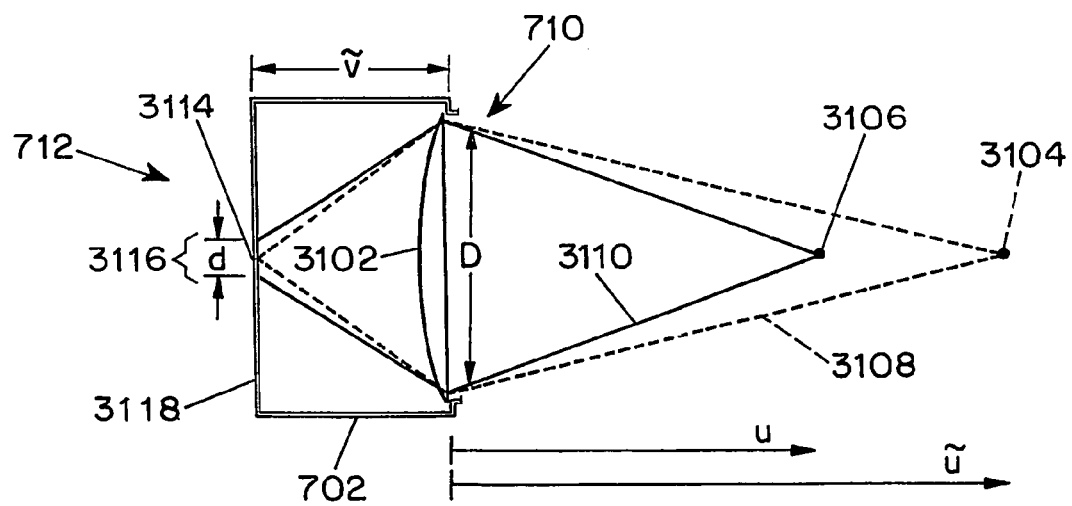
FIG. 31 is a diagram illustrating the focal characteristics of an exemplary camera.

In accordance with an additional aspect of the present invention, an imager having spatially varying focal characteristics can be panned across a scene, and the distances of scene points from the imager 712 can be determined based upon how well focused each scene point is in each image of a set of images captured during the panning of imager 712. FIG. 31 illustrates the response of an imager 712 to light ray bundles 3108 and 3110 emanating from an in-focus portion 3104 of a scene and a defocused portion 3106 of a scene, respectively. An objective lens 3102 is positioned at a distance $\tilde{v}$ from the focal plane 3118 of a camera 702. The in-focus scene point 3104 is projected as a single point 3114 onto the focal plane 3118. However, the defocused scene point 3106 is projected onto the focal plane 3118 as a disk 3116 having a diameter d.

In general, objects at distance $\tilde{u}$ from the aperture 710 of the camera 702 are in focus, and accordingly, any object which appears to be in focus is at distance $\tilde{u}$. In contrast, any object which appears to be out of focus is known to be at a different distance (e.g., u) from the aperture 710.

An imager can be configured such that the distance $\tilde{u}$ at which objects are in focus varies across the field of view of the imager. If the variation of the focal characteristic is sufficiently large, and enough snapshots are taken, then all or most of the points in the scene will, in at least one of these snapshots, be in focus or nearly in focus. By determining the particular chief ray received by the imager along which the object is in focus, and by knowing the spatially varying focal characteristics of the imager, the distance of every scene point can be determined by the following procedure.

Any optical system has a range of distances at which objects are in focus or nearly in focus, while becoming blurred as they move away from the range. The size of this range is commonly referred to as the "depth of field" of the system. An imaging system in accordance with the present invention converts this range of distances/depths to a range of locations within the imager—along the optical axis of the imager. The size of this range of locations can be referred to as the "depth of focus." In many applications the range of depths in which scene objects reside is wider than the depth of field, and therefore, some objects will be defocused. Referring to the imaging system depicted in FIG. 31, the blur diameter d of an object point at distance u is:

$$d = D \frac{|uF - \tilde{v}u + F\tilde{v}|}{Fu}, \quad (26)$$

where F the focal length and D is the aperture of the lens. It is possible to capture multiple images of the object with different focus settings (e.g., by moving internal parts of the system such as the lens or the detector during acquisition). The focused state of an object point is usually detected by selecting the image which maximizes image sharpness at the image point corresponding to the object point. Furthermore, a completely sharp image of the entire scene can be constructed using a "fusion" procedure. Such a procedure selects, for each scene region or scene point, the corresponding point in the image in which the scene region or point is sharpest. The entire set of selected points is then combined to form a sharp image of all or most of the scene points.

Other techniques can also be used to measure the distances/depths of scene points. For example, if the focus settings are changed by changing $\mathbf{v}$, and sharpness is measured by the image Laplacian, then the place v of best focus can be estimated as:

$$v = \arg\,\max|\nabla^2_{x,y} I_{\tilde{v}}(x,y)| \quad (27)$$

where $\nabla_{x,y}^2$ denotes the Laplacian in the image plane, and each image I (x,y) is parameterized by $\mathbf{v}$—i.e., defined as a function of $\mathbf{v}$. Note that once the plane of best focus is determined, it can be used to infer the depth u of the object point. Moreover, the depth can also be inferred not only by seeking the plane of best focus, but by estimating the blur diameter d using a method called "depth from defocus" based on two or more frames. The "depth from defocus" technique is discussed in detail in U.S. Pat. No. 6,229,913, entitled "Apparatus and Methods for Determining the Three-Dimensional Shape of an Object Using Active Illumination and Relative Blurring in Two-Images Due to Defocus," issued on May 8, 2001 to Nayar et al., which is incorporated herein by reference in its entirety.

A scene point is represented, in an image, by a region having a size corresponding to a position uncertainly U (i.e., an amount of blur) which can be due to aberration, diffraction blur, or the finite distance $\Delta x_{grid}$ between adjacent elements of the detector array. If the blur diameter d is no larger than U, the scene point is considered to be within the depth of field of the system and is thus considered to be focused. Because the blur diameter depends on the distance from the state of best focus, a change of U in d corresponds to a particular change in depth (i.e., distance). Consider, for example, a case in which a component of the imaging system is moved by an amount $\Delta v$ in order to capture a set of images over a particular interval of depth of field. Instead of physically changing $\Delta v$, the optical path length can be changed using a piece of transparent dielectric having a refractive index n. To make the adjustment, the thickness t or refractive index n of the dielectric should change. In fact, both approaches can be applied together. According to the rate at which the thickness or refractive index changes across the field of view, the system calculates the inter-frame transversal increment which yields the desired, effective axial change over the selected interval of depth of field.

It is possible to avoid moving parts by moving the entire optical system closer to, or farther from, the scene objects.

However, such an approach is practical only if the range of depths is very small, such as in microscopy applications. On the other hand, if a piece of transparent dielectric such as glass or polycarbonate is placed on the detector, the optical path length between the detector and the lens(es) becomes longer. For a material having an index of refraction n, each millimeter of material along a light ray is equivalent to propagation through n millimeters free space. This effectively elongates a portion of $\mathbf{v}$ by a factor of n (if the refractive element is internal to the camera) or elongates a portion of ũ (if the refractive element is external to the camera). Thus, object points which had been focused become defocused. On the other hand, some object points which would otherwise be focused on a plane behind the detector plane now become focused on the detector.

Figure 32A:
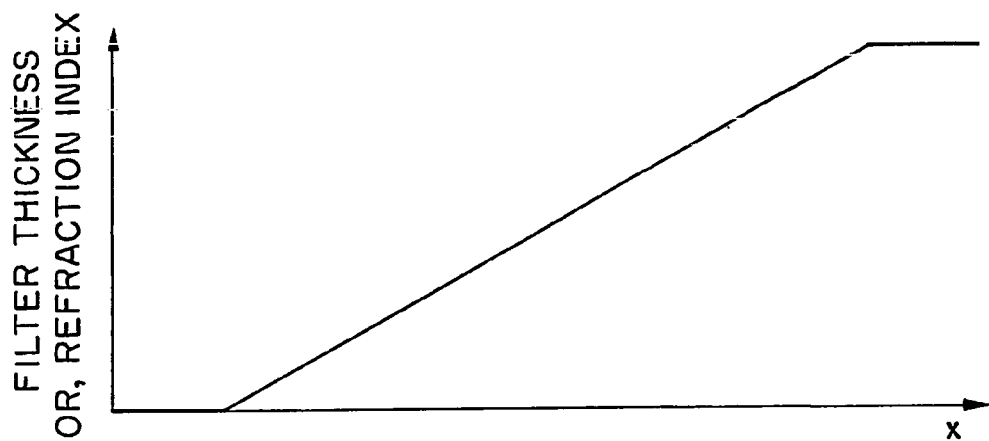
FIG. 32A is a graph illustrating a refraction profile of an exemplary refractive element in accordance with the present invention.
Figure 32B:
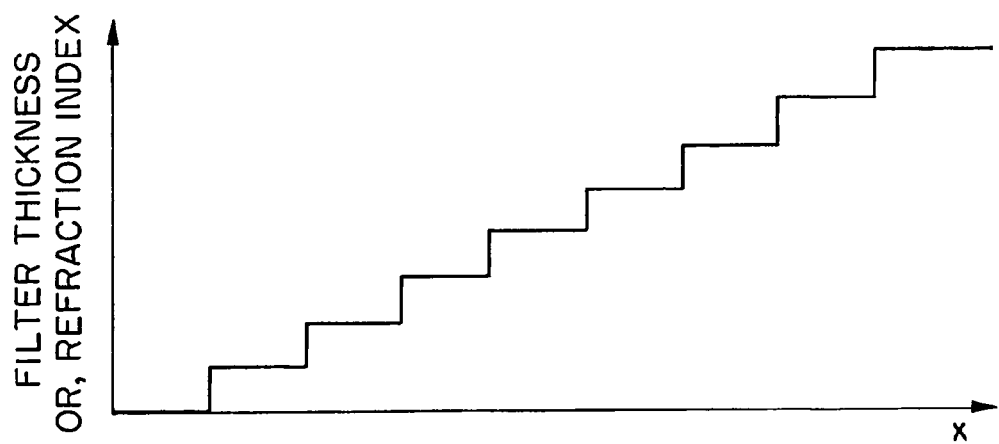
FIG. 32B is a graph illustrating a refraction profile of an additional exemplary refractive element in accordance with the present invention.
Figure 32C:
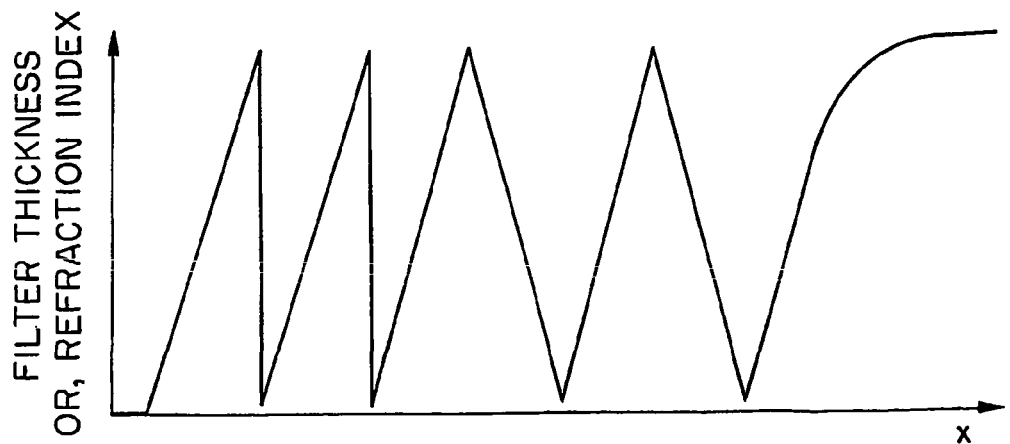
FIG. 32C is a graph illustrating a refraction profile of yet another exemplary refractive element in accordance with the present invention.

An example of a spatially varying, refractive element in accordance with the invention is a piece of transparent material having a thickness that varies across the field of view. Alternatively, or in addition, to the spatially varying thickness, the filter can have a spatially varying refractive index. Examples of the characteristics of such filters are shown in FIGS. 32A-32C. FIG. 32A illustrates the refractive properties of a prism or a refractive element having a linearly varying index. Such an element, if placed outside the optical system—such as outside the imager 712 illustrated in FIG. 8—will primarily only deflect the field of view, thereby changing the center of projection of the system, and will aid little in extending the depth of field of the imager. Therefore, it is preferable to position this element on or near the detector—such as in the imager 712 illustrated in FIG. 11. If an intermediate image is formed on a diffuser 1406—such as in the imager 712 illustrated in FIG. 14—then the element 1402 is preferably positioned immediately before the diffuser.

If the refractive properties and/or the thickness of the refractive element vary as a function of position within the field of view, then the resulting imager will have a spatially varying focal characteristic. In the example in FIG. 32B, the thickness or refractive index of the refractive element varies in a step-wise fashion. In fact, the refractive element can have a thickness or refractive index which varies according to any arbitrary function, as illustrated in FIG. 32C.

Figure 33:
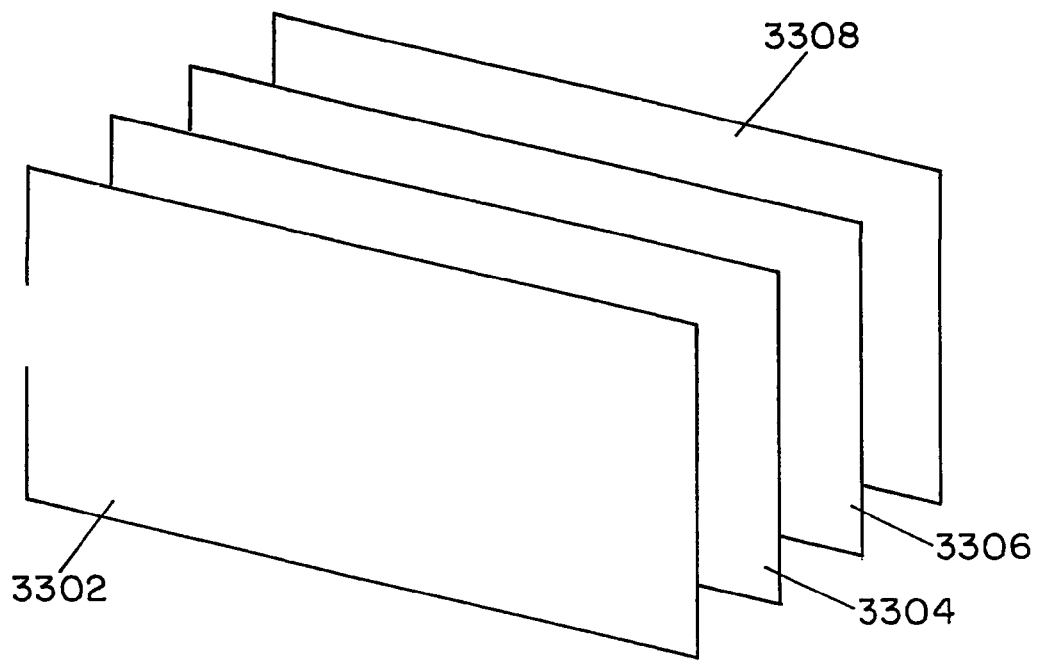
FIG. 33 is a diagram illustrating an exemplary arrangement of a set of optical elements in accordance with the present invention.

The foregoing discussion has described the use of imagers which have sensitivity of focal characteristics which vary across the field of view. As discussed above, such spatially varying sensitivity or focal characteristics can include a spatially varying intensity sensitivity characteristic (e.g., resulting from a spatially varying attenuator), a spatially varying wavelength sensitivity characteristic (e.g., resulting from a spatially varying color filter), a spatially varying polarization sensitivity characteristic (e.g., resulting from a spatially varying polarizing filter), and/or a spatially varying focal characteristic (e.g., resulting from a spatially varying refractive element). In accordance with an additional aspect of the invention, two or more of the aforementioned properties can be combined in a single imager. For example, as illustrated in FIG. 33, some or all of a spatially varying attenuator 3302, a spatially varying spectral filter 3304, a spatially varying polarizing filter 3306, and a spatially varying refractive element 3308 can be simultaneously attached internally or externally to a camera, thereby producing an imager having multiple characteristics which vary across the field of view of the imager.

In some cases, each characteristic of light is independent of the other characteristics. For example, in volumetric objects each image point receives light from multiple (or a continuum of) points having different depths. The light emanating from any of these points can include light which originated from different points or regions of the scene (e.g., scattering or emission from different points or regions of the scene). As a result, each spectral component may have a different polarization, a different brightness and a different state of focus.

Figure 34:
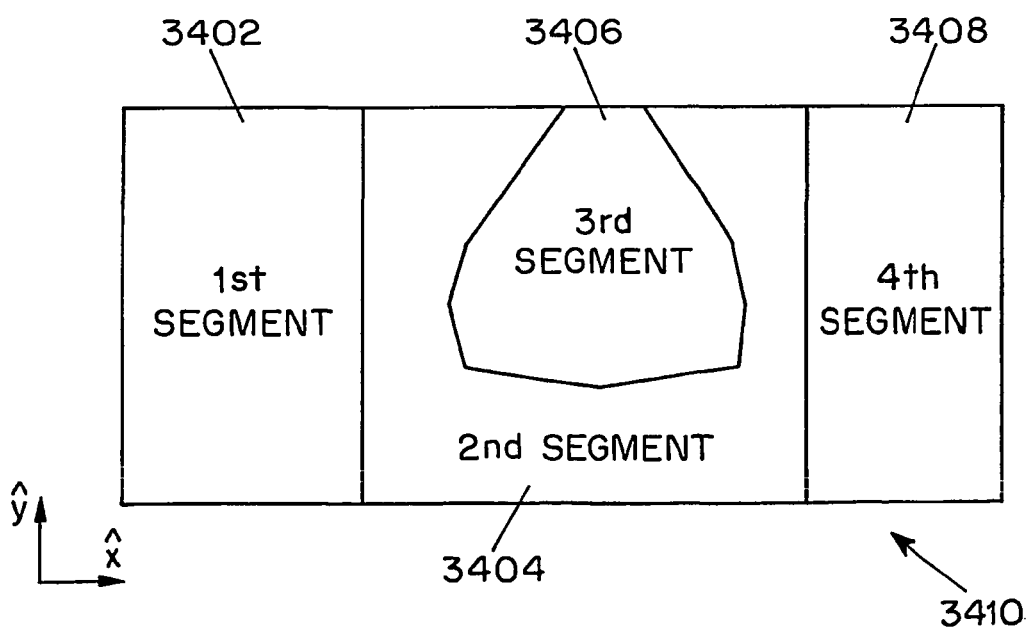
FIG. 34 is a diagram illustrating an exemplary optical element in accordance with the present invention.

However, in most cases, some of the characteristics can be degenerate or highly coupled. For example, some of the radiation which comes from a specific depth—within a specific polarization component and spectral band—may be too strong to be detected without saturation, and therefore, the intensity order of magnitude should preferably be sensed with a wide brightness dynamic range filter. In addition, if the object is not three-dimensional then the depth measurement should be done separately from the spectral and polarization measurements. In particular, to avoid errors of depth estimation caused by detector saturation, it may be beneficial to extend the brightness dynamic range by using variable density filtering within a filter having a variable thickness or variable refractive index. In such cases, multiple independent measurements should be preferably performed at each pixel position, using all of the possible combinations of bandwidth sensitivity, polarization angle sensitivity, and intensity sensitivity. Such measurements can be performed by an imager configured to use a compound filter having various regions, each region being dedicated to the spatial variation of a particular sensitivity characteristic. For example, as illustrated in FIG. 34, a filter 3410 having a first segment 3402 for spatially varying a first sensitivity characteristic of the imager, a second segment 3404 for varying a second sensitivity characteristic, a third segment 3406 for varying a third sensitivity characteristic, and a fourth segment 3408 for varying a fourth sensitivity characteristic may be used. In addition, the various segments 3402, 3404, 3406, and 3408 need not be defined to have any particular shape or location, or have their respective filter characteristics spatially varying in any particular direction, but can be regions of any shape and/or location, and filter characteristics spatially varying in any direction on the filter 3410.

It is to be noted that the variation of each filter characteristic can be configured to have a different spatial frequency on the filter. For example, the depth can vary as cos x, the neutral density can vary as cos 2x, and the central wavelength can vary as cos 4x. Furthermore, the spatial variation of each filter characteristic need not be sinusoidal. Square wave patterns, saw-tooth patterns, and other patterns can also be used.

On the other hand, certain filter characteristics may not require a separate filter region dedicated to them. For example, the polarization of light coming from a scene point or region will usually not depend strongly on the wavelength of the light. Accordingly a spatially varying polarizing filter can overlap a spatially varying wavelength filter with little or no loss of information. Furthermore, light from all parts of the scene need not be measured with respect to its characteristics, or with the same resolution. In addition, for applications in which speed is more important than completeness of the measurement, a faster scan can be obtained using a set of overlapping filters such as the filters 3302, 3304, 3306, and 3308 illustrated in FIG. 33, rather than the compound filter 3410 illustrated in FIG. 34; the compound filter 3410 typically requires a slower scan to obtain a given resolution.

Once images have been acquired by a scanning procedure in accordance with the present invention, the data acquired at corresponding pixel positions—i.e., pixel positions representing the same scene point—are processed in order to extract the values of high dynamic range intensity, polarization state, depth, and color at each pixel of a processed image. The sequence of images are registered in order to enable fusion of all the raw data gathered for each scene point.

Figure 35A:
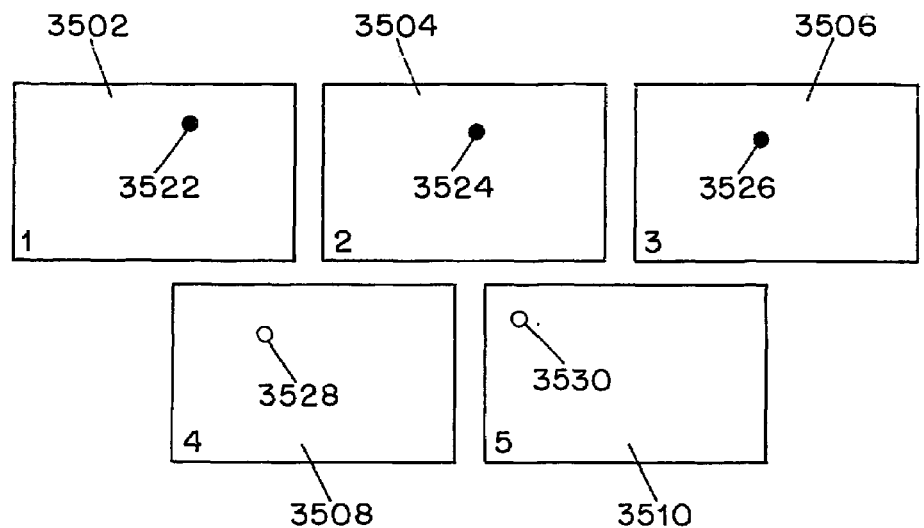
FIG. 35A is a diagram illustrating an exemplary procedure for image portion registration in accordance with the present invention.
Figure 35B:
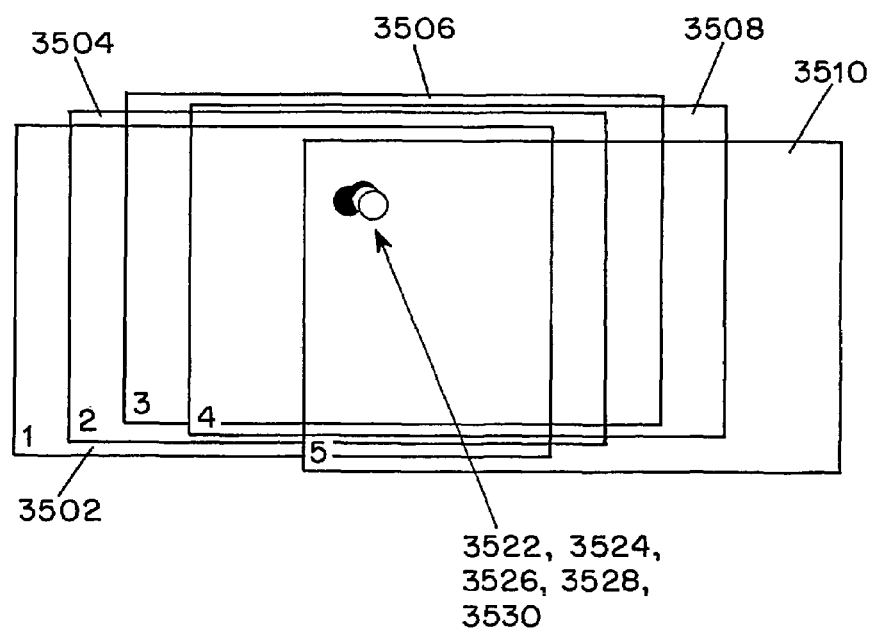
FIG. 35B is a diagram illustrating an additional exemplary procedure for image portion registration in accordance with the present invention.

FIG. 35A illustrates a sequence of snapshots 3502, 3504, 3506, 3508, and 3510 in which light from a scene point is detected at pixel positions 3522, 3524, 3526, 3528, and 3530 in the respective snapshots 3502, 3504, 3506, 3508, and 3510. By determining the position of whichever pixel represents the scene point in each snapshot, the snapshots 3502, 3504, 3506, 3508, and 3510 can be mathematically aligned as illustrated in FIG. 35B, and the data corresponding to the respective pixel positions 3522, 3524, 3526, 3528, and 3530 can be processed to thereby generate an improved quality pixel having enhanced dynamic range, spectral information, polarization information, and/or depth information, as discussed above with respect to various image mosaicing techniques in accordance with the present invention. The registration procedure can include one or more of the following approaches:

1. The motion between frames may be known. This is the case when the imaging system is mounted on a motor and its speed is calibrated in terms of the shift in viewing direction between successive images. This may also be the case for images taken from a satellite, plane, or other vehicle whose position is monitored.

2. The images can be manually registered, e.g., by matching control patches in the images. These patches usually contain prominent image features whose morphology is robust to changes in the characteristics of light from such image features. In other words, the shape of a control patch is similar in different wavelength bands, polarization states, and a broad range of light intensity distributions.

3. The images can be automatically registered by tracking the control patches described in item 2. Such registration procedures are well known. Some methods use higher level descriptions of the features. However, most approaches maximize the correlation or minimize the difference between the patches. Such methods typically perform better if the change undergone by the image between frames is small. Otherwise, the similarity measure may fail. For example, the content of the scene at $\lambda$=630 nm may be totally unrelated to the content at $\lambda$=400 nm. However, if the images are captured using wavelengths which do not differ by large amounts, and the wavelength bands of the light used to capture the images are broad enough, then consecutive images will usually have sufficient similarities to enable them to be matched.

4. The images can be automatically registered by finding the warping parameters, among the images, which provide the best global match. Such approaches are well known. Commonly used criteria for matching include quality variants of the MSE criterion, robust statistics error criteria, and correlation. Such methods are similar to those in item 3 in that they typically perform better if the charge undergone by the image between frames is small. Such approaches provide efficient coarse-to-fine comparison and registration of the images.

5. When the change undergone by the image between frames is large, one may view the matching problem as similar to that encountered when registering images taken with different sensors. Although, between frames, the scene appears to move through the field of view of the imager, the mask characteristically tends to dominate the images, thereby tending to cause such algorithms to register an image translation which is smaller than the correct one, or even to register no translation. It is well known that a possible solution to the foregoing problem is to combine the methods of items 3 and 4. In such a combined method, each image is high-pass filtered to enhance the reliance on prominent features which are more likely to be invariant in the images. The registration is performed using a coarse-to-fine procedure, while optimizing the global warping parameters between the images.

6. Another general way to register images even if the change is large, such as in multi-sensor systems, is to use mutual information—i.e., similarity of features between images—as a criterion for matching. This method generally requires that the images are not completely independent statistically, which is usually a valid assumption.

In some cases, it is possible to partly compensate for the effect of the filter in order to facilitate matching. For example, suppose an imager employs a varying density filter. Such a filter acts as a mask which attenuates each part of the field of view by a factor M which varies across the field of view. Since the mask is multiplicative in this case, it can be beneficial to calculate the logarithm of each image, in order to make the mask function M an additive component. Then, the effect of the mask can be reduced by high-pass filtering the resulting logarithmic images, because the mask is usually slowly varying. If an estimate of M is available before the registration procedure begins, then before starting the procedure, each pixel value of each image can be amplified by the corresponding value of 1/M. This step will alleviate biasing effects on motion estimation, which can be caused by a temporally-constant mask. Measurements which became darker due to strong attenuation will tend to be relatively noisy after being quantized by the sensor. It is preferable to take into account this attenuation-dependent uncertainty when the images are compared and registered.

Note also that the registration can be done with subpixel accuracy if overlapping areas are sampled more densely than the pixel grids of the individual images. Therefore, spatial super-resolution can be obtained concurrently with, or in addition to, the derivation of the multidimensional properties of the scene points.

An exemplary algorithm is based on a rough estimate of the mask M, with uncertainty $\Delta M$. An estimate of 1/M is used to flat field the images. As discussed above, pixels which have been attenuated to be very dark (especially those which are quantized to zero) become noisy due to the map inversion. Therefore, in all the subsequent algorithms, it is preferable to account for the uncertainty of the measurements when they are compared, differentiated, and fused. The method is based on the following principles:

1. Crude flat fielding by 1/M. Let the light intensity falling on the detector when M=1 be I. It is measured in units of $I_{min}^{detector}$, making it dimensionless. The light falling on the detector after the optical filtering is g(x,y)=M(x,y)I(xy). For each measurement $g \pm \Delta g$ the scene irradiance $I \pm \Delta I$ is estimated. The uncertainties are propagated using first-order approximations.

2. Since high dynamic range images are used, errors in dark scene points are considered as significant as bright ones. For example, a 5% error in the bright points should be penalized as much an equivalent error in the dark points. In order to adjust for the brightness of each pixel, the log of each measured scene radiance is calculated—i.e., s=log I—to yield $s \pm \Delta s$.

3. Coarse-to-fine paradigm. As is well known, reliable and efficient approach to registration is to use a pyramid (multi-resolution) representation of the images. After registering and warping the images at a coarse spatial resolution level, the coarse motion estimate serves as an initial condition to improve the transformation estimation at a finer scale, etc. However, in contrast to conventional methods which have ignored data uncertainties, the procedure of the present invention creates a Maximum-Likelihood Pyramid of the images of s; at each level of the pyramid the value representing a certain neighborhood is the most likely value, considering the uncertainties of the contributing pixels.

4. Maximizing the likelihood of the registration. The measurements s are estimated to have Gaussian distributions (although the method is not limited to Gaussian distributions). The best registration is the one which minimizes the Mahalanobis distance between the images.

5. Registration to the mosaic. Registering only pairs of images leads to an accumulation of errors of the estimated image positions in the global coordinate system. Therefore, each new image in the sequence is preferably registered to the latest updated mosaic, and is then fused to the updated mosaic.

The algorithm is explained in further detail as follows. The detector has a response R (which may be nonlinear) within its dynamic range, so that the image value $\tilde{g}$ at the pixel is:

$$\tilde{g} = R(g). \tag{28}$$

Linearizing the response, the estimated intensity $\hat{g}$ at the detector is $$\hat{g} = R^{-1}(\tilde{g}) \tag{29}$$

and thus:

$$\Delta\hat{g} = \left|\frac{dR^{-1}}{d\tilde{g}}\right|\Delta\tilde{g}. \tag{30}$$

Assuming the estimated mask to be independent of the measured signal, $$(\Delta I)^2 = (\Delta\hat{g}/M)^2 + (\hat{g}\Delta M/M^2)^2, \tag{31}$$

where it is assumed that $\Delta\hat{g}$=0.5, because the output of the camera is in the form of integers (0-255 for an 8-bit detector). To avoid potential instability of the log operation at dark points (where I=0), dark points can be eliminated from the subsequent calculations. Therefore, it is preferable to use s=log (1+I), rather than I, for the calculation. In any case, $$\Delta s = \left|\frac{ds}{dI}\right|\Delta I. \tag{32}$$

Note that if the response R of the detector is logarithmic as, there is no need to use Eqs. (29)-(32); s can be set equal to $\hat{g}$. Any image pixel considered to be saturated (e.g., $\hat{g}$ close to 255 for an 8 bit detector), is treated as being very uncertain. Thus, its corresponding $\Delta s$ is set to be a very large number (i.e., out of the system's dynamic range).

The measurements of s are assumed to be Gaussian. Therefore, for two independent measurements $s_1 \pm \Delta s_1$ and $s_2 \pm \Delta s_2$, the log-likelihood for a value se behaves like as follows:

$$\log Likelihood \sim -E^2 \equiv -\left(\frac{s_e - s_1}{\Delta s_1}\right)^2 - \left(\frac{s_e - s_2}{\Delta s_2}\right)^2. \tag{33}$$

The maximum likelihood solution for $s_e$ is the one which minimizes the Mahalanobis distance E:

$$S_e = \hat{\Delta s}^2 \left(\frac{s_1^2}{\Delta s_1} + \frac{s_2^2}{\Delta s_2}\right), \tag{34}$$

where:

$$\hat{\Delta s}^2 = \left(0.5 * \frac{d^2 E^2}{dS_e^2}\right)^{-1} = \left(\frac{1}{\Delta s_1^2} + \frac{1}{\Delta s_2^2}\right). \tag{35}$$

Then, the distance values for the image measurements that correspond to this scene point is:

$$\hat{E}^2 = \left(\frac{\hat{s} - s_1}{\Delta s_1}\right)^2 + \left(\frac{\hat{s} - s_2}{\Delta s_2}\right)^2. \tag{36}$$

Assuming all pixels in the image to be independent, the distance measure $\hat{E}_{total}$ for the entire frames, or for any other subgroup of pixels is:

$$\hat{E}_{total}^2 = \sum_{all\ pixels} \hat{E}^2(\text{each pixel}). \tag{37}$$

The best registration between two frames (or between a new frame and an existing mosaic) according to the above objective function is the one which minimizes $\hat{E}_{total}$. Here, each pair of measurements $s_1$ and $s_2$ corresponds to the values of the images at the corresponding pixels.

Note that $\hat{E}_{total}$ will generally increase with the number of pixels. This may bias the registration towards minimizing the number of pixels in the sum in Eq. (37), thus reducing the overlap between the images. To counter this effect, Eq. (37) can be normalized by the number of pixels in the overlap area, or by $\Delta s_{total}^{-1}$, or $\Delta s_{total}^{-2}$, etc., where:

$$\Delta s_{total}^2 \equiv \left(\sum_{all\ pixels} \hat{\Delta s}_{each\ pixel}^{-2}\right)^{-1}. \tag{38}$$

If the statistical dependence between different measurements or between different pixels cannot be neglected, then the equations for $$\hat{E}^2 \text{ and } \hat{E}_{total}^2$$

can be generalized to use the covariance matrix of the measurements, rather than just their variances.

To make the registration more robust and efficient, it is done hierarchically, from coarse to fine resolution. A coarse representation of an image at a specific pyramid level can be obtained by sub-sampling the image after lowpass filtering it with a kernel having a width which depends on the level (the higher/coarser the level, the wider is the kernel which operates on the original image). In any case, the value of a pixel in this representation is a weighted and normalized sum of the measured pixel:

$$s = \frac{\sum_k \omega_k s_k}{\sum_k \omega_k}. \tag{39}$$

where $\omega_k$ is the weight for pixel value $S_k$.

It is to be noted that the discussion herein refers to the construction of the pyramid levels from the original, full resolution image, where the pixels may be considered as independent. This is done to keep the derivation simple. However, usually pyramids are constructed iteratively, in which case the pixels in the intermediate levels are not statistically independent. If additional accuracy is sought in the iterative process, the weighting should rely not only on the pixel variance in the intermediate levels, but on their full covariance matrix with their neighbors. This matrix should be thus propagated up the pyramid as well.

In a conventional pyramid, the weights $\omega_k$ are equal to values of a Gaussian kernel $\alpha_k$. However, in the method of the present invention, Eq. (39) can be viewed as a generalization of Eq. (34). The weight $\omega_k$ that should be assigned to a pixel linearly decreases both as its Gaussian weight $\alpha_k$ decreases, and as its uncertainty $\Delta S_k$ increases. Thus $\omega_k = \alpha_k / \Delta s_k^2$, and:

$$\Delta s = \left( \sum_k \omega_k \right)^{-1}. \tag{40}$$

In the above-described Maximum Likelihood pyramid, the representation at each resolution level includes not only the weighted-averaged value at each pixel, but also the uncertainty of the value of each pixel. Since points having smaller uncertainties receive more weight in this pyramid, the uncertain areas (such as the saturated regions or very dark points) have reduced importance at the coarser levels, and their representation is more influenced by adjacent stable points. The representation of a region by one value is thus made more reliable. Accordingly, using having a representation of $s \pm \Delta s$ at each scale enables efficient registration of the images by maximizing the likelihood of the match.

It is to be noted that the above-described procedure is not the only way to register and fuse an image sequence. For example, other weights can be used for determining the value at each point, or a single good measurement of each point can be used to represent the point. If the motion field is parameterized, the neutral density mask does not change over time, and the scene is static, then all the parameters of the mask, the motion, and the unknown scene can be posed as a single optimization problem.

Once the set of images have been captured and registered, and the imager characteristics are known (e.g., by calibration), an algorithm in accordance with the present invention generates at least one datum (e.g., a pixel) to represent each point or small region of the scene. Such a fusion procedure generates the representative pixel using the particular pixel, from each of the original images, which corresponds to the scene point being represented. The choice of fusion procedure typically depends upon which scene characteristic—e.g., brightness, color, polarization, or depth—is being imaged.

For example, to fuse intensity (i.e., brightness) images taken with spatially varying 1. The value selected for the point is the one that is most likely—hence minimizing the Mahalanobis distance to the data points. Thus Eqs. (34) and (35) are used with $s_k = I_k$, where $I_k = \hat{g}_k / M$.

2. Saturated points in the raw images ($\hat{g}$ close to 255 in an 8-bit camera) are assigned a very large uncertainty, as described above.

3. A seam minimization procedure is used to avoid aesthetically unappealing seams which may appear on the image boundaries. On the boundaries of the images that form the mosaic there are transitions between points which have been estimated using different sources of data. There are numerous ways to remove seams from mosaics. One approach is to search for an "optimal" seam line—i.e., the seam line which appears least obvious to the observer. Optimal seam line selection procedures are widely used in the art. Another approach is to use feathering procedure in which the images are weighted according to the pixel position with respect to the image centers or boundaries. This weighting fits easily into the weighted averaging described in item 1, and is similar to the above-described use of weights in the construction of pyramids. For example, the uncertainty can be multiplied by a factor that smoothly increases to ∞ near the image boundaries.

4. Seams also typically appear at the boundaries of saturated areas, where there is an abrupt change in the uncertainty, while the change in $\hat{g}$ is usually small. Such seams can be removed using an approach such as that discussed in item 3 above. It is preferable to smooth the definition of saturated areas using the following procedure. A "low saturation value" a is defined (e.g., 230 for an 8-bit camera). Then a "high saturation value" b (e.g., 250) is defined. If $\hat{g} > b$, the pixel is considered to be saturated. If $b \geq \hat{g} > a$ and the point is adjacent to a saturated point, the point is considered to be "saturation-associated". If $b \geq \hat{g} > a$ and the point is adjacent to a "saturation-associated" point, it is also considered as "saturation-associated". Points which are "saturation-associated" are thus always included in groups which are connected to a saturated point. Therefore, the procedure does not affect intense $\hat{g}$ points ($\hat{g} > a$) which are not related to saturated points. After all the points which have been declared as "saturation-associated" have been found, their uncertainty is multiplied by $\approx (b-a)/(b-\hat{g})$, or some other function that gradually makes the transition from a regular uncertainty (multiplied by a factor of 1) to a very large uncertainty as the saturated value is reached.

It is to be noted that fusion of data in accordance with the invention is not limited to the above-described, exemplary procedures. Data can also be fused using methods of robust statistics to reduce the effects of outliers, or using iterative projection methods. Seam removal can also be done in a multi-resolution approach—i.e., by analyzing the image at several different resolutions, as is well-known in the art.

It is also to be noted that guidelines 3 and 4 above are not essential for the production of the high dynamic range mosaic, but are merely used to make the resulting image more aesthetically pleasing. Additional methods include: (1) selecting only a single "good" measurement of each point as the representative value of the point; and (2) selecting the values which yield the maximum contrast (e.g., in multiple scales [Explain]).

In the case of polarization data, the image points are analyzed as follows. Assuming that the elliptic polarization component can be neglected, and using three measurements for each point, Eq. (24) is used to derive the components of the polarization state for each pixel. If more than the minimum required number of images is used, then an overdetermined set of equations can be used. The set of equations is solved by minimizing the square error, leading to $$\begin{bmatrix} C \\ A_c \\ A_s \end{bmatrix} = (M'M)^{-1} M' \bar{g} . \tag{41}$$

Then, the procedure sets I=2C, $A=\sqrt{A_c^2+A_s^2}$, P=A/C and $\theta=\sin^{-1}(A_s/A)=\cos^{-1}(A_c/A)$.

It is to be noted that the above-described procedure is not the only way in which the data can be used to extract the polarization information. For example, robust statistics can be used to estimate polarization. P, θ, and I can be estimated directly—i.e., by passing the intermediate variables $A_c$, $A_s$, and C; projection iterative methods (e.g., enforcing the positivity of I and P) can be used; or it may be sufficient not to extract the polarization information, but merely to fuse the images in a way that will yield the maximum contrast, by comparing the Laplacian pyramid representations of the images and selecting the representation having the maximum value, as is well-known in the art.

To derive depth information, a depth from focus procedure is performed on the corresponding points, selecting the images that give the best focus, as done in conventional depth from focus techniques. Then, the selected images can be fused so that only "sharp" pixels contribute to the mosaic. For example, if the Laplacian measures the image sharpness, then:

$$\hat{I}(x,y)=I_{\tilde{p}(x,y)}(x,y) \text{ such that } \tilde{p}(x,y)= \arg\max |\nabla^2_{x,y} I_p(x,y)|, \tag{42}$$

where (x,y) are the coordinates in the stationary (outside world) coordinate system, and p̃ is the index of the frame. However, the fusion need not be only at the pixel level, but can be done in multiple resolution scales. Moreover, the technique is not limited to the Laplacian criterion for focus; other focus criteria can also be applied.

To derive the spectrum, corresponding measurements of the same scene point in different bands are concatenated. If the filter is not a bandpass filter, but a highpass or lowpass filter, then the spectral information in narrow bands can be derived by differentiation of adjacent measurements. The spectrum can be measured using bands of varying widths, and can even be composed of multiple bands. The high resolution spectrum is extracted by solving the set of equations provided by the raw data, considering the structure of the bands, the positivity of the spectrum, and other constraints. Moreover, it is possible to use a priori information regarding the spectra of known sources and materials to determine which types of known sources and illumination components are consistent with the measurements, including the relative intensities, temperatures, and/or spatial locations of the measurements.

Using the methods of the invention described herein, the dynamic range of any video camera (or still camera) can be extended, the spectral resolution of the camera can be greatly enhanced, and/or the polarization states and focal properties of incoming signals can be resolved simply by attaching a filter in front of the lens of the camera, or even by exploiting pre-existing vignetting characteristics of the camera.

Knowledge of the spectral content of a scene can be used to infer information regarding the light sources illuminating the scene at the time the photographs were taken, and can also be used to infer object reflectance. As a result, images of the scene can be rendered using different simulated illumination sources and characteristics. For example, an object photographed under an incandescent lamp can be rendered, in a simulated manner, as if photographed under fluorescent light, or under a sunset-lit sky.

Furthermore, it is to be noted that the spectral response of most detectors is very different from that of the human eye, even when RGB filters are used in a detector. Film and color prints suffer from similar limitations. Knowing the actual spectral content of the scene thus enables rendering of the images in a manner closer to what the human eye would detect if viewing the scene directly. Images can also be rendered to be consistent with the responses of films, screens, or printers, rather than typical eye response.

The techniques of the present invention extend the optical dynamic range of an imager while creating mosaics. The dynamic range is extended for each point in the scene, regardless of the brightness of surrounding points. The imager need not have any internally moving parts, and the motion of the imager is the same as that required to create an ordinary image mosaic. The techniques of the invention can also be combined with other methods for enhancing dynamic range, such as active CMOS detectors or AGC, to thereby provide further enhancement. Note that the optical dynamic range is larger if the density filter has a wider range of density. For example, if $M \in [10^{-4}, 1]$ the dynamic range of the detector is enhanced by approximately 13 bits beyond its intrinsic range (equivalent to an 80 dB improvement). Putting several such filters in series enhances the spatially varying attenuation effect, since filter density is an additive property.

Enhancing the depth of focus enables the creation of sharp images over wide distance ranges. Acquisition of polarization data enables removal or enhancement of reflection and semi-reflection visual effects.

It will be appreciated by those skilled in the art that the methods illustrated in FIGS. 1-6, 35A, and 35B can be implemented on various standard computer platforms operating under the control of suitable software as exemplified by the programs in the Appendix. In some cases, dedicated computer hardware, such as a peripheral card which resides on the bus of a standard personal computer or workstation, can enhance the operational efficiency of the above methods.

Figure 37:
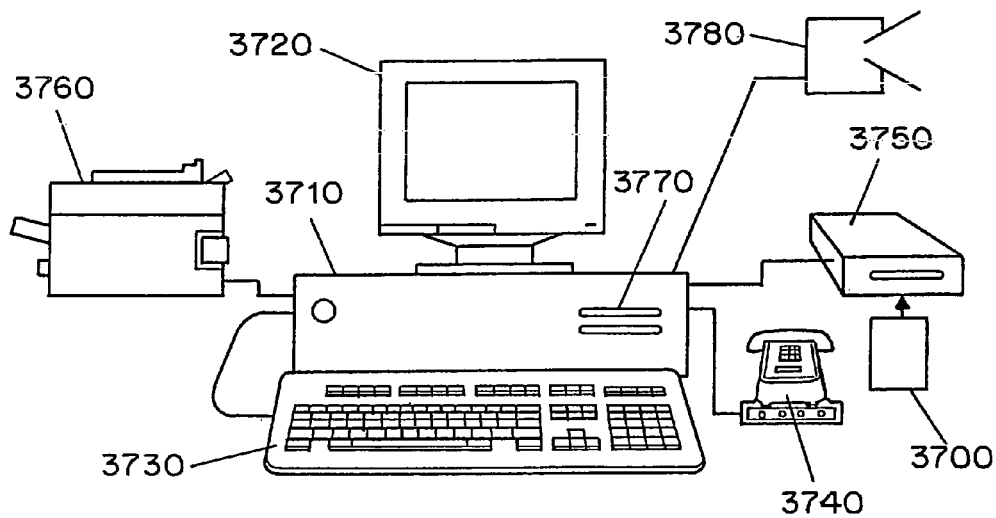
FIG. 37 is a diagram illustrating a computer system for performing image mosaicing algorithms in accordance with the present invention.
Figure 38:
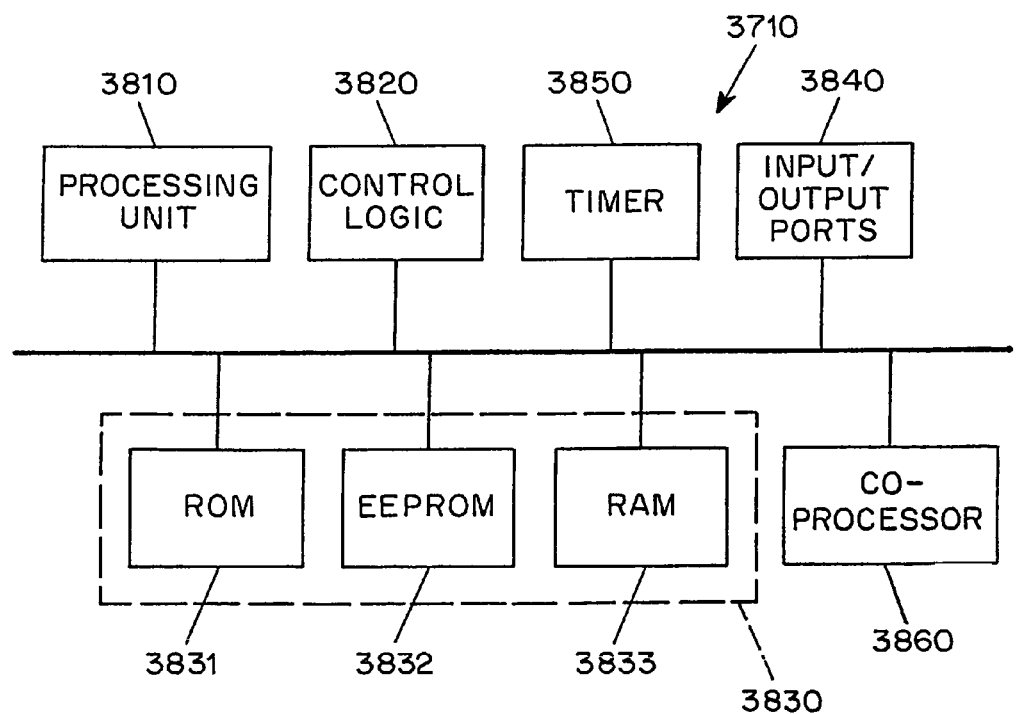
FIG. 38 is a block diagram of a processor section for use in the computer system of FIG. 37.

FIGS. 37 and 38 illustrate exemplary computer hardware suitable for practicing the present invention. Referring to FIG. 37, the computer system includes a processor section 3710, a display 3720, a keyboard 3730, and a mouse. The system can also include other input devices such as an optical scanner 3750 for scanning an image medium 3700, and a camera 3780. In addition, the system can include a printer 3760. The computer system typically includes one or more disk drives 3770 which can read and write to computer readable media such as magnetic media (e.g., diskettes), or optical media (i.e., CD-ROMS), for storing data and application software.

FIG. 38 is a functional block diagram which further illustrates the processor section 3710. The processor section 3710 generally includes a processing unit 3810, control logic 3820 and a memory unit 3830 and a hard disk drive and interface. The processor section 3710 further includes a timer 3850 (i.e., a clock circuit) and input/output ports 3840. The processor section 3710 can also include a co-processor 3860, depending on the microprocessor used in the processing unit. Control logic 3820 provides, in conjunction with processing unit 3810, the control necessary to handle communications between memory unit 3830 and input/output ports 3840. Timer 3850 provides a timing reference signal for processing unit 3810 and control logic 3820. Co-processor 3860 provides an enhanced ability to perform complex computations in real time. Present day computers are more likely to have multiple processing units than a co-processor.

Memory unit 3830 can include different types of memory, such as volatile and non-volatile memory and read-only and programmable memory. For example, as shown in FIG. 38, memory unit 3830 can include read-only memory (ROM) 3831, electrically erasable programmable read-only memory (EEPROM) 3832, and random-access memory (RAM) 3833. Different computer processors, memory configurations, data structures and the like can be used to practice the present invention, and the invention is not limited to a specific platform. For example, although the processor section 3710 is illustrated as part of a computer system in FIG. 37, the processor section 3710 and/or the illustrated components thereof can also be included in an imager such as a still-image camera or a moving-image camera (e.g., a video camera).

Software exemplified by the source code listing in the Appendix can be written in a wide variety of programming languages, as will be appreciated by those skilled in the art. Exemplary software algorithms in accordance with the present invention have been written in the Matlab™ language. The computer source code for several of these exemplary algorithms is provided in the Appendix attached hereto.

Although the present invention has been described in connection with specific exemplary embodiments, it should be understood that various changes, substitutions, and alterations can be made to the disclosed embodiments without departing from the spirit and scope of the invention as set forth in the appended claims.

APPENDIX

MATLAB SOURCE CODE FOR MOSAICING, FLAT FIELDING, FUSION OF IMAGES, HIGH DYNAMIC RANGE, MULTIRESOLUTION REGISTRATION, MAXIMUM LIKELIHOOD PYRAMIC, SELF CALIBRATION OF ATTENUATION MASK, FEATHERING OF SEAMS & SATURATED REGIONS, ETC.

SOURCE CODE FOR CREATION OF HIGH DYNAMIC RANGE MOSAIC

```
function m=calchorizprof2(basefilename,postfix,netframes,left,right,bottom,roof);

imagehight=roof-bottom+1;

basephotoname='photo';
rawname='basicim';

%%%%%%%%%%%%%%%%%%%%%%%%%%%%%%%%% CALCULATING THE MEAN PROFILE
ystep=-1;
%frame_inds=36:ystep:1;
frame_inds=length(netframes):ystep:1;

imagewidth=right-left+1;
M=zeros(length(frame_inds),imagewidth);

for indframe=1:length(frame_inds),
   yframe_ind=frame_inds(indframe);

yframe1=netframes(yframe_ind);
      sframe1=sprintf('%d',yframe1);
      shem1=[basefilename sframe1 postfix];
      rawim=imread(shem1);
      basicim=double(flipud(rawim))-1;
      X=basicim(bottom:roof,left:right);

%     LX=log2(X+eps);
%     saturated= (X>sun);
%     unsaturated=(~saturated);
%     unsatinds=find(unsaturated);

%     XN=NaN*ones(size(X));
%     XN(unsatinds)=X(unsatinds);
%     LXN=NaN*ones(size(X));
%     LXN(unsatinds)=LX(unsatinds);

OrdM(indframe,:)=mean(X);
```

```
% nonsatM(indframe,:)=nanmean(XN);
% LM(indframe,:)=mean(LX);
% nosatLM(indframe,:)=nanmean(LXN);

end

%%%%%%%%%%%%%%%%%%%%%%%%%%%%%%
tm=nanmean(OrdM);   %The 0.05 is out of O(200) so it is very insignificant in the bright
                    %points while being still small in the dark O(1) points.
mx=max(tm);
%tm=0.005+tm/mx;
tm=0.001+tm/mx;
mx=max(tm);
m=tm/mx;

%ylm=log2(m);

%figure(1)
%hold off
%plot(m,'k');
%set(gca,'xlim',[1,imagewidth]);

%figure(2)
%hold off
%plot(ylm,'k')
%set(gca,'ylim',[-12,0])
%set(gca,'xlim',[1,imagewidth]);

%%%%%%%%%%%%%%%%%%%%%%%%%%%%%% function clipped=clipfrombig(oldcell,Lnew,Rnew,Dnew,Unew)

%%%%%%%%%%%%%%%%%%%%%%%%%%%%%%%%%%%%%%%
%%%%%%%%%   DECODING THE CELLS INTO THEIR CONSTITUENTS photo=oldcell{1,1};        % the 1st (old) image
centerx=oldcell{2,1};   %coordinates of center of old image
centery=oldcell{3,1};

[oldrows,oldcols]=size(photo);
   Lold=centerx-(oldcols-1)/2;    %the  Left side of the old image
       Rold=centerx+(oldcols-1)/2;     % the Right side
       Dold=centery-(oldrows-1)/2;     % the Down of the old image
       Uold=centery+(oldrows-1)/2;     % the Upper side of the old image greatL=Lold;           %the Left side of the combined-greater image
       greatR=Rold;
       greatD=Dold;
       greatU=Uold;
       spanx=greatR-greatL+1;
       spany=greatU-greatD+1;
       greatX=ones(spany,1)*(greatL:greatR);     %the coordinate grid of the combined-greater
image
       greatY=(greatD:greatU)'*ones(1,spanx);

%Lnew;
   %Rnew;
   %Dnew;
   %Unew;
```

```
    [newLDy,newLDx]=find ((greatX==Lnew) & (greatY==Dnew)) ;
        [newLUy,newLUx]=find ((greatX==Lnew) & (greatY==Unew)) ;
        [newRDy,newRDx]=find ((greatX==Rnew) & (greatY==Dnew)) ;
        [newRUy,newRUx]=find ((greatX==Rnew) & (greatY==Unew)) ;

[newLD_row,newLD_col]=xy2ij_brack([newLDx,newLDy],spany);
        [newRD_row,newRD_col]=xy2ij_brack([newRDx,newRDy],spany);
        [newLU_row,newLU_col]=xy2ij_brack([newLUx,newLUy],spany);
        [newRU_row,newRU_col]=xy2ij_brack([newRUx,newRUy],spany);

clipped=photo( newLD_row:-1:newLU_row , newLD_col:newRD_col );
        clipped=flipud(clipped);

clear
pack fuzzmarge=45;
transit=80;

%load ../decayfun
m=exp(log(valint)-max(log(valint)));
delta_m=(1/max(valint))*ones(size(m));
load iterdecay
levels_x=2;
levels_y=0;
minlevel=0;
Lshulaim=26;
%Lshulaim=0;
left=min(xint)+Lshulaim;
right=max(xint);
bottom=170;
roof=355;
imagehight=roof-bottom+1;
sun=250;
sunerror=1/eps;
SE=ones(3,5);

%%%%%%%%%%%%%%%%%%%%%%%%%%%%
cols=right-left+1;
prof=profil2(cols,transit);
inv_prof2=(1./prof).^2;
FETHER2=ones(imagehight,1)*inv_prof2;
%%%%%%%%%%%%%%%%%%%%%%%%%%%%%%%%%%%%%%%%%%%%
%%%%%%%%%%%%%%%%%%%%%%%%%%%%%%%%%%%%%%%%%%%%
oldlength=length(m);
m=m(1+Lshulaim:oldlength);
delta_m=delta_m(1+Lshulaim:oldlength);
sig=1;

invm=1./m;
invm_square=invm.^2;
invm_four  =invm.^4;
a=(sig.^2).*invm_square;
b=(delta_m.^2).*invm_four;
%%%%%%%%%%%%%%%%%%%%%%%%%%%%%%%%
invM=ones(imagehight,1)*invm;
A=   ones(imagehight,1)*a;
B=   ones(imagehight,1)*b;
```

```
load ../coordml8.mat    %%%% LOADING THE COORDINATES basefilename='../gradfilt1_';
postfix='.tif';
basephotoname='photo';
rawname='basicim';
netframes=[1:9 , 11:37];

centerx1=0;   %this is always
centery1=0;   %this is always

%%%%%%%%%%%%%%%%%%%%%%%%%%%%%%%%%%%%%%%%%%%%%%%%%%%%%%%%%%%%%%%%%%%%%%%%%%% --
%%%%%%%%%%%%%%%%%%%%%%%%%%%%%%%% MERGING IMAGES IN A BIG FRAME
%ystep=-1;
%frame_inds=36:ystep:30;
ystep=-1;
frame_inds=36:ystep:2;
k=1;
for indframe=1:length(frame_inds),
tic
    yframe_ind=frame_inds(indframe);

if k==1
        yframe1=netframes(yframe_ind);
        sframe1=sprintf('%d',yframe1);
        shem1=[basefilename sframe1 postfix];
        rawim=imread(shem1);
        basicim=double(flipud(rawim))-1;
        X=basicim(bottom:roof,left:right);
        Ya=X.*invM;
        saturated= (X>sun);
        dilsaturated=double(dilate(saturated,SE));
        DELTAYa2=(A+ ((X.^2).*B)).*(~dilsaturated) + sunerror.*dilsaturated;
        DELTAYa2=DELTAYa2.*FETHER2;

%       [rows,cols]=size(Ya);
%       CoordYa=ones(rows,1)*(1:cols);
%       fuzzline=round(fuzzmarge*rand(rows,1));
%       FuzzlineL=fuzzline*ones(1,cols);
%       fuzzline=cols-round(fuzzmarge*rand(rows,1));
%       FuzzlineR=fuzzline*ones(1,cols);
%       lobeseder=(CoordYa<FuzzlineL) | (CoordYa>FuzzlineR);
%       Ilobeseder=find(lobeseder);
%       clear FuzzlineR FuzzlineL lobeseder
%       tmp=Ya;
%       tmp(Ilobeseder)=NaN;
%       Ya=tmp;

Acell(1,1)=Ya;
        Acell(2,1)=DELTAYa2;
        Acell(3,1)=centerx2(yframe_ind);
        Acell(4,1)=centery2(yframe_ind);
    else
        Acell=fusedcell;
    end yframe2=netframes(yframe_ind + ystep);
    sframe2=sprintf('%d',yframe2);
```

```
    shem2=[basefilename sframe2 postfix];
    rawim=imread(shem2);
    basicim=double(flipud(rawim))-1;
    X=basicim(bottom:roof,left:right);
    Yb=X.*invM;
    saturated= (X>sun);
    dilsaturated=double(dilate(saturated,SE));
    DELTAYb2=(A+ ((X.^2).*B)).*(~dilsaturated) + sunerror.*dilsaturated;
    DELTAYb2=DELTAYb2.*FETHER2;

clear rawim basicim X
%    fuzzline=round(fuzzmarge*rand(rows,1));
%    FuzzlineL=fuzzline*ones(1,cols);
%    fuzzline=cols-round(fuzzmarge*rand(rows,1));
%    FuzzlineR=fuzzline*ones(1,cols);
%    lobeseder=(CoordYa<FuzzlineL) | (CoordYa>FuzzlineR);
%    Ilobeseder=find(lobeseder);
%    clear FuzzlineR FuzzlineL lobeseder
%    tmp=Yb;
%    tmp(Ilobeseder)=NaN;
%    Yb=tmp;

Bcell{1,1}=Yb;
    Bcell{2,1}=DELTAYb2;
    Bcell{3,1}=centerx2(yframe_ind+ystep);
    Bcell{4,1}=centery2(yframe_ind+ystep);

fusedcell=fuseml11(Acell,Bcell);

%fused=double(fusedcell{1,1});
%deltaz2=fusedcell{2,1};
%figure(1)
%imagesc(fused); axis xy; axis image
%figure(2)
%imagesc(deltaz2); axis xy; axis image
%pause k=k+1;
    clear Acell Bcell
toc
end fused=double(fusedcell{1,1});
deltaz2=fusedcell{2,1};
greatcenterx=fusedcell{3,1};
greatcentery=fusedcell{4,1};

%save fethermosaic0.mat fused deltaz2 greatcenterx greatcentery
clear fusedcell figure(3);
image(fused);     yshow24;
set(gcf,'menubar','figure')

figure(4)
image(150-40*log(deltaz2)); yshow24
set(gcf,'menubar','figure')
```

```
%%%%%%%%%%%%%%%%%%%%%%%%%%%%%%%%%%%%%%%%%%%%%%%%%%%%%%%%%
logfused=log(1+fused);
mx=max(logfused(:));
imx8=(2^8)/mx;
logfused8=uint8(round(logfused*imx8));
figure(5);
image(logfused8);      yshow24;
set(gcf,'menubar','figure')

clear saturated logfused valint tikunx tikuny invM invm invm_square
clear invm_square dilsaturated flatcurve flatfun centery2 centerx2
clear a b Ya Yb DELTAYb2 DELTAYa2 A B function fusedcell=fusem122(oldcell,newcell)
%
% oldcell and newcell contain images to put in a single
% coordinate system, and the vector-coordinates of the
% image centers in (x,y).
% fusedcell   is the cell of the updated mosaic image
% k  is the number of images already fused
%
% merging='average' - The overlap area is an average of
%        all the images that exist in it, and the program
%        makes all weights be the same.
% merging='avdecay' - The overlap area is the average of the
%        old image or mosaic, withthe new image. So, older
%        images in the old mosaic decay exponentially in time.
% merging='split' - the overlap is cut by half - each side
%        comes from a different image.

%%%%%%%%%%%%%%%%%%%%%%%%%%%%%%%%%%%%%%%%%%
%%%%%%%%%    DECODING THE CELLS INTO THEIR CONSTITUENTS

Zold    =oldcell{1,1};         % the 1st (old) image
DELTAZ2old=oldcell{2,1};
oldcenterx=oldcell{3,1};       %coordinates of center of old image
oldcentery=oldcell{4,1};

Znew=newcell{1,1};             % the 2nd (new) image
DELTAZ2new=newcell{2,1};
newcenterx=newcell{3,1};
newcentery=newcell{4,1};

%%%%%%%%%%%%%%%%%%%%%%%%%%%%%%%%%%%%%%%%

[oldrows,oldcols]=size(Zold);
Lold=oldcenterx-(oldcols-1)/2 ;    %the  Left side of the old image
Rold=oldcenterx+(oldcols-1)/2 ;    % the Right side
Dold=oldcentery-(oldrows-1)/2 ;    % the Down  of the old image
Uold=oldcentery+(oldrows-1)/2 ;    % the Upper side of the old image

[newrows,newcols]=size(Znew);
Lnew=newcenterx-(newcols-1)/2 ;    %the Left side of the new (2nd) image
Rnew=newcenterx+(newcols-1)/2 ;
```

```
Dnew=newcentery-(newrows-1)/2 ;
Unew=newcentery+(newrows-1)/2 ;

greatL=min([Lold,Lnew]);            %the Left side of the combined-greater image
greatR=max([Rold,Rnew]);
greatD=min([Dold,Dnew]);
greatU=max([Uold,Unew]);
spanx=greatR-greatL+1;
spany=greatU-greatD+1;

greatX=ones(spany,1)*(greatL:greatR);    %the coordinate grid of the combined-greater image
greatY=(greatD:greatU)'*ones(1,spanx);

%%%%%% PUTTING THE OLD IMAGE IN THE COMBINED GREAT-GRID

[oldLDy,oldLDx]=find ((greatX==Lold) & (greatY==Dold)) ;
[oldLUy,oldLUx]=find ((greatX==Lold) & (greatY==Uold)) ;
[oldRDy,oldRDx]=find ((greatX==Rold) & (greatY==Dold)) ;
[oldRUy,oldRUx]=find ((greatX==Rold) & (greatY==Uold)) ;

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;

DELTAZoldgreat=NaN*zeros(size(greatX));
DELTAZoldgreat( oldLD_row:-1:oldLU_row , oldLD_col:oldRD_col )=DELTAZ2old;

%%%%%%%%% PUTTING THE NEW IMAGE IN THE COMBINED GREAT-GRID

[newLDy,newLDx]=find ((greatX==Lnew) & (greatY==Dnew)) ;
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;

DELTAZnewgreat=NaN*zeros(size(greatX));
DELTAZnewgreat( newLD_row:-1:newLU_row , newLD_col:newRD_col )=DELTAZ2new;

%%%%%%%%%%%%%%%%%%%%%%%%%%%%%%%%%%%%%%%%%%%%%%%%%%%%%%%%%%%%%
%%%%%%%%%%%% TAKING CARE OF THE OVERLAP AREA nanold=uint8(isnan(Zoldgreat));
nannew=uint8(isnan(Znewgreat));

fused=NaN*zeros(size(greatX));
%fused( newLD_row:-1:newLU_row , newLD_col:newRD_col )=Znew;
%fused( oldLD_row:-1:oldLU_row , oldLD_col:oldRD_col )=Zold;
besdernew=find(~nannew);
fused(besdernew)=Znewgreat(besdernew);
```

```
besderold=find(~nanold);
fused(besderold)=Zoldgreat(besderold);

DELTA2fused=NaN*zeros(size(greatX));
%DELTA2fused( newLD_row:-1:newLU_row , newLD_col:newRD_col )=DELTAZ2new;
%DELTA2fused( oldLD_row:-1:oldLU_row , oldLD_col:oldRD_col )=DELTAZ2old;
DELTA2fused(besdernew)=DELTAZnewgreat(besdernew);
DELTA2fused(besderold)=DELTAZoldgreat(besderold);

%Sigmaoldgreat=sqrt(DELTAZoldgreat);
%Sigmanewgreat=sqrt(DELTAZnewgreat);
Sigma2oldgreat=DELTAZoldgreat;
Sigma2newgreat=DELTAZnewgreat;

nangreat= (nanold | nannew);
E=~nangreat;
F=find(E);
if ~isempty(F)
        oldneto=NaN*ones(size(Zoldgreat));
        newneto=NaN*ones(size(Znewgreat));
        oldsigneto=oldneto;
        newsigneto=newneto;

oldneto(F)=Zoldgreat(F);
        newneto(F)=Znewgreat(F);
        oldsig2neto(F)=Sigma2oldgreat(F);
        newsig2neto(F)=Sigma2newgreat(F);

%size(oldneto(F))
        %size(newneto(F))
        %size(oldsig2neto(F)')
        %size(newsig2neto(F)')

nominat= (oldneto(F)./oldsig2neto(F)') + (newneto(F)./newsig2neto(F)') ;
        denomin= (1./oldsig2neto(F)') + (1./newsig2neto(F)');

sig2seam= 1./denomin;

seamvalue=sig2seam.*nominat;
        fused(F)=seamvalue;

%            DELTA2fused(F)=sigseam.^2;
        DELTA2fused(F)=sig2seam;
end
fused=flipud(fused);
DELTA2fused=flipud(DELTA2fused);

%%%%%%%%% THE CENTRAL COORDINATE OF THE (WARPED) GREAT-COMBINED IMAGE greatcenterx=(greatR+greatL)/2;
greatcentery=(greatU+greatD)/2;

%%%%%%%%%%%%%%%%%%%%%%%%%%%%%%%%%%%%%%%%%%%%%%%%%%%%%%%%
%%%%%%%%%%%%%%%%% PUTTING THE OUTPUT TO CELLS, FOR EASIER TRANSFER fusedcell{1,1}=fused;
fusedcell{2,1}=DELTA2fused;
fusedcell{3,1}=greatcenterx;
fusedcell{4,1}=greatcentery;
```

```
function diffml=generallikely31(oldcell,newcell)

Zold=oldcell{1,1};         %THE 1ST SUB-IMAGE
Znew=newcell{1,1};         %THE 2ND SUB-IMAGE DELTAZ2old=oldcell{2,1};
DELTAZ2new=newcell{2,1};

nanold=uint8(isnan(Zold));
nannew=uint8(isnan(Znew));
nangreat= (nanold | nannew);
E=~nangreat;
F=find(E);

Zoldneto=NaN*ones(size(Zold));
Znewneto=NaN*ones(size(Znew));
DELTAZ2oldneto=NaN*ones(size(Zold));
DELTAZ2newneto=NaN*ones(size(Znew));
bestvalue=NaN*ones(size(Zold));

if isempty(F)
    diffml=Inf;
else
        Zoldneto(F)=Zold(F);
        Znewneto(F)=Znew(F);
    DELTAZ2oldneto(F)=DELTAZ2old(F);
    DELTAZ2newneto(F)=DELTAZ2new(F);
    Sigma2old=DELTAZ2oldneto;
    Sigma2new=DELTAZ2newneto;

nominat= (Zoldneto(F)./Sigma2old(F)) + (Znewneto(F)./Sigma2new(F)) ;
    denomin= (1./Sigma2old(F)) + (1./Sigma2new(F));
    sig2seam= 1./denomin;
    bestvalue(F)=sig2seam.*nominat;

Eold= ((bestvalue(F) -Zoldneto(F)).^2 ./Sigma2old(F)   ;
    Enew= ((bestvalue(F) -Znewneto(F)).^2 ./Sigma2new(F)   ;
    E=Eold+Enew;

SSD=sum(E(:));
    generalized_denomin=sum(denomin(:));

diffml=SSD/generalized_denomin;
%   diffml=mean(E(:));
end clear
load decayfun
```

```
levels_x=3;
levels_y=0;
minlevel=0;
left=min(xint);
right=max(xint);
bottom=170;
roof=355;
imagehight=roof-bottom+1;
sun=250;
sunerror=1/eps;
SE=ones(3,5);
%yepsilon=0.01;
yepsilon=eps;

%%%%%%%%%%%%%%%%%%%%%%%%%%%%%%%%%%%%%%%%
%%%%%%%%%%%%%%%%%%%%%%%%%%%%%%%%%%%%%%%% basefilename='gradfilt1_';
postfix='.tif';
basephotoname='photo';
rawname='basicim';
netframes=[1:9 , 11:37];

m=calchorizprof4(basefilename,postfix,netframes,left,right,bottom,roof);
clear xint valint %m=valint/max(valint);
%delta_m=1/max(valint);
%sig=1;
delta_m=0.01*ones(size(m));
sig=0.5;

invm=1./m;
invm_square=invm.^2;
c=(delta_m.^2).*invm_square;
    %%%%%%%%%%%%%%%%%%%%%%%%%%%%%%%%%%
M   =ones(imagehight,1)*m;
epsM=yepsilon*M;
invM=ones(imagehight,1)*invm;
C   =ones(imagehight,1)*c;
SIG2=(sig.^2);
%%%%%%%%%%%%%%%%%%%%%%%%%%%%%%%%%%%%%%%.
%%%%%%%%%%%%%%%%%%%%%%%%%%%%%%%%%%%%%%% centerx2=zeros(1,length(netframes));
centery2=zeros(1,length(netframes));
tikunx=zeros(1,length(netframes));
tikuny=zeros(1,length(netframes));

ystep=1;
centerx2guess=47*ystep;    %initializing the disparity
centery2guess=0;

%frame_inds=11:ystep:18;
frame_inds=1:ystep:35;
k=1;
```

```
for indframe=1:length(frame_inds),
    %%%%%%%%%%%%%%%%%%%%%%%%%%%%%% READING AND PREPARING THE RAW IMAGES
    yframe_ind=frame_inds(indframe);

tic
    if k==1
        yframe1=netframes(yframe_ind);
        sframe1=sprintf('%d',yframe1);
        shem1=[basefilename sframe1 postfix];
        rawim=imread(shem1);
        basicim=double(flipud(rawim))-1;
        X=basicim(bottom:roof,left:right);
        Za=log(yepsilon+X.*invM);
        saturated= (X>sun);
        dilsaturated=double(dilate(saturated,SE));
        DELTAZa2=(    (1./((epsM+X).^2))    .*    (SIG2+(C.*(X.^2)))    ).*(~dilsaturated)    +
sunerror.*dilsaturated;

centerx1=0; centery1=0;
        holdcell{1,1}=Za;
        holdcell{2,1}=DELTAZa2;
        holdcell{3,1}=centerx1;
        holdcell{4,1}=centery1;
        fusedcell=holdcell;
    else
        holdcell=fusedcell;
    end yframe2=netframes(yframe_ind+ystep)
    sframe2=sprintf('%d',yframe2);
    shem2=[basefilename sframe2 postfix];
    rawim=imread(shem2);
    basicim=double(flipud(rawim))-1;
    X=basicim(bottom:roof,left:right);
    Zb=log(yepsilon+X.*invM);
    saturated= (X>sun);
    dilsaturated=double(dilate(saturated,SE));
    DELTAZb2=(    (1./((epsM+X).^2))    .*    (SIG2+(C.*(X.^2)))    ).*(~dilsaturated)    +
sunerror.*dilsaturated;

hnewcell{1,1}=Zb;
    hnewcell{2,1}=DELTAZb2;
    if k==1
        hnewcell{3,1}=centerx2guess;
        hnewcell{4,1}=centery2guess;
    else
        hnewcell{3,1}=centerx2(old_yframe_ind)+centerx2guess;
        hnewcell{4,1}=centery2(old_yframe_ind)+centery2guess;
    end
    newcell=hnewcell;

%if yframe2>11,
        %figure(1);   image(42*fusedcell{1,1});  colormap(gray(256)); axis xy;
        %figure(3);   imagesc(-log(fusedcell{2,1}));  colormap(gray(256)); axis xy;
        %figure(2);   image(42*Zb); colormap(gray(256)); axis xy;
        %figure(4);   imagesc(-log((DELTAZb2)));  colormap(gray(256)); axis xy;
        %drawnow
        %1111111
        %pause
    %end
```

83

```
clear rawim basicim

%%%%%%%%%%%%%%%%%%%%%%%%%%%%%%%%  DERIVING TRANSLATION BETWEEN IMAGES

[tikunx(yframe_ind+ystep),tikuny(yframe_ind+ystep)]=gmultirem131(holdcell,hnewcell,levels_x,le
vels_y,minlevel); % centerx2(yframe_ind+ystep)=newcell{3,1} + tikunx(yframe_ind+ystep);
   centery2(yframe_ind+ystep)=newcell{4,1} + tikuny(yframe_ind+ystep);

[tikunx(yframe_ind+ystep)   tikuny(yframe_ind+ystep)]

%%%%%%%%%%%%%%%%%%%%%%%%%%%%%%%%% FUSING THE IMAGES newcell{3,1}=centerx2(yframe_ind+ystep);
   newcell{4,1}=centery2(yframe_ind+ystep);

%%%%%%%%% NEED TO CORRECT THIS WITH THE NEW KIND OF FUSION fusedcell=fuseml22(fusedcell,newcell);
   old_yframe_ind=yframe_ind+ystep;
   k=k+1;
toc save yytemp.mat   centerx2 centery2 tikunx tikuny
end
%%%%%%%%%%%%%%%%%%%%%%%%%%%%%%%%%%%%%%%%%%%%%%%%% clear newcell oldcell save coordml40.mat   centerx2 centery2 tikunx tikuny
fused=fusedcell{1,1};
deltaz2=fusedcell{2,1};
save fused40.mat fused deltaz2

%%%%%%%%%%%%%%%%%%%%%%%%%%%%%%%%%%% clear fusedcell figure(2);
   imagesc(fused);      yshow24;
   set(gcf,'menubar','figure')

figure(3);
   imagesc(-log((DELTAZb2)));      yshow24;
   set(gcf,'menubar','figure')

%darklevel=3;
%sunlevel=249;

%       clipped1=validimag(bottom:roof,left:right).*flatfun;
%       hclipped1=log2(clipped1+1);              %LOG to deal with the high dynamic range
```

```
function [xmove,ymove]=gmlscalemov31(Acell,OBcell)
%
% [xmove,ymove]=mlscalemov4(Acell,OBcell)
% Acell and OBcell are cells containing images at a specific
% scale, and each of their initial center-coordinates.
% The routine searches for the best GLOBAL CORRELATION between
% the images, in a 5x5 neighborhood around the initial
% centers.
% THE IMAGES NEED NOT BE OF THE SAME SIZE.
% [xmove,ymove] give the shifting in (x,y) coordinates of
% Bcell relative to Acell - that is the correction of the
% center vector of Bcell.
%
% See also   scalprod2   putinbig7

Bcell=OBcell;

%movementx=[-2:1:2];
%movementy=[-2:1:2];
movementx=[-1:1:1];
movementy=[-1:1:1];
centerx1=Acell{3,1};
centery1=Acell{4,1};

centerx2=Bcell{3,1};
centery2=Bcell{4,1};

for xind=1:length(movementx),
  centerx2_updated =centerx2+movementx(xind);
  Bcell{3,1}= centerx2_updated ;
    for yind=1:length(movementy),
      centery2_updated =centery2+movementy(yind);
      Bcell{4,1}= centery2_updated ;

[oldgreatcell,newgreatcell]=putbigml3(Acell,Bcell);

%photoA=oldgreatcell{1,1};       %THE 1ST SUB-IMAGE
      %photoB=newgreatcell{1,1};       %THE 2ND SUB-IMAGE
      %delta2A=oldgreatcell{2,1};      %THE 1ST SUB-IMAGE
      %delta2B=newgreatcell{2,1};      %THE 2ND SUB-IMAGE
      %figure(5); image(42*photoA); colormap(gray(256)); axis xy;
      %figure(6); image(42*photoB); colormap(gray(256)); axis xy;
      %figure(7); imagesc(-log((delta2A))); colormap(gray(256)); axis xy;
      %figure(8); imagesc(-log((delta2B))); colormap(gray(256)); axis xy;
      %22222
      %pause diffml(xind,yind)=generallikely31(oldgreatcell,newgreatcell);
    end
end
mindiff=min(diffml(:));
%diffml
[xmovementind,ymovementind]= find(diffml==mindiff);

xmove=round(mean(movementx(xmovementind)));
ymove=round(mean(movementy(ymovementind)));
```

```
function [translatex,translatey]=gmultireml31(oldcell,newcell,levels_x,levels_y,minlevel)
%
% [translatex,translatey]=multiml5(oldcell,newcell,levels_x,levels_y,minlevel)
% oldcell  and  newcell  have two input images at raw resolution
% who will be registerred.
% THE REGISTRATION IS DONE IN A COARSE-TO-FINE MANNER. The output vector
% is the (x,y) shift of the image in newcell relative to the one in
%  oldcell.
%
% See also  scaledmove7  mizoor3  putinbig6 shape='valid';

[oldgreatcell,newgreatcell]=puthullml2(oldcell,newcell);
Za=oldgreatcell{1,1};
DELTAZ2a=oldgreatcell{2,1};
centerx1=0;
centery1=0;

Zb=newgreatcell{1,1};
DELTAZ2b=newgreatcell{2,1};
centerx2(1)=0;
centery2(1)=0;
clear oldgreatcell newgreatcell if ~(levels_x==levels_y)
      [a,maindirection]=max([levels_x,levels_y]);
      if maindirection==1                          %%% x-direction is the main movement
unceratinty
     levelseq=[levels_x:-1:levels_y+1];
           for levelind=1:length(levelseq),
              level=levelseq(levelind);
              if ~(levelind==1)
              leveldifference=levelseq(levelind-1)-level;
              centerx2(levelind)=centerx2temp*(2^leveldifference);
              centery2(levelind)=centery2temp;
              end
          [photoA,delta2A]=mizoorml21_xy(Za,DELTAZ2a,level,levels_y,shape);
          [photoB,delta2B]=mizoorml21_xy(Zb,DELTAZ2b,level,levels_y,shape);

Acell{1,1}=photoA;
                    Acell{2,1}=delta2A;
                    Acell{3,1}=centerx1;
                    Acell{4,1}=centery1;

% figure(5);   image(42*photoA); colormap(gray(256)); axis xy;
% figure(6);   image(42*photoB); colormap(gray(256)); axis xy;
% figure(7);   imagesc(-log((delta2A))); colormap(gray(256)); axis xy;
% figure(8);   imagesc(-log((delta2B))); colormap(gray(256)); axis xy;
% 22222
% pause Bcell{1,1}=photoB;
                   Bcell{2,1}=delta2B;
                       Bcell{3,1}=centerx2(levelind);
                       Bcell{4,1}=centery2(levelind);
```

86

```
                    [xmove,ymove]=gmlscalemov31(Acell,Bcell);
                    centerx2temp=centerx2(levelind)+xmove;
                    centery2temp=centery2(levelind)+ymove;
        end
    else                          %%% y-direction is the main movement unceratinty
        levelseq=[levels_y:-1:levels_x+1];
                for levelind=1:length(levelseq),
                level=levelseq(levelind);
                if ~(levelind==1)
                leveldifference=levelseq(levelind-1)-level;
                centerx2(levelind)=centerx2temp;
                centery2(levelind)=centery2temp*(2^leveldifference);
                end
            [photoA,delta2A]=mizoorml21_xy(Za,DELTAZ2a,levels_x,level,shape);
            [photoB,delta2B]=mizoorml21_xy(Zb,DELTAZ2b,levels_x,level,shape);

Acell{1,1}=photoA;
                    Acell{2,1}=delta2A;
                    Acell{3,1}=centerx1;
                    Acell{4,1}=centery1;

Bcell{1,1}=photoB;
                Bcell{2,1}=delta2B;
                    Bcell{3,1}=centerx2(levelind);
                    Bcell{4,1}=centery2(levelind);

[xmove,ymove]=gmlscalemov31(Acell,Bcell);
                    centerx2temp=centerx2(levelind)+xmove;
                    centery2temp=centery2(levelind)+ymove;
        end
    end
end %%%%%%%%%%%%%%%%%%%%%%%%%%%%%%%%%%%%%%%%%%%%%%%%%%%%%%%%%%%%%%
if ~(levels_x==levels_y)
   [a,maindirection]=max([levels_x,levels_y]);
   if maindirection==1
       levelseq=[levels_y:-1:minlevel];
       centerx2(1)=centerx2temp*(2^leveldifference);
       centery2(1)=centery2temp;
   else
       levelseq=[levels_x:-1:minlevel];
               centerx2(1)=centerx2temp;
               centery2(1)=centery2temp*(2^leveldifference);
   end
else
   levelseq=[levels_x:-1:minlevel];
   centerx2(1)=0;
   centery2(1)=0;
end for levelind=1:length(levelseq),
   level=levelseq(levelind);
   if ~(levelind==1)
      leveldifference=levelseq(levelind-1)-level;
      centerx2(levelind)=centerx2temp*(2^leveldifference);
      centery2(levelind)=centery2temp*(2^leveldifference);
   end
```

```
   [photoA,delta2A]=mizoorml21(Za,DELTAZ2a,level,shape);
   [photoB,delta2B]=mizoorml21(Zb,DELTAZ2b,level,shape);

Acell{1,1}=photoA;
  Acell{2,1}=delta2A;
  Acell{3,1}=centerx1;
  Acell{4,1}=centery1;

Bcell{1,1}=photoB;
  Bcell{2,1}=delta2B;
  Bcell{3,1}=centerx2(levelind);
  Bcell{4,1}=centery2(levelind);

[xmove,ymove]=gmlscalemov31(Acell,Bcell);
   centerx2temp=centerx2(levelind)+xmove;
   centery2temp=centery2(levelind)+ymove;
end translatex=centerx2temp*(2^minlevel);
translatey=centery2temp*(2^minlevel);

function [enhanced,mnval,mxval]=histwin4(X,Y,photo,logphoto)

XS=sort(X);
YS=sort(Y);
L=round(XS(2));
R=round(XS(3));
D=round(YS(2));
U=round(YS(3));

%   LD   LU   RU   RD   LD
Xp=[L    L    R    R    L];
Yp=[D    U    U    D    D];

X0=(L+R)/2;
Y0=(D+U)/2;

spanx=size(photo,2);
spany=size(photo,1);

[LD_row,LD_col]=xy2ij_brack([L,D],spany);
[RD_row,RD_col]=xy2ij_brack([R,D],spany);
[LU_row,LU_col]=xy2ij_brack([L,U],spany);
[RU_row,RU_col]=xy2ij_brack([R,U],spany);

stam=flipud(photo);
subarea=stam( LD_row:-1:LU_row , LD_col:RD_col );

mn=min(subarea(:));
mx=max(subarea(:));
lemata=subarea-mn;
mx=max(lemata(:));
imx16=(2^16)/mx;
substretch=uint16(round(lemata*imx16));

subareahist=histeq(substretch,256);

mx=max(subareahist(:));
```

```
imx8=(2^8)/double(mx);
subenhanced=uint8(round(double(subareahist)*imx8));

stam=flipud(logphoto);
stam( LD_row:-1:LU_row , LD_col:RD_col )=subenhanced;
enhanced=flipud(stam);

mnval=min(subarea(:));
mxval=max(subarea(:));

clear
close all
pack kamut=1240;
%lambda=3.5e+04;
%lambdalog=3.5e4;
%lambda=2.5e+04;
lambda=1e+04;
lambdalog=6e4;

load ../decayfun
clear m delta_m
load lsatmosaic0.mat

Lshulaim=0; oldLshulaim=0;
left=min(xint)+Lshulaim;
right=max(xint);
bottom=170; roof=355;
imagehight=roof-bottom+1;
imagewidth=right-left+1;
%sun=250;
%sun=100;
sun=190;
dark=2;

%%%%%%%%%%%%%%%%%%%%%%%%%%%%%%%%%%%%%%%
%%%%%%%%%%%%%%%%%%%%%%%%%%%%%%%%%%%%%%%
logfused=log(1+fused);
mx=max(logfused(:));
imx8=(2^8)/mx;
logfused8=uint8(round(logfused*imx8));
[rows,cols]=size(logfused8);
L=1; R=cols;
D=1; U=rows;
figure(1);
hold off
image(logfused8);
colormap(gray(256)); axis('image','off','xy');
%Xwide=cols; Ywide=round(Xwide*rows/cols);
Xwide=cols/1.8; Ywide=round(Xwide*rows/cols);
set(gcf,'position',[55 109 Xwide Ywide]);
set(gca,'position',[0 0 1 1]);
vec=get(gcf,'position');
Ywide=vec(3)*rows/cols;
set(gcf,'position',[1 500 Xwide Ywide]);
```

```
spanx=R-L+1;
spany=U-D+1;
X=uint16(ones(spany,1)*(L:R));      %the coordinate grid of the combined-greater image
Y=uint16((D:U)'*ones(1,spanx));

%%%%%%%%%%%%%%%%%%%%%%%%%%%%%%%%%%%%%%
%%%%%%%%%%%%%%%%%%%%%%%%%%%%%%%%%%%%%% COORDINATE GRID OF THE MOSAIC
[bigrows,bigcols]=size(fused);
fusedcell{1,1}=flipud(fused);        % the 1st (old) image
fusedcell{2,1}=greatcenterx+oldLshulaim/2;   %coordinates of center of old image
fusedcell{3,1}=greatcentery;

mxx=max(fused(:));
ybase=sqrt(2);
%ybase=2;
denomin=log2(ybase);
fracoctav=(log2(mxx/sun)/denomin) +1;
intoctav=ceil(fracoctav);

goodpts=[];
for octavnum=1:intoctav;
   if octavnum==1
      minlevel=10*dark;
      maxlevel=sun;
   else
      minlevel=sun.*(ybase.^(octavnum-2));
      maxlevel=sun.*(ybase.^(octavnum-1));
   end
   inrange=( (fused>minlevel) & (~(fused>maxlevel)) );
   inrange_ind=find(inrange);
   lenrange=length(inrange_ind);

if lenrange<kamut
      goodpts=[goodpts; inrange_ind];
   else
      linerand=1+round((lenrange-1)*(rand(kamut,1)));
      picked_ind=inrange_ind(linerand);
      goodpts=[goodpts; picked_ind];
%     x=X(picked_ind);
%     y=Y(picked_ind);
   end
end x=X(goodpts);
   y=Y(goodpts);
   length(x)
   figure(1);
   hold off
   image(logfused8); colormap(gray(256)); axis('image','off','xy');
   hold on
%  plot(x,y,'r.'); axis xy
   plot(x,y,'r*'); axis xy
   set(gca,'xtick',0:10:2400); set(gca,'ytick',6:10:250);
%  grid on;   axis on;
   drawnow
   pause(10)

[rows,cols]=size(fused);
```

```
greatL=(greatcenterx-(cols-1)/2);      %the  Left side of the image
greatR=(greatcenterx+(cols-1)/2);      % the Right side
greatD=(greatcentery-(rows-1)/2);      % the Down  of the image
greatU=(greatcentery+(rows-1)/2);      % the Upper side of the image
clear deltaz2 fused logfused8 X Y x y fusedcell logfused8 logfused
clear inrange inrange_ind intoctav lenrange linerand maxlevel minlevel
clear picked_ind imx8 xpix=1:imagewidth;

ystep=1;
frame_inds=1:ystep:36;

load ../coordml8.mat    %%%% LOADING THE COORDINATES

%basefilename='../gradfilt1_';
basefilename='/proj/cavel/users/yoav/MOSAIC/MAY26/gradfilt1_';
postfix='.tif';
basephotoname='photo';
rawname='basicim';
netframes=[1:9 , 11:37];

ILUTZIM=sparse([]);
tic
%%%%%%%%%%%%%%%%%%%%%%%%%%%%%%%%%%%%%%%%%%%%%%%%%%%%%%%%%%%%%%%%%%%%%%%%
%%%%%%%%%%%%%%%%%%%%%%%%%%%%%%%% MERGING IMAGES IN A BIG FRAME
for indframe=1:length(frame_inds),
   yframe_ind=frame_inds(indframe);

yframe=netframes(yframe_ind);
   sframe=sprintf('%d',yframe);
   shem2=[basefilename sframe postfix];
   rawim=imread(shem2);
   basicim=double(flipud(rawim))-1;
   photo=uint8(basicim(bottom:roof,left:right));

centerx=centerx2(yframe_ind);
   centery=centery2(yframe_ind);

oldcell{1,1}=photo;         % the 1st (old) image
       oldcell{2,1}=centerx;    %coordinates of center of old image
     oldcell{3,1}=centery;

[beseder,xbeseder,ybeseder,valbeseder]=subpts21(oldcell,greatL,greatR,greatD,greatU,goodpts);
   beseder_ind=find(beseder);
   xsmall=xbeseder(beseder_ind);
   ysmall=ybeseder(beseder_ind);
   valsmall=valbeseder(beseder_ind);

[rows,cols]=size(photo);

if  ~(indframe==1)
      bothbeseder= (oldbeseder & beseder);
         beseder_ind=find(bothbeseder);
      OLDxsmall=xbesederold(beseder_ind);
      OLDysmall=ybesederold(beseder_ind);
      OLDval=    valold(beseder_ind);
      NEWxsmall=xbeseder(beseder_ind);
      NEWysmall=ybeseder(beseder_ind);
```

```
        NEWval    =valbeseder(beseder_ind);

XPIX=ones(length(OLDxsmall),1)*xpix;
        OLDXSMALL=OLDxsmall*ones(1,imagewidth);
        IOLD=find(~(abs(XPIX-OLDXSMALL)'));

chunk=sparse( (zeros(length(OLDxsmall),imagewidth) )' );
        chunk(IOLD)=NEWval;      % positive sign NEWXSMALL=NEWxsmall*ones(1,imagewidth);
        INEW=find(~(abs(XPIX-NEWXSMALL)'));
        chunk(INEW)=-OLDval;     %minus sign
        chunk=sparse( chunk' );

ILUTZIM=[ILUTZIM; chunk];

%figure(2);   hold off;    image(oldphoto);
        %colormap(gray(256));  axis('image','off','xy');
        %set(gcf,'position',[59 292 612 108]);
        %set(gca,'position',[0 0 1 1]);   hold on
        %plot(OLDxsmall,OLDysmall,'r.'); axis xy
        %axis on; grid on; set(gca,'xtick',0:10:700); set(gca,'ytick',7:10:250);
    %figure(3);       hold off;     image(photo);
        %colormap(gray(256));  axis('image','off','xy');
        %Xwide=cols; Ywide=round(Xwide*rows/cols);
        %set(gcf,'position',[59 100 612 108]);
        %set(gca,'position',[0 0 1 1]);   hold on;
        %plot(NEWxsmall,NEWysmall,'r.'); axis xy
    %axis on; grid on; set(gca,'xtick',0:10:700); set(gca,'ytick',7:10:250);
    end oldbeseder=beseder;
    xbesederold=xbeseder;
    ybesederold=ybeseder;
    valold=valbeseder;
end
toc ILUTZ=sparse(ILUTZIM);
whos ILUTZ
clear ILUTZIM clear A oldphoto D U L R INEW IOLD Lshulaim NEWXSMALL NEWval NEWxsmall
clear NEWysmall OLDXSMALL OLDval OLDxsmall OLDysmall SE XPIX xpix
clear Xwide Ywide ans beseder beseder_ind bigcols bigrows bothbeseder
clear bottom chunk roof cols rows fracoctav frame_inds fusedcell
clear mx mxx netframes octavnum oldLshulaim oldbeseder oldcell
clear photo oldcell clipped fusedclipped saturated dilsaturated
clear netclipped beseder netfused LI LG centerx centery Dnew Dold
clear Unew Uold Lnew Lold Rnew Rold centerx2 centery2 oldcols oldrows
clear bigrows bigcols greatcenterx greatcentery ystep fusedcell
clear rawim basicim X big2D basefilename basephotoname SE picked_ind
clear centerx centery imagehight indframe postfix right roof spanx spany
clear rawname sframe shem2 tikunx tikuny yframe yframe_ind sun sunerror
clear tikunx tikuny tzamtzam valbeseder valint valold valsmall vec
clear xbeseder xbesederold xsmall ybeseder ybesederold ysmall ystep close all
pack
```

```
%%%%%%%%%%%%%%%%%%%%%%%%%%%%%%%%%%%%%%%%%%%%%%%%%%% ynegat=(ILUTZ<0);
yposit=(ILUTZ>0);
ynozer=(ynegat | yposit);
ymeasured=sum(ynozer);
meanmeasured=mean(ymeasured);
%saf= min([ 1+(meanmeasured/10), 5]);
saf=1;
reliable=find(~(ymeasured<saf));
%mnn=max([min(reliable)-1, 1]);
mnn= min(reliable)-1 ;
%mxx=min([max(reliable)+1, imagewidth]);
mxx= max(reliable)+1 ;
%I=find(ymeasured);
%endmesures=min([max(I)+1, imagewidth]);

mnnozer=ynozer(:,1:mnn);
J=[];
if mnn>1
   J=find((sum(mnnozer'))');
elseif mnn==1
    J=find(mnnozer);
end
NEWILUTZ=ILUTZ;
NEWILUTZ(J,:)=0;

mxnozer=ynozer(:,mxx:imagewidth);
J=[];
if  (mxx<imagewidth)
   J=find((sum(mxnozer'))');
elseif (imagewidth==mxx)
    J=find(mxnozer);
end
NEWILUTZ(J,:)=0;

ynegat=(NEWILUTZ<0);
yposit=(NEWILUTZ>0);
ynozer=(ynegat | yposit);
ymeasured=sum(ynozer);

yesmeasured=find(ymeasured>0);
mnn=min(yesmeasured);
mxx=max(yesmeasured);

oldimagewidth=imagewidth;

imagewidth=mxx-mnn+1;
NETILUTZ=NEWILUTZ(:,mnn:mxx);

clear  I J NEWILUTZ mnnozer mxnozer reliable yesmeasured
clear ynegat ynozer yposit meanmeasured

%%%%%%%%%%%%%%%%%%%%%%%%%%%%%%%%%%%%%%%%%%%%%%%%%%

%imagewidth=oldimagewidth;

tic amain=ones(imagewidth,1);
```

```
Amain=diag(amain);

aoff1=-0.5*ones(imagewidth-1,1);
aoff1(1)=-1;
Aoff1=diag(aoff1,1);

aoff_1=-0.5*ones(imagewidth-1,1);
aoff_1(imagewidth-1)=-1;
Aoff_1=diag(aoff_1,-1);

SM=Amain+Aoff1+Aoff_1;
SM(1,:)=0;
SM(imagewidth,:)=0;
clear Amain Aoff1 Aoff_1 aoff_1 aoff1 amain sqlambda=sqrt(lambda);
HALAKUT=sqlambda*sparse(SM);

LOCENERG=NETILUTZ.^2;
%locenerg=sqrt(sum(LOCENERG'))';
locenerg=(sum(LOCENERG'))';
maxenerg=sqrt(max(locenerg(:)));

NORMILUTZ=NETILUTZ/235;

ALLILUTZ=[NORMILUTZ; HALAKUT];
clear HALAKUT SM LOCENERG NORMILUTZ NETILUTZ
pack

[U,S,V]=svd(full(ALLILUTZ),0);
s=diag(S);
[Y,I]=min(s)

clear S U

M=V(:,I);
[Mxx,I]=max(abs(M));
Imn=min(I);
mpeak=M(Imn);

m=M/mpeak;
m_amud=m;

%%%%%%%%%%%%%%%%%%%%%%%%%%%%%%%%%%%%%%%%%%%%%
%invC=(NORMILUTZ'*NORMILUTZ) + 0.5*eye(imagewidth);
invC=(ALLILUTZ'*ALLILUTZ) + 0.5*eye(imagewidth);
C=inv(invC);

%NORMILUTZ=NETILUTZ/235;
%Sr=m_amud'*((NORMILUTZ'*NORMILUTZ)*m_amud);
Sr=m_amud'*(invC*m_amud);
%LOCENERG=NORMILUTZ.^2;
LOCENERG=ALLILUTZ.^2;
%locenerg=sqrt(sum(LOCENERG'))';
locenerg=(sum(LOCENERG'))';
n_keilu=sum(locenerg(:));
dof=length(m_amud)-1;
syx=sqrt(Sr/(n_keilu-dof));
syx2=syx^2;
```

```
C_norm=C*syx2;
sig_m=sqrt(diag(C_norm));

figure(5)
plot(log10(sig_m(1:imagewidth)./m_amud(mnn:mxx)))
grid on

%%%%%%%%%%%%%%%%%%%%%%%%%%%%%%%%%%%%%%%%% toc clear V mlog=log(abs(m));
%P=mlog';
P=zeros(1,oldimagewidth);
P(mnn:mxx)=mlog;
leftmarg=1:mnn-1;
P(fliplr(leftmarg))=2*mlog(1)-mlog(leftmarg+1);
rightmarg=mxx+1:oldimagewidth;
oldrightmarg=rightmarg-oldimagewidth+imagewidth;
P(fliplr(rightmarg))=2*mlog(imagewidth)-mlog(oldrightmarg-1);

%%%%%%%%%%%%%%%%%%%%%%%%%%%%%%%%%%%%%%%%%%%%%%%

L=length(P);
Imain=ones(L,1);
if mnn>1
   Imain(1:mnn)=1;
end
if mxx<L
   Imain(mxx+1:L)=1;
end Imat=sparse(diag(Imain));

amain=ones(L,1);
Amain=diag(amain);

aoff1=-0.5*ones(L-1,1);
aoff1(1)=-1;
Aoff1=diag(aoff1,1);

aoff_1=-0.5*ones(L-1,1);
aoff_1(L-1)=-1;
Aoff_1=diag(aoff_1,-1);

S=sparse(Amain+Aoff1+Aoff_1);
S(1,:)=0;
S(L,:)=0;
clear Amain Aoff1 Aoff_1 aoff_1 aoff1 amain StS=S'*S;
clear S;
```

```
R=Imat + lambdalog*StS;

iR=inv(R);
Y=iR*P';

Ynorm=Y-max(Y);
smoothm=exp(Ynorm');

%%%%%%%%%%%%%%%%%%%%%%%%%%%%%%%%%%%%%%%%%
mlogdelta=(sig_m(1:imagewidth)./m_amud(mnn:mxx)) ;
%P=mlog';
dP=zeros(1,oldimagewidth);
dP(mnn:mxx)=mlogdelta;
leftmarg=1:mnn-1;
dP(fliplr(leftmarg))=2*mlogdelta(1)-mlogdelta(leftmarg+1);
rightmarg=mxx+1:oldimagewidth;
oldrightmarg=rightmarg-oldimagewidth+imagewidth;
dP(fliplr(rightmarg))=2*mlogdelta(imagewidth)-mlogdelta(oldrightmarg-1);

dY=iR*dP';

%%%%%%%%%%%%%%%%%%%%%%%%%%%%%%%%%%%%%%%%%%%%%%%%%%%%%% longm=exp(P);
longdm=smoothm.*dY';

m_lemata=smoothm-longdm;
m_lemala=smoothm+longdm;

figure(1)
hold off
plot(longm,'b')
hold on
plot(smoothm,'r')
plot(m_lemata,'m')
plot(m_lemala,'m')
set(gca,'xlim',[1,oldimagewidth]);
set(gca,'ylim',[0 1]);

dlog2m=dY'/log(2);
log2m_lemata=log2(smoothm)-dlog2m;
log2m_lemala=log2(smoothm)+dlog2m;

figure(2)
hold off
plot(log2(abs(longm)),'b')
hold on
plot(log2(smoothm),'r')
plot(log2m_lemata,'m')
plot(log2m_lemala,'m')
set(gca,'xlim',[1,oldimagewidth]);

m=smoothm;
delta_m=longdm;
save randecay37.mat xint m delta_m Ynorm smoothm C ILUT2 sig_m mnn mxx
```

```
load ../decayfun
origm=valint/max(valint);
figure(1)
hold on
plot(origm,'g')
set(gca,'xlim',[1,oldimagewidth]);

figure(2)
hold on
plot(log2(origm),'g')
set(gca,'xlim',[1,oldimagewidth]);

function [small,delta2small]=mizoorml21(big,delta2big,levels,shape);

newA=big;
newdelta2A=delta2big;

for iteration=1:levels,
   [reducedA,reducedelta2A]=reduceml21(newA,newdelta2A,shape);
   newA=reducedA;
   newdelta2A=reducedelta2A;
end small=newA;
delta2small=newdelta2A;
function [small,delta2small]=mizoorml21_xy(big,delta2big,levels_x,levels_y,shape);

newA=big;
newdelta2A=delta2big;

if ~(levels_x==levels_y)
    for iteration=1:min([levels_x,levels_y]),
       [reducedA_x,reducedelta2A_x]=reduceml21_x(newA,newdelta2A,shape);
       [reducedA,reducedelta2A]=reduceml21_y(reducedA_x,reducedelta2A_x,shape);
            newA=reducedA;
       newdelta2A=reducedelta2A;
    end

[a,maindirection]=max([levels_x,levels_y]);
    if maindirection==1      %%% x-direction is the main movement unceratinty
          for iteration=levels_y+1 : levels_x,
            [reducedA,reducedelta2A]=reduceml21_x(newA,newdelta2A,shape);
               newA=reducedA;
            newdelta2A=reducedelta2A;
       end
    else                                              %%% y-direction is the main movement unceratinty
          for iteration=levels_x+1 : levels_y,
           [reducedA,reducedelta2A]=reduceml21_y(newA,newdelta2A,shape);
               newA=reducedA;
            newdelta2A=reducedelta2A;
       end
    end
else
   levels=levels_x;
   for iteration=1:levels,
       [reducedA_x,reducedelta2A_x]=reduceml21_x(newA,newdelta2A,shape);
```

```
        [reducedA,reducedelta2A]=reducem121_y(reducedA_x,reducedelta2A_x,shape);
                newA=reducedA;
        newdelta2A=reducedelta2A;
    end
end small=newA;
delta2small=newdelta2A;

function diffml=mostlikely2(oldcell,newcell)
%
% corrcoef=scalprod2(Zoldgreat,Znewgreat)
% Calculates the correlation coefficient ("normalized")
% between partly overlapping images Zoldgreat and Znewgreat .
% The result is    corrcoef Zold=oldcell{1,1};       %THE 1ST SUB-IMAGE
Znew=newcell{1,1};       %THE 2ND SUB-IMAGE DELTAZ2old=oldcell{2,1};
DELTAZ2new=newcell{2,1};

nanold=uint8(isnan(Zold));
nannew=uint8(isnan(Znew));
nangreat= (nanold | nannew);
E=~nangreat;
F=find(E);

Zoldneto=NaN*ones(size(Zold));
Znewneto=NaN*ones(size(Znew));
DELTAZ2oldneto=NaN*ones(size(Zold));
DELTAZ2newneto=NaN*ones(size(Znew));
bestvalue=NaN*ones(size(Zold));

if isempty(F)
    diffml=Inf;
else
        Zoldneto(F)=Zold(F);
        Znewneto(F)=Znew(F);
    DELTAZ2oldneto(F)=DELTAZ2old(F);
    DELTAZ2newneto(F)=DELTAZ2new(F);
%    Sigmaold=sqrt(DELTAZ2oldneto);
%    Sigmanew=sqrt(DELTAZ2newneto);
    Sigma2old=DELTAZ2oldneto;
    Sigma2new=DELTAZ2newneto;

nominat= (Zoldneto(F)./Sigma2old(F)) + (Znewneto(F)./Sigma2new(F)) ;
    denomin= (1./Sigma2old(F)) + (1./Sigma2new(F));
    sig2seam= 1./denomin;
    bestvalue(F)=sig2seam.*nominat;

%    Eold=( (bestvalue(F) -Zoldneto(F))./Sigmaold(F) ).^2;
%    Enew=( (bestvalue(F) -Znewneto(F))./Sigmanew(F) ).^2;
    Eold= ((bestvalue(F) -Zoldneto(F)).^2) ./Sigma2old(F)   ;
    Enew= ((bestvalue(F) -Znewneto(F)).^2) ./Sigma2new(F)   ;
    E=Eold+Enew;
    diffml=mean(E(:));
end
```

```
function [translatex,translatey]=gmultireml3l(oldcell,newcell,levels_x,levels_y,minlevel)
%
% [translatex,translatey]=multiml5(oldcell,newcell,levels_x,levels_y,minlevel)
% oldcell  and  newcell  have two input images at raw resolution
% who will be registerred.
% THE REGISTRATION IS DONE IN A COARSE-TO-FINE MANNER. The output vector
% is the (x,y) shift of the image in newcell relative to the one in
% oldcell.
%
% See also  scaledmove7  mizoor3  putinbig6 shape='valid';

[oldgreatcell,newgreatcell]=puthullml2(oldcell,newcell);
Za=oldgreatcell{1,1};
DELTAZ2a=oldgreatcell{2,1};
centerx1=0;
centery1=0;

Zb=newgreatcell{1,1};
DELTAZ2b=newgreatcell{2,1};
centerx2(1)=0;
centery2(1)=0;
clear oldgreatcell newgreatcell if ~(levels_x==levels_y)
      [a,maindirection]=max([levels_x,levels_y]);
      if maindirection==1                           %%% x-direction is the main movement
unceratinty
      levelseq=[levels_x:-1:levels_y+1];
            for levelind=1:length(levelseq),
            level=levelseq(levelind);
            if ~(levelind==1)
            leveldifference=levelseq(levelind-1)-level;
            centerx2(levelind)=centerx2temp*(2^leveldifference);
            centery2(levelind)=centery2temp;
            end
        [photoA,delta2A]=mizoorml21_xy(Za,DELTAZ2a,level,levels_y,shape);
        [photoB,delta2B]=mizoorml21_xy(Zb,DELTAZ2b,level,levels_y,shape);

Acell{1,1}=photoA;
                  Acell{2,1}=delta2A;
                  Acell{3,1}=centerx1;
                  Acell{4,1}=centery1;

% figure(5);  image(42*photoA); colormap(gray(256)); axis xy;
% figure(6);  image(42*photoB); colormap(gray(256)); axis xy;
% figure(7);  imagesc(-log((delta2A))); colormap(gray(256)); axis xy;
% figure(8);  imagesc(-log((delta2B))); colormap(gray(256)); axis xy;
% 22222
% pause Bcell{1,1}=photoB;
                  Bcell{2,1}=delta2B;
```

```
                    Bcell{3,1}=centerx2(levelind);
                    Bcell{4,1}=centery2(levelind);

[xmove,ymove]=mlscalemov21(Acell,Bcell);
                    centerx2temp=centerx2(levelind)+xmove;
                    centery2temp=centery2(levelind)+ymove;
      end
   else                      %%% y-direction is the main movement unceratinty
      levelseq=[levels_y:-1:levels_x+1];
            for levelind=1:length(levelseq),
            level=levelseq(levelind);
            if ~(levelind==1)
            leveldifference=levelseq(levelind-1)-level;
            centerx2(levelind)=centerx2temp;
            centery2(levelind)=centery2temp*(2^leveldifference);
            end
         [photoA,delta2A]=mizoorml21_xy(Za,DELTAZ2a,levels_x,level,shape);
         [photoB,delta2B]=mizoorml21_xy(Zb,DELTAZ2b,levels_x,level,shape);

Acell{1,1}=photoA;
                    Acell{2,1}=delta2A;
                    Acell{3,1}=centerx1;
                    Acell{4,1}=centery1;

Bcell{1,1}=photoB;
                Bcell{2,1}=delta2B;
                    Bcell{3,1}=centerx2(levelind);
                    Bcell{4,1}=centery2(levelind);

[xmove,ymove]=mlscalemov21(Acell,Bcell);
                    centerx2temp=centerx2(levelind)+xmove;
                    centery2temp=centery2(levelind)+ymove;
      end
   end
end %%%%%%%%%%%%%%%%%%%%%%%%%%%%%%%%%%%%%%%%%%%%%%%%%%%%%%%%%%%%%%%%%%%%%%%
if ~(levels_x==levels_y)
   [a,maindirection]=max([levels_x,levels_y]);
   if maindirection==1
      levelseq=[levels_y:-1:minlevel];
      centerx2(1)=centerx2temp*(2^leveldifference);
      centery2(1)=centery2temp;
   else
      levelseq=[levels_x:-1:minlevel];
            centerx2(1)=centerx2temp;
            centery2(1)=centery2temp*(2^leveldifference);
   end
else
   levelseq=[levels_x:-1:minlevel];
   centerx2(1)=0;
   centery2(1)=0;
end for levelind=1:length(levelseq),
   level=levelseq(levelind);
  if ~(levelind==1)
      leveldifference=levelseq(levelind-1)-level;
```

```
        centerx2(levelind)=centerx2temp*(2^leveldifference);
        centery2(levelind)=centery2temp*(2^leveldifference);
    end
    [photoA,delta2A]=mizoorml21(Za,DELTAZ2a,level,shape);
    [photoB,delta2B]=mizoorml21(Zb,DELTAZ2b,level,shape);

Acell{1,1}=photoA;
    Acell{2,1}=delta2A;
    Acell{3,1}=centerx1;
    Acell{4,1}=centery1;

Bcell{1,1}=photoB;
    Bcell{2,1}=delta2B;
    Bcell{3,1}=centerx2(levelind);
    Bcell{4,1}=centery2(levelind);

[xmove,ymove]=mlscalemov21(Acell,Bcell);
    centerx2temp=centerx2(levelind)+xmove;
    centery2temp=centery2(levelind)+ymove;
end translatex=centerx2temp*(2^minlevel);
translatey=centery2temp*(2^minlevel);

clear
close all
pack kamut=1240;
%lambda=3.5e+04;
%lambdalog=3.5e4;
%lambda=2.5e+04;
lambda=1e+04;
lambdalog=6e4;

load ../decayfun
clear m delta_m
load lsatmosaic0.mat

Lshulaim=0; oldLshulaim=0;
left=min(xint)+Lshulaim;
right=max(xint);
bottom=170; roof=355;
imagehight=roof-bottom+1;
imagewidth=right-left+1;
%sun=250;
%sun=100;
sun=190;
dark=2;

%%%%%%%%%%%%%%%%%%%%%%%%%%%%%%%%%%%%%%%%
%%%%%%%%%%%%%%%%%%%%%%%%%%%%%%%%%%%%%%%%%
logfused=log(1+fused);
mx=max(logfused(:));
imx8=(2^8)/mx;
logfused8=uint8(round(logfused*imx8));
[rows,cols]=size(logfused8);
L=1; R=cols;
```

```
D=1; U=rows;
figure(1);
hold off
image(logfused8);
colormap(gray(256)); axis('image','off','xy');
%Xwide=cols; Ywide=round(Xwide*rows/cols);
Xwide=cols/1.8; Ywide=round(Xwide*rows/cols);
set(gcf,'position',[55 109 Xwide Ywide]);
set(gca,'position',[0 0 1 1]);
vec=get(gcf,'position');
Ywide=vec(3)*rows/cols;
set(gcf,'position',[1 500 Xwide Ywide]);

spanx=R-L+1;
spany=U-D+1;
X=uint16(ones(spany,1)*(L:R));         %the coordinate grid of the combined-greater image
Y=uint16((D:U)'*ones(1,spanx));

%%%%%%%%%%%%%%%%%%%%%%%%%%%%%%%%%%%%%%%%%
%%%%%%%%%%%%%%%%%%%%%%%%%%%%%%%%%%%%%%%%% COORDINATE GRID OF THE MOSAIC
[bigrows,bigcols]=size(fused);
fusedcell{1,1}=flipud(fused);          % the 1st (old) image
fusedcell{2,1}=greatcenterx+oldLshulaim/2;  %coordinates of center of old image
fusedcell{3,1}=greatcentery;

mxx=max(fused(:));
%ybase=sqrt(2);
%denomin=log2(ybase);
%fracoctav=(log2(mxx/sun)/denomin) +1;
%intoctav=ceil(fracoctav);

[rows,cols]=size(fused);
greatL=(greatcenterx-(cols-1)/2);      %the  Left side of the image
greatR=(greatcenterx+(cols-1)/2);      % the Right side
greatD=(greatcentery-(rows-1)/2);      % the Down  of the image
greatU=(greatcentery+(rows-1)/2);      % the Upper side of the image
clear deltaz2 fused logfused8 X Y x y fusedcell logfused8 logfused
clear inrange inrange_ind intoctav lenrange linerand maxlevel minlevel
clear picked_ind imx8 xpix=1:imagewidth;

ystep=1;
frame_inds=1:ystep:36;

load ../coordml8.mat    %%%% LOADING THE COORDINATES basefilename='/proj/cavel/users/yoav/MOSAIC/MAY26/gradfiltl_';
postfix='.tif';    basephotoname='photo';   rawname='basicim';
netframes=[1:9 , 11:37];

ILUTZIM=sparse([]);
tic
%%%%%%%%%%%%%%%%%%%%%%%%%%%%%%%%%%%%%%%%%%%%%%%%%%%%%%%%%%%%%%%%%%%%%%%%%
%%%%%%%%%%%%%%%%%%%%%%%%%%%%%%%% MERGING IMAGES IN A BIG FRAME
for indframe=1:length(frame_inds)-1,
   yframe_ind=frame_inds(indframe);
```

```
yframe=netframes(yframe_ind);
sframe=sprintf('%d',yframe);
shem2=[basefilename sframe postfix];
rawim=imread(shem2);
basicim=double(flipud(rawim))-1;
photo=uint8(basicim(bottom:roof,left:right));

centerx=centerx2(yframe_ind);
centery=centery2(yframe_ind);

oldcell{1,1}=photo;        % the 1st (old) image
oldcell{2,1}=centerx;      %coordinates of center of old image
oldcell{3,1}=centery;

oldphoto=photo;

yframe_ind=frame_inds(indframe+1);

yframe=netframes(yframe_ind);
sframe=sprintf('%d',yframe);
shem2=[basefilename sframe postfix];
rawim=imread(shem2);
basicim=double(flipud(rawim))-1;
photo=uint8(basicim(bottom:roof,left:right));

centerx=centerx2(yframe_ind);
centery=centery2(yframe_ind);

newcell{1,1}=photo;        % the 1st (old) image
newcell{2,1}=centerx;      %coordinates of center of old image
newcell{3,1}=centery;

[oldselect,newselect]=ptspick7(oldcell,newcell,greatL,greatR,greatD,greatU);

%   [rows,cols]=size(photo);

oldxsmall=oldselect{1,1};
oldysmall=oldselect{2,1};
oldvals  =oldselect{3,1};

newxsmall=newselect{1,1};
newysmall=newselect{2,1};
newvals  =newselect{3,1};

chunkleng=length(oldvals);

chunk=sparse( (zeros(chunkleng,imagewidth) )' );

XPIX=ones(chunkleng,1)*xpix;

OLDXSMALL=oldxsmall*ones(1,imagewidth);
IOLD=find(~(abs(XPIX-OLDXSMALL)'));
chunk(IOLD)=newvals;                    % positive sign NEWXSMALL=newxsmall*ones(1,imagewidth);
INEW=find(~(abs(XPIX-NEWXSMALL)'));
chunk(INEW)=-oldvals;                   %minus sign
```

```
chunk=sparse( chunk' );
ILUTZIM=[ILUTZIM; chunk];

figure(2); hold off;    image(oldphoto);
    colormap(gray(256)); axis('image','off','xy');
    set(gcf,'position',[59 292 612 108]);
    set(gca,'position',[0 0 1 1]);    hold on
    plot(oldxsmall,oldysmall,'r.'); axis xy
    axis on; grid on; set(gca,'xtick',0:10:700); set(gca,'ytick',7:10:250);

figure(3); hold off;    image(photo);
    colormap(gray(256)); axis('image','off','xy');
    set(gcf,'position',[59 100 612 108]);
    set(gca,'position',[0 0 1 1]);    hold on;
    plot(newxsmall,newysmall,'r.'); axis xy
      axis on; grid on; set(gca,'xtick';0:10:700); set(gca,'ytick',7:10:250);

pause end
toc 5555555
pause

ILUTZ=sparse(ILUTZIM);
whos ILUTZ
clear ILUTZIM clear A oldphoto D U L R INEW IOLD Lshulaim NEWXSMALL NEWval NEWxsmall
clear NEWysmall OLDXSMALL OLDval OLDxsmall OLDysmall SE XPIX xpix
clear Xwide Ywide ans beseder beseder_ind bigcols bigrows bothbeseder
clear bottom chunk roof cols rows fracoctav frame_inds fusedcell
clear mx mxx netframes octavnum oldLshulaim oldbeseder oldcell
clear photo oldcell clipped fusedclipped saturated dilsaturated
clear netclipped beseder netfused LI LG centerx centery Dnew Dold
clear Unew Uold Lnew Lold Rnew Rold centerx2 centery2 oldcols oldrows
clear bigrows bigcols greatcenterx greatcentery ystep fusedcell
clear rawim basicim X big2D basefilename basephotoname SE picked_ind
clear centerx centery imagehight indframe postfix right roof spanx spany
clear rawname sframe shem2 tikunx tikuny yframe yframe_ind sun sunerror
clear tikunx tikuny tzamtzam valbeseder valint valold valsmall vec
clear xbeseder xbesederold xsmall ybeseder ybesederold ysmall ystep close all
pack

%%%%%%%%%%%%%%%%%%%%%%%%%%%%%%%%%%%%%%%%%%%%%%%%%%%%%% ynegat=(ILUTZ<0);
yposit=(ILUTZ>0);
ynozer=(ynegat | yposit);
ymeasured=sum(ynozer);
meanmeasured=mean(ymeasured);
%saf= min([ 1+(meanmeasured/10), 5]);
saf=1;
reliable=find(~(ymeasured<saf));
%mnn=max([min(reliable)-1, 1]);
```

```
mnn= min(reliable)-1 ;
%mxx=min([max(reliable)+1, imagewidth]);
mxx= max(reliable)+1 ;
%I=find(ymeasured);
%endmesures=min([max(I)+1, imagewidth]);

mnnozer=ynozer(:,1:mnn);
J=[];
if mnn>1
   J=find((sum(mnnozer'))');
elseif mnn==1
    J=find(mnnozer);
end
NEWILUTZ=ILUTZ;
NEWILUTZ(J,:)=0;

mxnozer=ynozer(:,mxx:imagewidth);
J=[];
if  (mxx<imagewidth)
   J=find((sum(mxnozer'))');
elseif (imagewidth==mxx)
    J=find(mxnozer);
end
NEWILUTZ(J,:)=0;

ynegat=(NEWILUTZ<0);
yposit=(NEWILUTZ>0);
ynozer=(ynegat | yposit);
ymeasured=sum(ynozer);

yesmeasured=find(ymeasured>0);
mnn=min(yesmeasured);
mxx=max(yesmeasured);

oldimagewidth=imagewidth;

imagewidth=mxx-mnn+1;
NETILUTZ=NEWILUTZ(:,mnn:mxx);

clear  I J NEWILUTZ  mnnozer mxnozer reliable yesmeasured
clear ynegat ynozer yposit meanmeasured

%%%%%%%%%%%%%%%%%%%%%%%%%%%%%%%%%%%%%%%%%%%%%%%%%%%%

%imagewidth=oldimagewidth;

tic amain=ones(imagewidth,1);
Amain=diag(amain);

aoff1=-0.5*ones(imagewidth-1,1);
aoff1(1)=-1;
Aoff1=diag(aoff1,1);

aoff_1=-0.5*ones(imagewidth-1,1);
aoff_1(imagewidth-1)=-1;
Aoff_1=diag(aoff_1,-1);

SM=Amain+Aoff1+Aoff_1;
```

```
SM(1,:)=0;
SM(imagewidth,:)=0;
clear Amain Aoff1 Aoff_1 aoff_1 aoff1 amain sqlambda=sqrt(lambda);
HALAKUT=sqlambda*sparse(SM);

LOCENERG=NETILUTZ.^2;
%locenerg=sqrt(sum(LOCENERG'))';
locenerg=(sum(LOCENERG'))';
maxenerg=sqrt(max(locenerg(:)));

NORMILUTZ=NETILUTZ/235;

ALLILUTZ=[NORMILUTZ; HALAKUT];
clear HALAKUT SM LOCENERG NORMILUTZ NETILUTZ
pack

[U,S,V]=svd(full(ALLILUTZ),0);
s=diag(S);
[Y,I]=min(s)

clear S U

M=V(:,I);
[Mxx,I]=max(abs(M));
Imn=min(I);
mpeak=M(Imn);

m=M/mpeak;
m_amud=m;

%%%%%%%%%%%%%%%%%%%%%%%%%%%%%%%%%%%%%%%%%%%
%invC=(NORMILUTZ'*NORMILUTZ) + 0.5*eye(imagewidth);
invC=(ALLILUTZ'*ALLILUTZ) + 0.5*eye(imagewidth);
C=inv(invC);

%NORMILUTZ=NETILUTZ/235;
%Sr=m_amud'*((NORMILUTZ'*NORMILUTZ)*m_amud);
Sr=m_amud'*(invC*m_amud);
%LOCENERG=NORMILUTZ.^2;
LOCENERG=ALLILUTZ.^2;
%locenerg=sqrt(sum(LOCENERG'))';
locenerg=(sum(LOCENERG'))';
n_keilu=sum(locenerg(:));
dof=length(m_amud)-1;
syx=sqrt(Sr/(n_keilu-dof));
syx2=syx^2;

C_norm=C*syx2;
sig_m=sqrt(diag(C_norm));

figure(5)
plot(log10(sig_m(1:imagewidth)./m_amud(mnn:mxx)))
grid on

%%%%%%%%%%%%%%%%%%%%%%%%%%%%%%%%%%%%%%%%%%%
```

```
toc clear V mlog=log(abs(m));
%P=mlog';
P=zeros(1,oldimagewidth);
P(mnn:mxx)=mlog;
leftmarg=1:mnn-1;
P(fliplr(leftmarg))=2*mlog(1)-mlog(leftmarg+1);
rightmarg=mxx+1:oldimagewidth;
oldrightmarg=rightmarg-oldimagewidth+imagewidth;
P(fliplr(rightmarg))=2*mlog(imagewidth)-mlog(oldrightmarg-1);

%%%%%%%%%%%%%%%%%%%%%%%%%%%%%%%%%%%%%%%%%%%%%%%%%%%%%%%%%%%%%%%%%%

L=length(P);
Imain=ones(L,1);
if mnn>1
   Imain(1:mnn)=1;
end
if mxx<L
   Imain(mxx+1:L)=1;
end Imat=sparse(diag(Imain));

amain=ones(L,1);
Amain=diag(amain);

aoff1=-0.5*ones(L-1,1);
aoff1(1)=-1;
Aoff1=diag(aoff1,1);

aoff_1=-0.5*ones(L-1,1);
aoff_1(L-1)=-1;
Aoff_1=diag(aoff_1,-1);

S=sparse(Amain+Aoff1+Aoff_1);
S(1,:)=0;
S(L,:)=0;
clear Amain Aoff1 Aoff_1 aoff_1 aoff1 amain StS=S'*S;
clear S;

R=Imat + lambdalog*StS;

iR=inv(R);
Y=iR*P';

Ynorm=Y-max(Y);
smoothm=exp(Ynorm');

%%%%%%%%%%%%%%%%%%%%%%%%%%%%%%%%%%%%%%%%
```

```
mlogdelta=(sig_m(1:imagewidth)./m_amud(mnn:mxx));
%P=mlog';
dP=zeros(1,oldimagewidth);
dP(mnn:mxx)=mlogdelta;
leftmarg=1:mnn-1;
dP(fliplr(leftmarg))=2*mlogdelta(1)-mlogdelta(leftmarg+1);
rightmarg=mxx+1:oldimagewidth;
oldrightmarg=rightmarg-oldimagewidth+imagewidth;
dP(fliplr(rightmarg))=2*mlogdelta(imagewidth)-mlogdelta(oldrightmarg-1);

dY=iR*dP';

%%%%%%%%%%%%%%%%%%%%%%%%%%%%%%%%%%%%%%%%%%%%%%%%%%%%%%%%%%%%%%%%%%%%%%%%% longm=exp(P);
longdm=smoothm.*dY';

m_lemata=smoothm-longdm;
m_lemala=smoothm+longdm;

figure(1)
hold off
plot(longm,'b')
hold on
plot(smoothm,'r')
plot(m_lemata,'m')
plot(m_lemala,'m')
set(gca,'xlim',[1,oldimagewidth]);
set(gca,'ylim',[0 1]);

dlog2m=dY'/log(2);
log2m_lemata=log2(smoothm)-dlog2m;
log2m_lemala=log2(smoothm)+dlog2m;

figure(2)
hold off
plot(log2(abs(longm)),'b')
hold on
plot(log2(smoothm),'r')
plot(log2m_lemata,'m')
plot(log2m_lemala,'m')
set(gca,'xlim',[1,oldimagewidth]);

m=smoothm;
delta_m=longdm;
save randecay37.mat xint m delta_m Ynorm smoothm C ILUTZ sig_m mnn mxx load ../decayfun
origm=valint/max(valint);
figure(1)
hold on
plot(origm,'g')
set(gca,'xlim',[1,oldimagewidth]);

figure(2)
```

```
hold on
plot(log2(origm),'g')
set(gca,'xlim',[1,oldimagewidth]);

clear
close all
pack width=101;
half_width=(width-1)/2;

load nfuseupdated

%%%%%%%%%%%%%%%%%%%%%%%%%%%%%%%%%%%%%%%%%%%%%%%%%%%%%%%%%%%
logfused=log(1+fused);
mx=max(logfused(:));
imx16=(2^16)/mx;
logfused16=uint16(round(logfused*imx16));

histlog=double(histeq(logfused16,256));

mn=min(histlog(:));
histlog=histlog-mn;
mx=max(histlog(:));
imx8=(2^8)/double(mx);
histlog8=uint8(round(double(histlog)*imx8));
[rows,cols]=size(logfused16);
L=1; R=cols;
D=1; U=rows;

figure(2);
hold off
imagesc(histlog8);
colormap(gray(256)); axis('image','off','xy');
Xwide=cols/1.8; Ywide=round(Xwide*rows/cols);
set(gcf,'position',[55 109 Xwide Ywide]);
set(gca,'position',[0 0 1 1]);
vec=get(gcf,'position');
Ywide=vec(3)*rows/cols;
set(gcf,'position',[1 500 Xwide Ywide]);

clear deltaz2 logfused bakasha=['\n PRESS ANY KEY BETWEEN ORDERS'...
         '\n Press the letter "n" for normalized histogram' ...
         '\n Press the letter "e" for normalized histogram'...
         '\n Press the digits "s","m","l" for smal//medium/large/windows \n\n'];

button=0;
sprintf(bakasha)
pause plotedimg=histlog8;

figure(2)
koteret1=sprintf('Click LEFT mouse to mark area. Window width is %d', width);
```

```
set(gcf,'name',koteretl)
    while ~(button==113),       %'q'= botton=113
        figure(2)
        [x,y,button]=ginput(1);
            hold on
                if (button==115)    %'s'= botton=115
            width=41;
                    koteretl=sprintf('Click LEFT mouse to mark area. Window width is %d',width);
                    set(gcf,'name',koteretl)
        elseif (button==109)   %'m'= botton=109
            width=75;
                    koteretl=sprintf('Click LEFT mouse to mark area. Window width is %d',width);
                    set(gcf,'name',koteretl)
        elseif (button==108)    %'l'= botton=108
            width=101;
                    koteretl=sprintf('Click LEFT mouse to mark area. Window width is %d',width);
                    set(gcf,'name',koteretl)
        elseif (button==1) | (button==3)
                    half_width=(width-1)/2;
            XL=round(x-half_width); XR=round(x+half_width);
            YD=round(y-half_width); YU=round(y+half_width);
            XLL=max(XL,L);   XRR=min(XR,R); YDD=max(YD,D); YUU=min(YU,U);

X=[XLL XLL XRR XRR];    Y=[YDD YUU YUU YDD];
            plotedimg=plotcontrs5(X,Y,plotedimg,histlog8);

figure(2);
                    hold off
                    imagesc(plotedimg);
                    colormap(gray(256)); axis('image','off','xy');
%Xwide=cols/1.8; Ywide=round(Xwide*rows/cols);
%set(gcf,'position',[55 109 Xwide Ywide]);
%set(gca,'position',[0 0 1 1]);
%vec=get(gcf,'position');
%Ywide=vec(3)*rows/cols;
%set(gcf,'position',[1 500 Xwide Ywide]);
            axis('image','off','xy');  set(gca,'position',[0 0 1 1]);
%           ribuax=[X, X(1)];  ribuay=[Y, Y(1)];
%           hold on; plot(ribuax,ribuay,'m-')

[enhanced,subenhanced,mnval,mxval]=stretchwin5(X,Y,fused,histlog8);
            smnval=sprintf('%d',round(mnval))
            smxval=sprintf('%d',round(mxval))

figure
            imagesc(subenhanced);
            colormap(gray(256))
            axis('image','off','xy'); set(gca,'position',[0 0 1 1]);
            set(gcf,'position',[100 100 2*width 2*width]);

end
        pause(0.5)
    end

%tofileimg=flipud(plotedimg);
%to_mx=max(tofileimg(:));
%tofileimg=double(tofileimg)/double(to_mx);
```

```
%imwrite(tofileimg,'plotedmos1.jpg','jpeg','Quality',100);

function plotedimg=plotcontrs5(X,Y,oldplotimg,logphoto)

XS=sort(X);
YS=sort(Y);
L=round(XS(2));
R=round(XS(3));
D=round(YS(2));
U=round(YS(3));

%    LD   LU   RU   RD   LD
Xp=[L    L    R    R    L];
Yp=[D    U    U    D    D];

XO=(L+R)/2;
YO=(D+U)/2;

spanx=size(oldplotimg,2);
spany=size(oldplotimg,1);

[LD_row,LD_col]=xy2ij_brack([L,D],spany);
[RD_row,RD_col]=xy2ij_brack([R,D],spany);
[LU_row,LU_col]=xy2ij_brack([L,U],spany);
[RU_row,RU_col]=xy2ij_brack([R,U],spany);

stam=flipud(logphoto);

smol=stam( LD_row:-1:LU_row ,LD_col);
newsmol=uint8(255*double(smol<128));

yamin=stam( RD_row:-1:RU_row ,RD_col);
newyamin=uint8(255*double(yamin<128));

lemata=stam( RD_row , LD_col:RD_col);
newlemata=uint8(255*double(lemata<128));

lemala=stam( RU_row , LU_col:RU_col);
newlemala=uint8(255*double(lemala<128));

%whos newsmol newyamin newlemata newlemala

%%%%%%%%%%%%%%%%%%%%%%%%%%%%%%%%%%%%%%%
stam=flipud(oldplotimg);

stam( LD_row:-1:LU_row ,LD_col)=newsmol;
stam( RD_row:-1:RU_row ,RD_col)=newyamin;
stam( RD_row , LD_col:RD_col)=newlemata;
stam( RU_row , LU_col:RU_col)=newlemala;

plotedimg=flipud(stam);

function prof=profil2(cols,transit)
```

```
mn=eps^7;
tmp=ones(1,cols);

L=1:transit;
R=cols-L+1;

%tmp(L)=mn+ (1-mn)*(L-1)/(transit-1);
%tmp(R)=mn+ (1-mn)*(L-1)/(transit-1);
tmp(L)=mn+ (1-mn) *  ( 1 - cos(pi*(L-1)/(transit-1))  )/2;
tmp(R)=mn+ (1-mn) *  ( 1 - cos(pi*(L-1)/(transit-1))  )/2;

prof=tmp;

function [oldselect,newselect]=ptspick6(oldcell,newcell,greatL,greatR,greatD,greatU)

sun=240;
%sun=200;
%sun=235;
dark=2;

kamut=50;
segments=20;

%%%%%%%%%%%%%%%%%%%%%%%%%%%%%%%%%%%%%%%%
%%%%%%%%%    DECODING THE CELLS INTO THEIR CONSTITUENTS

Zold=oldcell{1,1};         % the 1st (old) image
oldcenterx=oldcell{2,1};   %coordinates of center of old image
oldcentery=oldcell{3,1};

[oldrows,oldcols]=size(Zold);
Lold=oldcenterx-(oldcols-1)/2;     %the  Left side of the old image
Rold=oldcenterx+(oldcols-1)/2;     % the Right side
Dold=oldcentery-(oldrows-1)/2;     % the Down  of the old image
Uold=oldcentery+(oldrows-1)/2;     % the Upper side of the old image Znew=newcell{1,1};         % the 2nd (new) image
newcenterx=newcell{2,1};   %coordinates of center of new image
newcentery=newcell{3,1};

[newrows,newcols]=size(Znew);
Lnew=newcenterx-(newcols-1)/2;     %the  Left side of the new image
Rnew=newcenterx+(newcols-1)/2;     % the Right side
Dnew=newcentery-(newrows-1)/2;     % the Down  of the new image
Unew=newcentery+(newrows-1)/2;     % the Upper side of the new image spanx=greatR-greatL+1;
spany=greatU-greatD+1;

greatX=ones(spany,1)*(greatL:greatR);      %the coordinate grid of the combined-greater image
greatY=(greatD:greatU)'*ones(1,spanx);

%%%%%%% PUTTING THE OLD IMAGE IN THE COMBINED GREAT-GRID
```

```
[oldLDy,oldLDx]=find ((greatX==Lold) & (greatY==Dold));
[oldLUy,oldLUx]=find ((greatX==Lold) & (greatY==Uold));
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;
Zoldgreat=flipud(Zoldgreat);

%%%%%%%%% PUTTING THE NEW IMAGE IN THE COMBINED GREAT-GRID

[newLDy,newLDx]=find ((greatX==Lnew) & (greatY==Dnew));
[newLUy,newLUx]=find ((greatX==Lnew) & (greatY==Unew));
[newRDy,newRDx]=find ((greatX==Rnew) & (greatY==Dnew));
[newRUy,newRUx]=find ((greatX==Rnew) & (greatY==Unew));

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;
Znewgreat=flipud(Znewgreat);

%%%%%%%%%%%%%%% DIVIDING TO PARTS oldLOnan= (~isnan(Zoldgreat));
newLOnan= (~isnan(Znewgreat));

LOnan= (oldLOnan & newLOnan);

oversegm=max(LOnan);
I=find(oversegm);
shortL=min(I);
shortR=max(I);

deltax=(shortR-shortL)/segments;

%%%%%%%%%%%%%%%% SELECTING GOOD POINTS minlevel=dark;
maxlevel=sun;
oldinrange=( (Zoldgreat>minlevel) & (~(Zoldgreat>maxlevel)) );
newinrange=( (Znewgreat>minlevel) & (~(Znewgreat>maxlevel)) );

inrange= ((oldinrange & newinrange) & LOnan);
[rows,cols]=size(inrange);

greatCOLS=ones(rows,1)*(1:cols);

%figure(1);
%hold off
```

```
%imagesc(inrange);
%colormap(gray(256)); axis('image','off','xy');
%Xwide=cols/1.8; Ywide=round(Xwide*rows/cols);
%set(gcf,'position',[1 500 Xwide Ywide]);
%set(gca,'position',[0 0 1 1]);
%vec=get(gcf,'position');
%Ywide=vec(3)*rows/cols;
%set(gcf,'position',[1 500 Xwide Ywide]);
%pause goodpts=[];
for ypart=1:segments,
    Lsegm= shortL + round(deltax*(ypart-1));
    Rsegm= shortL + round(deltax*(ypart));

%    insegment= ( (~(greatX < Lsegm)) & (~(greatX > Rsegm)) );
    insegment= ( (~(greatCOLS < Lsegm)) & (~(greatCOLS > Rsegm)) );

beseder= (inrange & insegment);

%figure(1);
%hold off
%imagesc(beseder);
%colormap(gray(256)); axis('image','off','xy');
%[rows,cols]=size(inrange);
%Xwide=cols/1.8; Ywide=round(Xwide*rows/cols);
%set(gcf,'position',[1 500 Xwide Ywide]);
%set(gca,'position',[0 0 1 1]);
%vec=get(gcf,'position');
%Ywide=vec(3)*rows/cols;
%set(gcf,'position',[1 500 Xwide Ywide]);
%pause inrange_ind=find(beseder);

lenrange=length(inrange_ind);
    if lenrange<kamut
        goodpts=[goodpts; inrange_ind];
    else
        linerand=1+round((lenrange-1)*(rand(kamut,1)));
        picked_ind=inrange_ind(linerand);
        goodpts=[goodpts; picked_ind];
    end end

%%%%%%%%% THE POINT COORDS & VALS x=greatX(goodpts);
y=greatY(goodpts);

oldxsmall=x-Lold+1;
oldysmall=y-Dold+1;

newxsmall=x-Lnew+1;
newysmall=y-Dnew+1;
```

```
oldvals=Zoldgreat(goodpts);
newvals=Znewgreat(goodpts);

%%%%%%%%%%%%%%%%%%%%%%%%%%%
oldselect{1,1}=oldxsmall;
oldselect{2,1}=oldysmall;
oldselect{3,1}=oldvals;

newselect{1,1}=newxsmall;
newselect{2,1}=newysmall;
newselect{3,1}=newvals;

function [oldgreatcell,newgreatcell]=putbigml3(oldcell,newcell)
%
% oldcell and newcell contain images to put in a single
% coordinate system, and the vector-coordinates of the
% image centers in (x,y).
% oldgreatcell and newgreatcell are the cells of the new large
% frame with a common coorinate system, in each of which
% the single images are embedded. These cells also contain the
% coordinates of the center of the big frames.

%%%%%%%%%%%%%%%%%%%%%%%%%%%%%%%%%%%%%%%%%
%%%%%%%%%   DECODING THE CELLS INTO THEIR CONSTITUENTS

Zold     =oldcell{1,1};      % the 1st (old) image
DELTAZ2old=oldcell{2,1};
oldcenterx=oldcell{3,1};     %coordinates of center of old image
oldcentery=oldcell{4,1};

Znew=newcell{1,1};           % the 2nd (new) image
DELTAZ2new=newcell{2,1};
newcenterx=newcell{3,1};
newcentery=newcell{4,1};

%%%%%%%%%%%%%%%%%%%%%%%%%%%%%%%%%%%%%%%%

[oldrows,oldcols]=size(Zold);
Lold=oldcenterx-(oldcols-1)/2;     %the  Left side of the old image
Rold=oldcenterx+(oldcols-1)/2;     % the Right side
Dold=oldcentery-(oldrows-1)/2;     % the Down  of the old image
Uold=oldcentery+(oldrows-1)/2;     % the Upper side of the old image

[newrows,newcols]=size(Znew);
Lnew=newcenterx-(newcols-1)/2;     %the Left side of the new (2nd) image
Rnew=newcenterx+(newcols-1)/2;
Dnew=newcentery-(newrows-1)/2;
Unew=newcentery+(newrows-1)/2;

greatL=min([Lold,Lnew]);           %the Left side of the combined-greater image
greatR=max([Rold,Rnew]);
greatD=min([Dold,Dnew]);
greatU=max([Uold,Unew]);
spanx=greatR-greatL+1;
```

```
spany=greatU-greatD+1;

greatX=ones(spany,1)*(greatL:greatR);        %the coordinate grid of the combined-greater image
greatY=(greatD:greatU)'*ones(1,spanx);

%%%%%%% PUTTING THE OLD IMAGE IN THE COMBINED GREAT-GRID

[oldLDy,oldLDx]=find ((greatX==Lold) & (greatY==Dold));
[oldLUy,oldLUx]=find ((greatX==Lold) & (greatY==Uold));
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;
Zoldgreat=flipud(Zoldgreat);

DELTAZoldgreat=NaN*zeros(size(greatX));
DELTAZoldgreat( oldLD_row:-1:oldLU_row , oldLD_col:oldRD_col )=DELTAZ2old;
DELTAZoldgreat=flipud(DELTAZoldgreat);

%%%%%%%%% PUTTING THE NEW IMAGE IN THE COMBINED GREAT-GRID

[newLDy,newLDx]=find ((greatX==Lnew) & (greatY==Dnew)) ;
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;
Znewgreat=flipud(Znewgreat);

DELTAZnewgreat=NaN*zeros(size(greatX));
DELTAZnewgreat( newLD_row:-1:newLU_row , newLD_col:newRD_col )=DELTAZ2new;
DELTAZnewgreat=flipud(DELTAZnewgreat);

%%%%%%%%%%%%%%%%% THE CENTRAL COORDINATE OF THE (WARPED) GREAT-COMBINED IMAGE greatcenterx=(greatR+greatL)/2;
greatcentery=(greatU+greatD)/2;

%%%%%%%%%%%%%%%%%%%%%%%%%%%%%%%%%%%%%%%%%%%%%%%%%%%%%%%%%%%%%%%%%%%%%%%%
%%%%%%%%%%%%%%%%% PUTTING THE OUTPUT TO CELLS, FOR EASIER TRANSFER oldgreatcell{1,1}=Zoldgreat;
oldgreatcell{2,1}=DELTAZoldgreat;
oldgreatcell{3,1}=greatcenterx;
oldgreatcell{4,1}=greatcentery;

newgreatcell{1,1}=Znewgreat;
```

```
newgreatcell{2,1}=DELTAZnewgreat;
newgreatcell{3,1}=greatcenterx;
newgreatcell{4,1}=greatcentery;

function [oldgreatcell,newgreatcell]=puthullmll(oldcell,newcell)
%
% oldcell and newcell contain images to put in a single
% coordinate system, and the vector-coordinates of the
% image centers in (x,y).
% oldgreatcell  and  newgreatcell are the cells of the new large
% frame with a common coorinate system, in each of which
% the single images are embedded. These cells also contain the
% coordinates of the center of the big frames.

ymargin=100;

%%%%%%%%%%%%%%%%%%%%%%%%%%%%%%%%%%%%%%%%%
%%%%%%%%%%   DECODING THE CELLS INTO THEIR CONSTITUENTS

Zold     =oldcell{1,1};         % the 1st (old) image
DELTAZ2old=oldcell{2,1};
oldcenterx=oldcell{3,1};        %coordinates of center of old image
oldcentery=oldcell{4,1};

Znew=newcell{1,1};              % the 2nd (new) image
DELTAZ2new=newcell{2,1};
newcenterx=newcell{3,1};
newcentery=newcell{4,1};

%%%%%%%%%%%%%%%%%%%%%%%%%%%%%%%%%%%%%%%%%

[oldrows,oldcols]=size(Zold);
Lold=ceil(oldcenterx-(oldcols-1)/2)-0.5;      %the  Left side of the old image
Rold=ceil(oldcenterx+(oldcols-1)/2)-0.5;      % the Right side
Dold=ceil(oldcentery-(oldrows-1)/2)-0.5;      % the Down  of the old image
Uold=ceil(oldcentery+(oldrows-1)/2)-0.5;      % the Upper side of the old image

[newrows,newcols]=size(Znew);
Lnew=ceil(newcenterx-(newcols-1)/2)-0.5;      %the Left side of the new (2nd) image
Rnew=ceil(newcenterx+(newcols-1)/2)-0.5;
Dnew=ceil(newcentery-(newrows-1)/2)-0.5;
Unew=ceil(newcentery+(newrows-1)/2)-0.5;

greatL=min([Lold,Lnew]);           %the Left side of the combined-greater image
greatR=max([Rold,Rnew]);
greatD=min([Dold,Dnew]);
greatU=max([Uold,Unew]);
spanx=greatR-greatL+1;
spany=greatU-greatD+1;

greatX=ones(spany,1)*(greatL:greatR);     %the coordinate grid of the combined-greater image
greatY=(greatD:greatU)'*ones(1,spanx);

%%%%%%%% PUTTING THE OLD IMAGE IN THE COMBINED GREAT-GRID

[oldLDy,oldLDx]=find ((greatX==Lold) & (greatY==Dold));
[oldLUy,oldLUx]=find ((greatX==Lold) & (greatY==Uold));
```

```
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;

DELTAZoldgreat=NaN*zeros(size(greatX));
DELTAZoldgreat( oldLD_row:-1:oldLU_row , oldLD_col:oldRD_col )=DELTAZ2old;

%%%%%%%% PUTTING THE NEW IMAGE IN THE COMBINED GREAT-GRID

[newLDy,newLDx]=find ((greatX==Lnew) & (greatY==Dnew)) ;
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;

DELTAZnewgreat=NaN*zeros(size(greatX));
DELTAZnewgreat( newLD_row:-1:newLU_row , newLD_col:newRD_col )=DELTAZ2new;

%%%%%%%%%%%%%%%%%%%% %%%%%%% DEFINING HULL
Lnew_margin=Lnew-ymargin;
Rnew_margin=Rnew+ymargin;
Dnew_margin=Dnew-ymargin;
Unew_margin=Unew+ymargin;

hullL=min([ max([Lold,Lnew_margin]), Lnew]);                    %the Left side of the combined-greater image
hullR=max([ min([Rold,Rnew_margin]), Rnew]);
hullD=min([ max([Dold,Dnew_margin]), Dnew]);
hullU=max([ min([Uold,Unew_margin]), Unew]);

[hullLDy,hullLDx]=find ((greatX==hullL) & (greatY==hullD));
[hullLUy,hullLUx]=find ((greatX==hullL) & (greatY==hullU));
[hullRDy,hullRDx]=find ((greatX==hullR) & (greatY==hullD));
[hullRUy,hullRUx]=find ((greatX==hullR) & (greatY==hullU));

[hullLD_row,hullLD_col]=xy2ij_brack([hullLDx,hullLDy],spany);
[hullRD_row,hullRD_col]=xy2ij_brack([hullRDx,hullRDy],spany);
[hullLU_row,hullLU_col]=xy2ij_brack([hullLUx,hullLUy],spany);
[hullRU_row,hullRU_col]=xy2ij_brack([hullRUx,hullRUy],spany);

Zoldhull=Zoldgreat( hullLD_row:-1:hullLU_row , hullLD_col:hullRD_col );
Znewhull=Znewgreat( hullLD_row:-1:hullLU_row , hullLD_col:hullRD_col );
DELTAZ2oldhull=DELTAZoldgreat( hullLD_row:-1:hullLU_row , hullLD_col:hullRD_col );
DELTAZ2newhull=DELTAZnewgreat( hullLD_row:-1:hullLU_row , hullLD_col:hullRD_col );
```

```
%%%%%%%%%%%%%%%%% THE CENTRAL COORDINATE OF THE (WARPED) GREAT-COMBINED IMAGE
%figure(1)
%imagesc(Zoldhull); axis xy
%figure(2)
%imagesc(Znewhull); axis xy
%Zoldhull=flipud(Zoldhull);
%Znewhull=flipud(Znewhull);

%figure(3)
%imagesc(Zoldhull); axis xy; colormap(gray(256))
%figure(4)
%imagesc(Znewhull); axis xy; colormap(gray(256))
%size(Zoldhull)

hullcenterx=(hullR+hullL)/2;
hullcentery=(hullU+hullD)/2;

%%%%%%%%%%%%%%%%%%%%%%%%%%%%%%%%%%%%%%%%%%%%%%%%%%%%%%%%%%%%%%%%%%%%%
%%%%%%%%%%%%%%%%% PUTTING THE OUTPUT TO CELLS, FOR EASIER TRANSFER oldgreatcell{1,1}=Zoldhull;
oldgreatcell{2,1}=DELTAZ2oldhull;
oldgreatcell{3,1}=hullcenterx;
oldgreatcell{4,1}=hullcentery;

newgreatcell{1,1}=Znewhull;
newgreatcell{2,1}=DELTAZ2newhull;
newgreatcell{3,1}=hullcenterx;
newgreatcell{4,1}=hullcentery;

function [oldgreatcell,newgreatcell]=putinbig6(oldcell,newcell)
%
% oldcell and newcell contain images to put in a single
% coordinate system, and the vector-coordinates of the
% image centers in (x,y).
% oldgreatcell and newgreatcell are the cells of the new large
% frame with a common coorinate system, in each of which
% the single images are embedded. These cells also contain the
% coordinates of the center of the big frames.

%%%%%%%%%%%%%%%%%%%%%%%%%%%%%%%%%%%%%%%%%
%%%%%%%%%%   DECODING THE CELLS INTO THEIR CONSTITUENTS

Zold=oldcell{1,1};          % the 1st (old) image
oldcenterx=oldcell{2,1};    %coordinates of center of old image
oldcentery=oldcell{3,1};

Znew=newcell{1,1};          % the 2nd (new) image
newcenterx=newcell{2,1};
newcentery=newcell{3,1};

%%%%%%%%%%%%%%%%%%%%%%%%%%%%%%%%%%%%%%%%%

[oldrows,oldcols]=size(Zold);
```

```
Lold=oldcenterx-(oldcols-1)/2;      %the  Left side of the old image
Rold=oldcenterx+(oldcols-1)/2;      % the Right side
Dold=oldcentery-(oldrows-1)/2;      % the Down  of the old image
Uold=oldcentery+(oldrows-1)/2;      % the Upper side of the old image

[newrows,newcols]=size(Znew);
Lnew=newcenterx-(newcols-1)/2;      %the Left side of the new (2nd) image
Rnew=newcenterx+(newcols-1)/2;
Dnew=newcentery-(newrows-1)/2;
Unew=newcentery+(newrows-1)/2;

greatL=min([Lold,Lnew]);            %the Left side of the combined-greater image
greatR=max([Rold,Rnew]);
greatD=min([Dold,Dnew]);
greatU=max([Uold,Unew]);
spanx=greatR-greatL+1;
spany=greatU-greatD+1;

greatX=ones(spany,1)*(greatL:greatR);   %the coordinate grid of the combined-greater image
greatY=(greatD:greatU)'*ones(1,spanx);

%%%%%%% PUTTING THE OLD IMAGE IN THE COMBINED GREAT-GRID

[oldLDy,oldLDx]=find ((greatX==Lold) & (greatY==Dold));
[oldLUy,oldLUx]=find ((greatX==Lold) & (greatY==Uold));
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;
Zoldgreat=flipud(Zoldgreat);

%%%%%%%%% PUTTING THE NEW IMAGE IN THE COMBINED GREAT-GRID

[newLDy,newLDx]=find ((greatX==Lnew) & (greatY==Dnew)) ;
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;
Znewgreat=flipud(Znewgreat);

%%%%%%%%%%%%%%%%%%% THE CENTRAL COORDINATE OF THE (WARPED) GREAT-COMBINED IMAGE greatcenterx=(greatR+greatL)/2;
greatcentery=(greatU+greatD)/2;

%%%%%%%%%%%%%%%%%%%%%%%%%%%%%%%%%%%%%%%%%%%%%%%%%%%%%%%%%%%%%%%%%%
```

%%%%%%%%%%%%%%%% PUTTING THE OUTPUT TO CELLS, FOR EASIER TRANSFER

```
oldgreatcell{1,1}=Zoldgreat;
oldgreatcell{2,1}=greatcenterx;
oldgreatcell{3,1}=greatcentery;

newgreatcell{1,1}=Znewgreat;
newgreatcell{2,1}=greatcenterx;
newgreatcell{3,1}=greatcentery;

function [small,smalldelta2]=reducem121(big,bigdelta2,shape);

gs=zeros(5,1);
a=0.4;
gs(3)=a;
gs(2)=0.25;   gs(4)=gs(2);
gs(1)=0.25-a/2; gs(5)=gs(1);

%invsig=1./sqrt(bigdelta2);
invsig2=1./bigdelta2;
weightedbig=big.*invsig2;

blurnominat=conv2(conv2(weightedbig,gs,shape),gs',shape);    %convolution in one line
blurdenomin=conv2(conv2(invsig2,gs,shape),gs',shape);

samples_row=1 : 2 : size(blurnominat,1);     %sample grid in one line
samples_col=1 : 2 : size(blurnominat,2);     %sample grid in one line smallnominat=blurnominat(samples_row,samples_col);    %sampling in one line
smalldenomin=blurdenomin(samples_row,samples_col);    %sampling in one line small=smallnominat./smalldenomin;
```

%%%%%%%%%%%%%%%%%%%%%%%%%%%%%%%%%%%%%%%%%%%%%%%%%%%%%

```
newsig=1./smalldenomin;
%smalldelta2=newsig.^2;
smalldelta2=newsig2;

function [small,smalldelta2]=reducem121_x(big,bigdelta2,shape)

gs=zeros(5,1);
a=0.4;
gs(3)=a;
gs(2)=0.25;   gs(4)=gs(2);
gs(1)=0.25-a/2; gs(5)=gs(1);

%invsig=1./sqrt(bigdelta2);
invsig2=1./bigdelta2;
weightedbig=big.*invsig2;

blurnominat=conv2(weightedbig,gs,shape);    %convolution in one line
blurdenomin=conv2(invsig2,gs,shape);

samples_col=1 : 2 : size(blurnominat,2);     %sample grid in one line smallnominat=blurnominat(:,samples_col);    %sampling in one line
smalldenomin=blurdenomin(:,samples_col);    %sampling in one line
```

```
small=smallnominat./smalldenomin;
%%%%%%%%%%%%%%%%%%%%%%%%%%%%%%%%%%%%%%%%%%%%%% newsig2=1./smalldenomin;
%smalldelta2=newsig.^2;
smalldelta2=newsig2;

function [small,smalldelta2]=reduceml21_x(big,bigdelta2,shape)

gs=zeros(5,1);
a=0.4;
gs(3)=a;
gs(2)=0.25;  gs(4)=gs(2);
gs(1)=0.25-a/2;  gs(5)=gs(1);

%invsig=1./sqrt(bigdelta2);
invsig2=1./bigdelta2;
weightedbig=big.*invsig2;

blurnominat=conv2(weightedbig,gs',shape);    %convolution in one line
blurdenomin=conv2(invsig2,gs',shape);

samples_row=1 : 2 : size(blurnominat,1);     %sample grid in one line smallnominat=blurnominat(samples_row,:);     %sampling in one line
smalldenomin=blurdenomin(samples_row,:);     %sampling in one line small=smallnominat./smalldenomin;

%%%%%%%%%%%%%%%%%%%%%%%%%%%%%%%%%%%%%%%%%%%%%% newsig2=1./smalldenomin;
%smalldelta2=newsig.^2;
smalldelta2=newsig;

function Fethsatur=satursmooth7(X,uppersun,lowersun)

SE=ones(3);
mn=eps;

saturated= uint8(X>uppersun);
maybesatur=uint8(X>lowersun);

s=max(saturated(:));

if s==0
    Fethsatur=ones(size(X));
else
    shulaim=uint8(1);
    oldregion=uint8(saturated);
    %k=0;
    while ~(shulaim==0)
        %k=k+1
        dilsaturated=(dilate(oldregion,SE));
        newregion= (dilsaturated & maybesatur);
        added= newregion & (~(oldregion));
        shulaim=max(added(:));
        oldregion=newregion;
    end
```

```
tmp=ones(size(X));

fact=(1-mn)/(uppersun-(lowersun-1));

for level=lowersun:uppersun,
    badpixels= ((X==level) & newregion);
    badvalue=mn+(uppersun-level)*fact;
    lobeseder=find(badpixels);
    if ~isempty(lobeseder)
        tmp(lobeseder)=badvalue;
    end
end
lobeseder=find(saturated);
tmp(lobeseder)=mn;
Fethsatur=tmp;
end
```

```
function [enhanced,subenhanced,mnval,mxval]=stretchwin5(X,Y,photo,logphoto)

XS=sort(X);
YS=sort(Y);
L=round(XS(2));
R=round(XS(3));
D=round(YS(2));
U=round(YS(3));

%    LD   LU   RU   RD   LD
Xp=[L    L    R    R    L];
Yp=[D    U    U    D    D];

X0=(L+R)/2;
Y0=(D+U)/2;

spanx=size(photo,2);
spany=size(photo,1);

[LD_row,LD_col]=xy2ij_brack([L,D],spany);
[RD_row,RD_col]=xy2ij_brack([R,D],spany);
[LU_row,LU_col]=xy2ij_brack([L,U],spany);
[RU_row,RU_col]=xy2ij_brack([R,U],spany);

stam=flipud(photo);
subarea=stam( LD_row:-1:LU_row , LD_col:RD_col );
mn=min(subarea(:));

lemata=subarea-mn;
```

```
mx=max(lemata(:));
imx8=(2^8)/mx;
subenhanced=uint8(round(lemata*imx8));

mn=min(logphoto(:));
lemata=double(logphoto)-double(mn);
mx=max(lemata(:));
imx8=(2^8)/mx;

stam=flipud(lemata*imx8);

stam( LD_row:-1:LU_row , LD_col:RD_col )=subenhanced;
enhanced=flipud(stam);

mnval=min(subarea(:));
mxval=max(subarea(:));

function
[beseder,xbeseder,ybeseder,valbeseder]=subpts21(oldcell,greatL,greatR,greatD,greatU,goodpts)

%sun=240;
%sun=200;
sun=235;
dark=2;

%%%%%%%%%%%%%%%%%%%%%%%%%%%%%%%%%%%%%%%%
%%%%%%%%%   DECODING THE CELLS INTO THEIR CONSTITUENTS

Zold=oldcell{1,1};          % the 1st (old) image
oldcenterx=oldcell{2,1};    %coordinates of center of old image
oldcentery=oldcell{3,1};

[oldrows,oldcols]=size(Zold);
Lold=oldcenterx-(oldcols-1)/2;    %the  Left side of the old image
Rold=oldcenterx+(oldcols-1)/2;    % the Right side
Dold=oldcentery-(oldrows-1)/2;    % the Down  of the old image
Uold=oldcentery+(oldrows-1)/2;    % the Upper side of the old image spanx=greatR-greatL+1;
spany=greatU-greatD+1;

greatX=ones(spany,1)*(greatL:greatR);     %the coordinate grid of the combined-greater image
greatY=(greatD:greatU)'*ones(1,spanx);

%%%%%%% PUTTING THE OLD IMAGE IN THE COMBINED GREAT-GRID

[oldLDy,oldLDx]=find ((greatX==Lold) & (greatY==Dold));
[oldLUy,oldLUx]=find ((greatX==Lold) & (greatY==Uold));
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);
```

```
Zoldgreat=NaN*zeros(size(greatX));
Zoldgreat( oldLD_row:-1:oldLU_row , oldLD_col:oldRD_col )=Zold;
Zoldgreat=flipud(Zoldgreat);

%%%%%%%%% PUTTING THE NEW IMAGE IN THE COMBINED GREAT-GRID vals=Zoldgreat(goodpts);
LOnan   =(~isnan(vals));
LObright=(vals<sun);
LOdark  =(~(vals<dark));
beseder= ((LOnan & LObright) & LOdark) ;
%beseder= (LOnan) ;
beseder_ind=find(beseder);
besederpts=goodpts(beseder_ind);

x=greatX(besederpts);
y=greatY(besederpts);

xsmall=x-Lold+1;
ysmall=y-Dold+1;

xbeseder=NaN*ones(size(goodpts));
xbeseder(beseder_ind)=xsmall;
ybeseder=NaN*ones(size(goodpts));
ybeseder(beseder_ind)=ysmall;

valbeseder=NaN*ones(size(goodpts));
valbeseder(beseder_ind)=Zoldgreat(besederpts);

%spanx=Rold-Lold+1;
%spany=Uold-Dold+1;

%greatX=ones(spany,1)*(greatL:greatR);      %the coordinate grid of the combined-greater image
%greatY=(greatD:greatU)'*ones(1,spanx);

clear
close all
pack

%load ../decayfun
%clear m delta_m load decay53337pairs
clear ILUTZ C Ynorm sig_m smoothm mnn mxx
%xint m delta_m Ynorm smoothm C ILUTZ sig_m mnn mxx

%%%%%%%%%%%%%%%%%%%%%%%%%%%%%%%%%%%%%%%%%%%%%%%%%%%%%%%% fuzzmarge=45;
transit=80;
uppersun=250;
lowersun=205;
levels_x=2;
levels_y=0;
minlevel=0;
```

125

```
Lshulaim=0;
left=min(xint)+Lshulaim;
right=max(xint);
bottom=170;
roof=355;
imagehight=roof-bottom+1;
SE=ones(3,5);

%%%%%%%%%%%%%%%%%%%%%%%%%%%
cols=right-left+1;
prof=profil2(cols,transit);
inv_prof2=(1./prof).^2;
FETHER2=ones(imagehight,1)*inv_prof2;
%%%%%%%%%%%%%%%%%%%%%%%%%%%%%%%%%%%%%
%%%%%%%%%%%%%%%%%%%%%%%%%%%%%%%%%%%%%
oldlength=length(m);
m=m(1+Lshulaim:oldlength);
delta_m=delta_m(1+Lshulaim:oldlength);
sig=1;
invm=1./m;
invm_square=invm.^2;
invm_four  =invm.^4;
a=(sig.^2).*invm_square;
b=(delta_m.^2).*invm_four;

invM=ones(imagehight,1)*invm;
A=  ones(imagehight,1)*a;
B=  ones(imagehight,1)*b;

load ../coordm110.mat    %%%% LOADING THE COORDINATES basefilename='../gradfilt1_';
postfix='.tif';
basephotoname='photo';
rawname='basicim';
netframes=[1:9 , 11:37];

centerx1=0;   %this is always
centery1=0;   %this is always

%%%%%%%%%%%%%%%%%%%%%%%%%%%%%%%%%%%%%%%%%%%%%%%%%%%%%%%%%%%%%%%%%%
%%%%%%%%%%%%%%%%%%%%%%%%%%%%%%%% MERGING IMAGES IN A BIG FRAME
stam=round(rand(1));
ystep=(2*stam)-1;
if ystep==-1
    frame_inds=36:ystep:2;
elseif ystep==1
    frame_inds=1:ystep:35;
end
%ystep=-1;
%frame_inds=36:ystep:2;
k=1;
for indframe=1:length(frame_inds),
%tic
    yframe_ind=frame_inds(indframe);

if k==1
        yframe1=netframes(yframe_ind);
        sframe1=sprintf('%d',yframe1);
        shem1=[basefilename sframe1 postfix];
```

```
        rawim=imread(shem1);
        basicim=double(flipud(rawim))-1;
        X=basicim(bottom:roof,left:right);
        Ya=X.*invM;
        Fethsatur=satursmooth7(X,uppersun,lowersun);
        IFETHSATUR2=(1./Fethsatur).^2;
        DELTAYa2=(A+ ((X.^2).*B)).*IFETHSATUR2;
        DELTAYa2=DELTAYa2.*FETHER2;

Acell{1,1}=Ya;
        Acell{2,1}=DELTAYa2;
        Acell{3,1}=centerx2(yframe_ind);
        Acell{4,1}=centery2(yframe_ind);
    else
        Acell=fusedcell;
    end yframe2=netframes(yframe_ind + ystep);
    sframe2=sprintf('%d',yframe2);
    shem2=[basefilename sframe2 postfix];
    rawim=imread(shem2);
    basicim=double(flipud(rawim))-1;
    X=basicim(bottom:roof,left:right);
    Yb=X.*invM;
    Fethsatur=satursmooth7(X,uppersun,lowersun);
    IFETHSATUR2=(1./Fethsatur).^2;
    DELTAYb2=(A+ ((X.^2).*B)).*IFETHSATUR2;
    DELTAYb2=DELTAYb2.*FETHER2;

clear rawim basicim X Fethsatur IFETHSATUR2

Bcell{1,1}=Yb;
    Bcell{2,1}=DELTAYb2;
    Bcell{3,1}=centerx2(yframe_ind+ystep);
    Bcell{4,1}=centery2(yframe_ind+ystep);

fusedcell=fuseml22(Acell,Bcell);

k=k+1;
    clear Acell Bcell
%toc
end fused=double(fusedcell{1,1});
deltaz2=fusedcell{2,1};
greatcenterx=fusedcell{3,1};
greatcentery=fusedcell{4,1};

save nfuseupdated fused deltaz2 greatcenterx greatcentery
clear fusedcell clear saturated logfused valint tikunx tikuny invM invm invm_square
clear invm_square dilsaturated flatcurve flatfun centery2 centerx2
clear a b Ya Yb DELTAYb2 DELTAYa2 A B max(fused(:))
```

```
%%%%%%%%%%%%%%%%%%%%%%%%%%%%%%%%%%%%%%%%%%%%%%% load nfuseupdated logfused=log(1+fused);
mx=max(logfused(:));
%imx8=(2^8)/mx;
imx16=(2^16)/mx;
logfused16=uint16(round(logfused*imx16));

histlog=histeq(logfused16,256);

mx=max(histlog(:));
%imx8=(2^8)/double(mx);
imx16=(2^16)/double(mx);
histlog16=uint16(round(double(histlog)*imx16));
[rows,cols]=size(logfused16);
figure(2);
hold off
imagesc(histlog16);
colormap(gray(256)); axis('image','off','xy');
Xwide=cols/1.8; Ywide=round(Xwide*rows/cols);
set(gcf,'position',[55 109 Xwide Ywide]);
set(gca,'position',[0 0 1 1]);
vec=get(gcf,'position');
Ywide=vec(3)*rows/cols;
set(gcf,'position',[1 300 Xwide Ywide]);

% [I,J]=xy2ij_brack(XYcoord,N);
% Converts x-y coordinates to ij coordinates:
%    I is the row-number of the element,
%    J is the column-number ofthe element
%    N is the number of rows in the matrix.

function [I,J]=xy2ij_brack(XYcoord,N);

X=XYcoord(:,1);
Y=XYcoord(:,2);

%index in row-number
I=N-Y+1;

%index in cols
J=X;
%IJcoord=[I,J];
```

SOURCE CODE FOR CREATION OF POLARIZATION MOSAIC

```
clear
close all
pack load fusecompon1

[ROWS,COLS]=size(Lfused);

I0 =reshape(Lfused,ROWS*COLS,1);
I45=reshape(Mfused,ROWS*COLS,1);
I90=reshape(Rfused,ROWS*COLS,1);
F=[I0, I45, I90]';

alfa=[0, 45, 90]'*pi/180;
M=[ones(3,1), cos(2*alfa), sin(2*alfa)];
IM=inv(M);

Param=IM*F;

%%%%%%%%%%%%%%%%%%%%%%
%%%%%% finding the net size
%%%%%%%%%%%%%%
bigC= Param(1,:);
bigC=reshape(bigC,ROWS,COLS);
stamC=sum(double(uint8(bigC)));
a=find(stamC>0);
l=min(a);
r=max(a);

stamC=sum(double(uint8(bigC)),2);
a=find(stamC>0);
d=min(a);
u=max(a);

lfused=Lfused(d:u,l:r);
mfused=Mfused(d:u,l:r);
rfused=Rfused(d:u,l:r);

[rows,cols]=size(lfused);

clear bigC Lfused Mfused Rfused a stamC

%%%%%%%%%%%%%%%%%%%%%%%%%%%%%%%%

I0 =reshape(lfused,rows*cols,1);
I45=reshape(mfused,rows*cols,1);
I90=reshape(rfused,rows*cols,1);
F=[I0, I45, I90]';

alfa=[0, 45, 90]'*pi/180;
M=[ones(3,1), cos(2*alfa), sin(2*alfa)];
IM=inv(M);

Param=IM*F;
```

```
C= Param(1,:);
Ac=Param(2,:);
As=Param(3,:);

clear Param

%%%%%%%%%%%%%%%%%%%%
%%%%%%  A positive, ambiguous theta
%%%%%%%%%%%%%%%%%%%%
Twotheta=atan(As./Ac).*(~(Ac==0))-pi/2*((Ac==0).*(As<0))+pi/2*((Ac==0).*(~(As<0)));
twotheta=Twotheta -((Ac<0).*(As<0)*pi) +((Ac<0).*(~(As<0))*pi) ;
theta=(twotheta/2);
A=sqrt(Ac.^2 + As.^2);
theta=theta*180/pi;

%C=reshape(C,ROWS,COLS);
%A=reshape(A,ROWS,COLS);
%THETA=reshape(theta,ROWS,COLS);
C=reshape(C,rows,cols);
A=reshape(A,rows,cols);
THETA=reshape(theta,rows,cols);

clear Twotheta twotheta theta
%%%%%%%%%%%%%%%%%%%%%%%%%%%%%%%%%%%%%5

ROWS=rows;
COLS=cols;

figure(1);
hold off
imagesc(C);
axis('image','off','xy');
%Xwide=COLS/0.7;
Xwide=COLS/0.9;
Ywide=round(Xwide*ROWS/COLS);
set(gcf,'position',[55 109 Xwide Ywide]);
set(gca,'position',[0 0 1 1]);
vec=get(gcf,'position');
Ywide=vec(3)*ROWS/COLS;
set(gcf,'position',[10 300 Xwide Ywide]);
colormap(gray(256))

AA=(C-A);
b=AA.*(AA>0);

figure(2);
hold off
imagesc(b);
axis('image','off','xy');
%Xwide=COLS/0.7;
Xwide=COLS/0.9;
Ywide=round(Xwide*ROWS/COLS);
set(gcf,'position',[55 109 Xwide Ywide]);
set(gca,'position',[0 0 1 1]);
vec=get(gcf,'position');
Ywide=vec(3)*ROWS/COLS;
set(gcf,'position',[10 300 Xwide Ywide]);
colormap(gray(256))
```

```
figure(3);
hold off
imagesc(A);
axis('image','off','xy');
%Xwide=COLS/0.7;
Xwide=COLS/0.9;
Ywide=round(Xwide*ROWS/COLS);
set(gcf,'position',[55 109 Xwide Ywide]);
set(gca,'position',[0 0 1 1]);
vec=get(gcf,'position');
Ywide=vec(3)*ROWS/COLS;
set(gcf,'position',[10 300 Xwide Ywide]);
colormap(gray(256))

%%%%%%%%%%%%%%%%%%%%%%%%%%%%%%%%%%%%%%%%%%%%%%%%
clear A Ac As C F I0 I45 I90 THETA AA b clear
close all
pack load polarres1

[ROWS,COLS]=size(C);

c=reshape(C,1,ROWS*COLS);
a=reshape(A,1,ROWS*COLS);
ac=[c;a]
boundeda=min(ac);
boundedA=reshape(boundeda,ROWS,COLS);

figure(1);
            hold off
            imagesc(C);

imagesc(A);
            axis('image','off','xy');
            %Xwide=COLS/0.7;
            Xwide=COLS/0.9;
            Ywide=round(Xwide*ROWS/COLS);
            set(gcf,'position',[55 109 Xwide Ywide]);
            set(gca,'position',[0 0 1 1]);
            vec=get(gcf,'position');
            Ywide=vec(3)*ROWS/COLS;
            set(gcf,'position',[10 300 Xwide Ywide]);
    colormap(gray(256))

figure(3+yiter);
            hold off
```

```
            axis('image','off','xy');
            %Xwide=COLS/0.7;
            Xwide=COLS/0.9;
            Ywide=round(Xwide*ROWS/COLS);
            set(gcf,'position',[55 109 Xwide Ywide]);
            set(gca,'position',[0 0 1 1]);
            vec=get(gcf,'position');
            Ywide=vec(3)*ROWS/COLS;
            set(gcf,'position',[10 300 Xwide Ywide]);
    colormap(gray(256))

AA=(C-A);
            b=AA.*(AA>0);
    figure(4+yiter);
            hold off
            imagesc(b);
            axis('image','off','xy');
            %Xwide=COLS/0.7;
            Xwide=COLS/0.9;
            Ywide=round(Xwide*ROWS/COLS);
            set(gcf,'position',[55 109 Xwide Ywide]);
            set(gca,'position',[0 0 1 1]);
            vec=get(gcf,'position');
            Ywide=vec(3)*ROWS/COLS;
            set(gcf,'position',[10 300 Xwide Ywide]);
    colormap(gray(256))

clear
close all
pack load flatparams.mat
clear fused8 xlims ylims cparams

%%%%%%%%%%%%%%%%%%%%%%%%%%%%%%%%%%%%%%%%%%%%%%%%%%%%%
transit=40;
uppersun=250;
lowersun=205;

left=97;
right=600;
bottom=200;
roof=385;
imagehight=roof-bottom+1;
imagewidth=right-left+1;

LeftspaceL=135;
LeftspaceR=185;
RightspaceL=315;
RightspaceR=365;
Leftspacewidth= LeftspaceR-LeftspaceL+1;
Rightspacewidth=RightspaceR-RightspaceL+1;

%%%%%%%%%%%%%%%%%%%%%%%%%%%%%%%%%%
sig=0.5;
invM=flatfun(bottom:roof,left:right);
SIG2=(sig.^2);

cols=right-left+1;
```

```
prof=profil2(cols,transit);
inv_prof2=(1./prof).^2;
FETHER2=ones(imagehight,1)*inv_prof2;
%%%%%%%%%%%%%%%%%%%%%%%%%%%%%%%%%%%%%%%
%%%%%%%%%%%%%%%%%%%%%%%%%%%%%%%%%%%%%%% load coordpoll.mat    %%%% LOADING THE COORDINATES basefilename='stepol_';
postfix='.tif';
basephotoname='photo';
rawname='basicim';
netframes=[1:15];

%%%%%%%%%%%%%%%%%%%%%%%%%%%%%%%%%%%%%%%%%%%%%%%%%%%%%%%%%%%%%%%%%%%%%
%%%%%%%%%%%%%%%%%%%%%%%%%%%%%%% MERGING IMAGES IN A BIG FRAME
stam=1;
ystep=(2*stam)-1;
frame_inds=1:ystep:(length(netframes)-1);
k=1;
for indframe=1:length(frame_inds),
%tic
   yframe_ind=frame_inds(indframe)
   if k==1
       yframe1=netframes(yframe_ind);
       sframe1=sprintf('%d',yframe1);

shem1=[basefilename sframe1 '_1' postfix];
       shem2=[basefilename sframe1 '_2' postfix];
       shem3=[basefilename sframe1 '_3' postfix];

rawim1=imread(shem1);
       rawim2=imread(shem2);
       rawim3=imread(shem3);

rawim=(   double(flipud(rawim1))-1  ) +  ( double(flipud(rawim2))-1  ) + (
double(flipud(rawim3))-1 ) ;
       basicim=(rawim/3);

Za=basicim.*flatfun;
       Za=Za(bottom:roof,left:right);

AL=NaN*ones(size(Za));   AM=NaN*ones(size(Za));   AR=NaN*ones(size(Za));
       DELTAAL2=NaN*ones(size(Za));                            DELTAAM2=NaN*ones(size(Za));
DELTAAR2=NaN*ones(size(Za));

AL(:,1:LeftspaceL-1)=Za(:,1:LeftspaceL-1);
       AM(:,LeftspaceR+1:RightspaceL-1)=Za(:,LeftspaceR+1:RightspaceL-1);
       AR(:,RightspaceR+1:imagewidth)=Za(:,RightspaceR+1:imagewidth);

X=basicim(bottom:roof,left:right);
       Fethsatur=satursmooth7(X,uppersun,lowersun);
       IFETHSATUR2=(1./Fethsatur).^2;
       DELTAZa2=(SIG2*(invM.^2)).*IFETHSATUR2;
%       DELTAYa2=DELTAYa2.*FETHER2;
%       DELTAZa2=(SIG2*(invM.^2)).*(~dilsaturated) + sunerror.*dilsaturated;

DELTAAL2(:,1:LeftspaceL-1)=DELTAZa2(:,1:LeftspaceL-1);
       DELTAAM2(:,LeftspaceR+1:RightspaceL-1)=DELTAZa2(:,LeftspaceR+1:RightspaceL-1);
```

```
      DELTAAR2(:,RightspaceR+1:imagewidth)=DELTAZa2(:,RightspaceR+1:imagewidth);

ALcell{1,1}=AL;
    ALcell{2,1}=DELTAAL2;
    ALcell{3,1}=centerx2(yframe_ind);
    ALcell{4,1}=centery2(yframe_ind);

AMcell=ALcell;
    AMcell{1,1}=AM;
    AMcell{2,1}=DELTAAM2;

ARcell=ALcell;
    ARcell{1,1}=AR;
    ARcell{2,1}=DELTAAR2;

else
    ALcell=Lfusedcell;
    AMcell=Mfusedcell;
    ARcell=Rfusedcell;
  end yframe2=netframes(yframe_ind+ystep);
  sframe1=sprintf('%d',yframe2);

shem1=[basefilename sframe1 '_1' postfix];
  shem2=[basefilename sframe1 '_2' postfix];
  shem3=[basefilename sframe1 '_3' postfix];

rawim1=imread(shem1);
  rawim2=imread(shem2);
  rawim3=imread(shem3);

rawim=(   double(flipud(rawim1))-1   ) + (  double(flipud(rawim2))-1   ) + (
double(flipud(rawim3))-1 ) ;
  basicim=(rawim/3);

Zb=basicim.*flatfun;
  Zb=Zb(bottom:roof,left:right);

BL=NaN*ones(size(Zb));   BM=NaN*ones(size(Zb));   BR=NaN*ones(size(Zb));
  DELTABL2=NaN*ones(size(Zb));  DELTABM2=NaN*ones(size(Zb));  DELTABR2=NaN*ones(size(Zb));

BL(:,1:LeftspaceL-1)=Zb(:,1:LeftspaceL-1);
  BM(:,LeftspaceR+1:RightspaceL-1)=Zb(:,LeftspaceR+1:RightspaceL-1);
  BR(:,RightspaceR+1:imagewidth)=Zb(:,RightspaceR+1:imagewidth);

X=basicim(bottom:roof,left:right);
  Fethsatur=satursmooth7(X,uppersun,lowersun);
  IFETHSATUR2=(1./Fethsatur).^2;
  DELTAZb2=(SIG2*(invM.^2)).*IFETHSATUR2;
%   DELTAZb2=(SIG2*(invM.^2)).*(~dilsaturated) + sunerror.*dilsaturated;
%  DELTAZb2=DELTAZb2.*FETHER2;

DELTABL2(:,1:LeftspaceL-1)=DELTAZb2(:,1:LeftspaceL-1);
  DELTABM2(:,LeftspaceR+1:RightspaceL-1)=DELTAZb2(:,LeftspaceR+1:RightspaceL-1);
  DELTABR2(:,RightspaceR+1:imagewidth)=DELTAZb2(:,RightspaceR+1:imagewidth);

clear rawim basicim Fethsatur IFETHSATUR2
```

```
    BLcell{1,1}=BL;
    BLcell{2,1}=DELTABL2;
    BLcell{3,1}=centerx2(yframe_ind+ystep);
    BLcell{4,1}=centery2(yframe_ind+ystep);

BMcell=BLcell;
    BMcell{1,1}=BM;
    BMcell{2,1}=DELTABM2;

BRcell=BLcell;
    BRcell{1,1}=BR;
    BRcell{2,1}=DELTABR2;

Lfusedcell=fusem122(ALcell,BLcell);
    Mfusedcell=fusem122(AMcell,BMcell);
    Rfusedcell=fusem122(ARcell,BRcell);

k=k+1;
     clear ARcell BRcell AGcell BGcell ABcell BBcell
%toc
end

Lfused=double(Lfusedcell{1,1});
Mfused=double(Mfusedcell{1,1});
Rfused=double(Rfusedcell{1,1});
greatcenterx=Lfusedcell{3,1};
greatcentery=Lfusedcell{4,1};

save fusecompon1 Lfused Mfused Rfused greatcenterx greatcentery
clear Rfusedcell Gfusedcell Bfusedcell clear saturated logfused valint tikunx tikuny invM invm invm_square
clear invm_square dilsaturated flatcurve centery2 centerx2
clear a b Ya Yb DELTAYb2 DELTAYa2 A B FETHER2 AB AG AR BB BG BR
clear basefilename basephotoname greatcenterx  greatcentery  imagehight
clear indframe inv_prof2 k lambda_pos left netframes postfix prof
clear rawname right roof sframe1 sframe2 shem1 shem2 stam transit
clear yframe1 yframe2 yframe_ind ystep
%clear bX CAMERESP invCAMERESP invCAMRESframe X

%%%%%%%%%%%%%%%%%%%%%%%%%%%%%%%%%%%%%%%%%%%%%%%%%%%% yGAMMA=0.5;
load fusecompon1

[ROWS,COLS]=size(Lfused);

fused(1:ROWS,1:COLS,1)=Lfused;
fused(1:ROWS,1:COLS,2)=Mfused;
fused(1:ROWS,1:COLS,3)=Rfused;
mx=max(fused(:));
fused=fused/mx;

oldHSV=rgb2hsv(fused);
luminance=oldHSV(:,:,3);
mn=min(luminance(:));   mx=max(luminance(:));
newlumin=imadjust(luminance,[mn mx],[0 1],yGAMMA);
newHSV=oldHSV;
```

```
newHSV(:,:,3)=newlumin;
newfused=hsv2rgb(newHSV);

mx=max(newfused(:));
newfused=(newfused/mx).*(~(newfused<0));

%%%%%%%%%%%%%%%%%%%%%%%%%%%%%%%%%%%%%5 figure(1);
hold off
imagesc(newfused);
axis('image','off','xy');
%Xwide=COLS/0.7;
Xwide=COLS/0.9;
Ywide=round(Xwide*ROWS/COLS);
set(gcf,'position',[55 109 Xwide Ywide]);
set(gca,'position',[0 0 1 1]);
vec=get(gcf,'position');
Ywide=vec(3)*ROWS/COLS;
set(gcf,'position',[10 300 Xwide Ywide]);

newfused(:,:,1)=flipud(newfused(:,:,1));
newfused(:,:,2)=flipud(newfused(:,:,2));
newfused(:,:,3)=flipud(newfused(:,:,3));
%imwrite(newfused,'rawmosNOccd2.jpg','jpeg','quality',100);

function fusedcell=fusem122(oldcell,newcell)
%
% oldcell and newcell contain images to put in a single
% coordinate system, and the vector-coordinates of the
% image centers in (x,y).
% fusedcell   is the cell of the updated mosaic image
% k  is the number of images already fused
%
% merging='average' - The overlap area is an average of
%        all the images that exist in it, and the program
%        makes all weights be the same.
% merging='avdecay' - The overlap area is the average of the
%        old image or mosaic, withthe new image. So, older
%        images in the old mosaic decay exponentially in time.
% merging='split' - the overlap is cut by half - each side
%        comes from a different image.

%%%%%%%%%%%%%%%%%%%%%%%%%%%%%%%%%%%%%%
%%%%%%%%%   DECODING THE CELLS INTO THEIR CONSTITUENTS

Zold     =oldcell{1,1};      % the 1st (old) image
DELTAZ2old=oldcell{2,1};
oldcenterx=oldcell{3,1};    %coordinates of center of old image
oldcentery=oldcell{4,1};

Znew=newcell{1,1};           % the 2nd (new) image
DELTAZ2new=newcell{2,1};
```

```
newcenterx=newcell{3,1};
newcentery=newcell{4,1};

%%%%%%%%%%%%%%%%%%%%%%%%%%%%%%%%%%%%%%

[oldrows,oldcols]=size(Zold);
Lold=oldcenterx-(oldcols-1)/2 ;     %the  Left side of the old image
Rold=oldcenterx+(oldcols-1)/2 ;     % the Right side
Dold=oldcentery-(oldrows-1)/2 ;     % the Down  of the old image
Uold=oldcentery+(oldrows-1)/2 ;     % the Upper side of the old image

[newrows,newcols]=size(Znew);
Lnew=newcenterx-(newcols-1)/2 ;     %the Left side of the new (2nd) image
Rnew=newcenterx+(newcols-1)/2 ;
Dnew=newcentery-(newrows-1)/2 ;
Unew=newcentery+(newrows-1)/2 ;

greatL=min([Lold,Lnew]);            %the Left side of the combined-greater image
greatR=max([Rold,Rnew]);
greatD=min([Dold,Dnew]);
greatU=max([Uold,Unew]);
spanx=greatR-greatL+1;
spany=greatU-greatD+1;

greatX=ones(spany,1)*(greatL:greatR);   %the coordinate grid of the combined-greater image
greatY=(greatD:greatU)'*ones(1,spanx);

%%%%%%% PUTTING THE OLD IMAGE IN THE COMBINED GREAT-GRID

[oldLDy,oldLDx]=find ((greatX==Lold) & (greatY==Dold)) ;
[oldLUy,oldLUx]=find ((greatX==Lold) & (greatY==Uold)) ;
[oldRDy,oldRDx]=find ((greatX==Rold) & (greatY==Dold)) ;
[oldRUy,oldRUx]=find ((greatX==Rold) & (greatY==Uold)) ;

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;

DELTAZoldgreat=NaN*zeros(size(greatX));
DELTAZoldgreat( oldLD_row:-1:oldLU_row , oldLD_col:oldRD_col )=DELTAZ2old;

%%%%%%%%% PUTTING THE NEW IMAGE IN THE COMBINED GREAT-GRID

[newLDy,newLDx]=find ((greatX==Lnew) & (greatY==Dnew)) ;
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;
```

```
DELTAZnewgreat=NaN*zeros(size(greatX));
DELTAZnewgreat( newLD_row:-1:newLU_row , newLD_col:newRD_col )=DELTAZ2new;

%%%%%%%%%%%%%%%%%%%%%%%%%%%%%%%%%%%%%%%%%%%%%%%%%%%%%%%%%%%%%%%%%%%%%%%
%%%%%%%%%%%% TAKING CARE OF THE OVERLAP AREA nanold=uint8(isnan(Zoldgreat));
nannew=uint8(isnan(Znewgreat));

fused=NaN*zeros(size(greatX));
%fused( newLD_row:-1:newLU_row , newLD_col:newRD_col )=Znew;
%fused( oldLD_row:-1:oldLU_row , oldLD_col:oldRD_col )=Zold;
besdernew=find(~nannew);
fused(besdernew)=Znewgreat(besdernew);
besderold=find(~nanold);
fused(besderold)=Zoldgreat(besderold);

DELTA2fused=NaN*zeros(size(greatX));
%DELTA2fused( newLD_row:-1:newLU_row , newLD_col:newRD_col )=DELTAZ2new;
%DELTA2fused( oldLD_row:-1:oldLU_row , oldLD_col:oldRD_col )=DELTAZ2old;
DELTA2fused(besdernew)=DELTAZnewgreat(besdernew);
DELTA2fused(besderold)=DELTAZoldgreat(besderold);

%Sigmaoldgreat=sqrt(DELTAZoldgreat);
%Sigmanewgreat=sqrt(DELTAZnewgreat);
Sigma2oldgreat=DELTAZoldgreat;
Sigma2newgreat=DELTAZnewgreat;

nangreat= (nanold | nannew);
E=~nangreat;
F=find(E);
if ~isempty(F)
        oldneto=NaN*ones(size(Zoldgreat));
        newneto=NaN*ones(size(Znewgreat));
        oldsigneto=oldneto;
        newsigneto=newneto;

oldneto(F)=Zoldgreat(F);
        newneto(F)=Znewgreat(F);
        oldsig2neto(F)=Sigma2oldgreat(F);
        newsig2neto(F)=Sigma2newgreat(F);

%size(oldneto(F))
        %size(newneto(F))
        %size(oldsig2neto(F)')
        %size(newsig2neto(F)')

nominat= (oldneto(F)./oldsig2neto(F)') + (newneto(F)./newsig2neto(F)') ;
        denomin= (1./oldsig2neto(F)') + (1./newsig2neto(F)');

sig2seam= 1./denomin;

seamvalue=sig2seam.*nominat;
        fused(F)=seamvalue;

%           DELTA2fused(F)=sigseam.^2;
            DELTA2fused(F)=sig2seam;
end
fused=flipud(fused);
```

```
DELTA2fused=flipud(DELTA2fused);

%%%%%%%%%% THE CENTRAL COORDINATE OF THE (WARPED) GREAT-COMBINED IMAGE greatcenterx=(greatR+greatL)/2;
greatcentery=(greatU+greatD)/2;

%%%%%%%%%%%%%%%%%%%%%%%%%%%%%%%%%%%%%%%%%%%%%%%%%%%%%%%%%%%%%%%%%%%
%%%%%%%%%%%%%%%%%% PUTTING THE OUTPUT TO CELLS, FOR EASIER TRANSFER fusedcell{1,1}=fused;
fusedcell{2,1}=DELTA2fused;
fusedcell{3,1}=greatcenterx;
fusedcell{4,1}=greatcentery;

function [small,delta2small]=mizoorml21(big,delta2big,levels,shape);

newA=big;
newdelta2A=delta2big;

for iteration=1:levels,
   [reducedA,reducedelta2A]=reduceml21(newA,newdelta2A,shape);
   newA=reducedA;
   newdelta2A=reducedelta2A;
end small=newA;
delta2small=newdelta2A;
function [small,delta2small]=mizoorml21_xy(big,delta2big,levels_x,levels_y,shape);

newA=big;
newdelta2A=delta2big;

if ~(levels_x==levels_y)
    for iteration=1:min([levels_x,levels_y]),
        [reducedA_x,reducedelta2A_x]=reduceml21_x(newA,newdelta2A,shape);
        [reducedA,reducedelta2A]=reduceml21_y(reducedA_x,reducedelta2A_x,shape);
            newA=reducedA;
        newdelta2A=reducedelta2A;
    end

[a,maindirection]=max([levels_x,levels_y]);
    if maindirection==1     %%% x-direction is the main movement unceratinty
         for iteration=levels_y+1 : levels_x,
            [reducedA,reducedelta2A]=reduceml21_x(newA,newdelta2A,shape);
                newA=reducedA;
            newdelta2A=reducedelta2A;
        end
    else                                       %%% y-direction is the main movement
unceratinty
         for iteration=levels_x+1 : levels_y,
            [reducedA,reducedelta2A]=reduceml21_y(newA,newdelta2A,shape);
                newA=reducedA;
            newdelta2A=reducedelta2A;
        end
```

```
      end
else
   levels=levels_x;
   for iteration=1:levels,
       [reducedA_x,reducedelta2A_x]=reducem121_x(newA,newdelta2A,shape);
       [reducedA,reducedelta2A]=reducem121_y(reducedA_x,reducedelta2A_x,shape);
           newA=reducedA;
       newdelta2A=reducedelta2A;
   end
end small=newA;
delta2small=newdelta2A;

clear
pack levels_x=3;
levels_y=0;
minlevel=0;
yepsilon=eps;

left=97;
right=600;
bottom=200;
roof=385;
imagehight=roof-bottom+1;
imagewidth=right-left+1;

LeftspaceL=135;
LeftspaceR=185;
RightspaceL=315;
RightspaceR=365;
Leftspacewidth= LeftspaceR-LeftspaceL+1;
Rightspacewidth=RightspaceR-RightspaceL+1;

ystep=1;
%centerx2guess=100*ystep;    %initializing the disparity
centerx2guess=115*ystep;     %initializing the disparity
centery2guess=0;

%%%%%%%%%%%%%%%%%%%%%%%%%%%%%%%%%%%%%%%%%%%
%%%%%%%%%%%%%%%%%%%%%%%%%%%%%%%%%%%%%%%%%%% basefilename='stepol_';
postfix='.tif';
basephotoname='photo';
rawname='basicim';
netframes=[1:15];

load flatparams.mat

%%%%%%%%%%%%%%%%%%%%%%%%%%%%%%%%%%%%%%%%%

%spec=maspect2(basefilename,netframes,left,right,bottom,roof);
sig=0.5;
invM=flatfun(bottom:roof,left:right);
```

```
SIG2=(sig.^2);
sun=250;
sunerror=1/eps;
SE=ones(3,5);

%%%%%%%%%%%%%%%%%%%%%%%%%%%%%%%%%%%%%%%%
%h=fspecial('prewitt');

centerx2=zeros(1,length(netframes));
centery2=zeros(1,length(netframes));
tikunx=zeros(1,length(netframes));
tikuny=zeros(1,length(netframes));

frame_inds=1:ystep:(length(netframes)-1);
k=1;
for indframe=1:length(frame_inds-1),
    %%%%%%%%%%%%%%%%%%%%%%%%%%%% READING AND PREPARING THE RAW IMAGES
    yframe_ind=frame_inds(indframe);

tic
    if k==1
        yframe1=netframes(yframe_ind);
        sframe1=sprintf('%d',yframe1);

shem1=[basefilename sframe1 '_1' postfix];
        shem2=[basefilename sframe1 '_2' postfix];
        shem3=[basefilename sframe1 '_3' postfix];

rawim1=imread(shem1);
        rawim2=imread(shem2);
        rawim3=imread(shem3);

rawim=(   double(flipud(rawim1))-1   ) + (   double(flipud(rawim2))-1   ) + (   double(flipud(rawim3))-1 )  ;
        basicim=(rawim/3);

Za=basicim.*flatfun;
        Za=Za(bottom:roof,left:right);

X=basicim(bottom:roof,left:right);
        saturated= (X>sun);
        dilsaturated=double(dilate(saturated,SE));
        DELTAZa2=(SIG2*(invM.^2)).*(~dilsaturated) + sunerror.*dilsaturated;
        DELTAZa2(:,LeftspaceL :LeftspaceR )=sunerror*ones(imagehight,Leftspacewidth );
        DELTAZa2(:,RightspaceL:RightspaceR)=sunerror*ones(imagehight,Rightspacewidth);

centerx1=0; centery1=0;

holdcell{1,1}=Za;
        holdcell{2,1}=DELTAZa2;
        holdcell{3,1}=centerx1;
        holdcell{4,1}=centery1;
        fusedcell=holdcell;
    else
        holdcell=fusedcell;
    end yframe2=netframes(yframe_ind+ystep)
    sframe1=sprintf('%d',yframe2);
```

```
    shem1=[basefilename sframe1 '_1' postfix];
    shem2=[basefilename sframe1 '_2' postfix];
    shem3=[basefilename sframe1 '_3' postfix];

rawim1=imread(shem1);
    rawim2=imread(shem2);
    rawim3=imread(shem3);

rawim=(   double(flipud(rawim1))-1   )   +   (   double(flipud(rawim2))-1   )   +   (
double(flipud(rawim3))-1 )  ;
    basicim=(rawim/3);

Zb=basicim.*flatfun;
    Zb=Zb(bottom:roof,left:right);

X=basicim(bottom:roof,left:right);
    saturated= (X>sun);
    dilsaturated=double(dilate(saturated,SE));
    DELTAZb2=(SIG2*(invM.^2)).*(~dilsaturated) + sunerror.*dilsaturated;
    DELTAZb2(:,LeftspaceL :LeftspaceR )=sunerror*ones(imagehight,Leftspacewidth );
    DELTAZb2(:,RightspaceL:RightspaceR)=sunerror*ones(imagehight,Rightspacewidth);

hnewcell{1,1}=Zb;
    hnewcell{2,1}=DELTAZb2;
    if k==1
      hnewcell{3,1}=centerx2guess;
      hnewcell{4,1}=centery2guess;
    else
      hnewcell{3,1}=centerx2(old_yframe_ind)+centerx2guess;
      hnewcell{4,1}=centery2(old_yframe_ind)+centery2guess;
    end
    newcell=hnewcell;

clear rawim basicim

%%%%%%%%%%%%%%%%%%%%%%%%%%%%%%%%%  DERIVING TRANSLATION BETWEEN IMAGES

[tikunx(yframe_ind+ystep),tikuny(yframe_ind+ystep)]=gmultirem131(holdcell,hnewcell,levels_x,le
vels_y,minlevel); % centerx2(yframe_ind+ystep)=newcell{3,1} + tikunx(yframe_ind+ystep);
  centery2(yframe_ind+ystep)=newcell{4,1} + tikuny(yframe_ind+ystep);

[tikunx(yframe_ind+ystep)   tikuny(yframe_ind+ystep)]

%%%%%%%%%%%%%%%%%%%%%%%%%%%%%%%%%% FUSING THE IMAGES newcell{3,1}=centerx2(yframe_ind+ystep);
  newcell{4,1}=centery2(yframe_ind+ystep);

%%%%%%%%% NEED TO CORRECT THIS WITH THE NEW KIND OF FUSION fusedcell=fusem122(fusedcell,newcell);
  old_yframe_ind=yframe_ind+ystep;
  k=k+1;
toc
```

```
    save yytemp.mat    centerx2 centery2 tikunx tikuny

%pause end
%%%%%%%%%%%%%%%%%%%%%%%%%%%%%%%%%%%%%%%%%%%

%save coordpol2.mat   centerx2 centery2 tikunx tikuny
fused=fusedcell{1,1};
deltaz2=fusedcell{2,1};
greatcenterx=fusedcell{3,1};
greatcentery=fusedcell{4,1};
%save fusedpol1.mat fused deltaz2 greatcenterx greatcentery

%%%%%%%%%%%%%%%%%%%%%%%%%%%%%%%%%%%%%% clear fusedcell image(fused)
colormap(gray(256))
axis image
axis xy
set(gcf,'menubar','figure')

function prof=profil2(cols,transit)

mn=eps^7;
tmp=ones(1,cols);

L=1:transit;
R=cols-L+1;

%tmp(L)=mn+ (1-mn)*(L-1)/(transit-1);
%tmp(R)=mn+ (1-mn)*(L-1)/(transit-1);
tmp(L)=mn+ (1-mn) *  ( 1 - cos(pi*(L-1)/(transit-1))  )/2;
tmp(R)=mn+ (1-mn) *  ( 1 - cos(pi*(L-1)/(transit-1))  )/2;

prof=tmp;

function [oldgreatcell,newgreatcell]=putbigml3(oldcell,newcell)
%
% oldcell and newcell contain images to put in a single
% coordinate system, and the vector-coordinates of the
% image centers in (x,y).
% oldgreatcell and newgreatcell are the cells of the new large
% frame with a common coorinate system, in each of which
% the single images are embedded. These cells also contain the
% coordinates of the center of the big frames.

%%%%%%%%%%%%%%%%%%%%%%%%%%%%%%%%%%%%%%
```

```
%%%%%%%%%   DECODING THE CELLS INTO THEIR CONSTITUENTS

Zold      =oldcell{1,1};      % the 1st (old) image
DELTAZ2old=oldcell{2,1};
oldcenterx=oldcell{3,1};      %coordinates of center of old image
oldcentery=oldcell{4,1};

Znew=newcell{1,1};            % the 2nd (new) image
DELTAZ2new=newcell{2,1};
newcenterx=newcell{3,1};
newcentery=newcell{4,1};

%%%%%%%%%%%%%%%%%%%%%%%%%%%%%%%%%%%%%%%%%

[oldrows,oldcols]=size(Zold);
Lold=oldcenterx-(oldcols-1)/2;     %the  Left side of the old image
Rold=oldcenterx+(oldcols-1)/2;     % the Right side
Dold=oldcentery-(oldrows-1)/2;     % the Down  of the old image
Uold=oldcentery+(oldrows-1)/2;     % the Upper side of the old image

[newrows,newcols]=size(Znew);
Lnew=newcenterx-(newcols-1)/2;     %the Left side of the new (2nd) image
Rnew=newcenterx+(newcols-1)/2;
Dnew=newcentery-(newrows-1)/2;
Unew=newcentery+(newrows-1)/2;

greatL=min([Lold,Lnew]);           %the Left side of the combined-greater image
greatR=max([Rold,Rnew]);
greatD=min([Dold,Dnew]);
greatU=max([Uold,Unew]);
spanx=greatR-greatL+1;
spany=greatU-greatD+1;

greatX=ones(spany,1)*(greatL:greatR);   %the coordinate grid of the combined-greater image
greatY=(greatD:greatU)'*ones(1,spanx);

%%%%%%% PUTTING THE OLD IMAGE IN THE COMBINED GREAT-GRID

[oldLDy,oldLDx]=find ((greatX==Lold) & (greatY==Dold));
[oldLUy,oldLUx]=find ((greatX==Lold) & (greatY==Uold));
[oldRDy,oldRDx]=find ((greatX==Rold) & (greatY==Dold));
[oldRUy,oldRUx]=find ((greatX==Rold) & (greatY==Uold));

[oldLD_row,oldLD_col]=xy2ij_brack([oldLDx,oldLDy],spany);
[oldRD_row,oldRD_col]=xy2ij_brack([oldRDx,oldRDy],spany);
[oldLU_row,oldLU_col]=xy2ij_brack([oldLUx,oldLUy],spany);
[oldRU_row,oldRU_col]=xy2ij_brack([oldRUx,oldRUy],spany);

Zoldgreat=NaN*zeros(size(greatX));
Zoldgreat( oldLD_row:-1:oldLU_row , oldLD_col:oldRD_col )=Zold;
Zoldgreat=flipud(Zoldgreat);

DELTAZoldgreat=NaN*zeros(size(greatX));
DELTAZoldgreat( oldLD_row:-1:oldLU_row , oldLD_col:oldRD_col )=DELTAZ2old;
DELTAZoldgreat=flipud(DELTAZoldgreat);

%%%%%%%%%  PUTTING THE NEW IMAGE IN THE COMBINED GREAT-GRID

[newLDy,newLDx]=find ((greatX==Lnew) & (greatY==Dnew)) ;
```

```
[newLUy,newLUx]=find ((greatX==Lnew) & (greatY==Unew)) ;
[newRDy,newRDx]=find ((greatX==Rnew) & (greatY==Dnew)) ;
[newRUy,newRUx]=find ((greatX==Rnew) & (greatY==Unew)) ;

[newLD_row,newLD_col]=xy2ij_brack([newLDx,newLDy],spany);
[newRD_row,newRD_col]=xy2ij_brack([newRDx,newRDy],spany);
[newLU_row,newLU_col]=xy2ij_brack([newLUx,newLUy],spany);
[newRU_row,newRU_col]=xy2ij_brack([newRUx,newRUy],spany);

Znewgreat=NaN*zeros(size(greatX));
Znewgreat( newLD_row:-1:newLU_row , newLD_col:newRD_col )=Znew;
Znewgreat=flipud(Znewgreat);

DELTAZnewgreat=NaN*zeros(size(greatX));
DELTAZnewgreat( newLD_row:-1:newLU_row , newLD_col:newRD_col )=DELTAZ2new;
DELTAZnewgreat=flipud(DELTAZnewgreat);

%%%%%%%%%%%%%%%%% THE CENTRAL COORDINATE OF THE (WARPED) GREAT-COMBINED IMAGE greatcenterx=(greatR+greatL)/2;
greatcentery=(greatU+greatD)/2;

%%%%%%%%%%%%%%%%%%%%%%%%%%%%%%%%%%%%%%%%%%%%%%%%%%%%%%%%%%%%%%
%%%%%%%%%%%%%%%%% PUTTING THE OUTPUT TO CELLS, FOR EASIER TRANSFER oldgreatcell{1,1}=Zoldgreat;
oldgreatcell{2,1}=DELTAZoldgreat;
oldgreatcell{3,1}=greatcenterx;
oldgreatcell{4,1}=greatcentery;

newgreatcell{1,1}=Znewgreat;
newgreatcell{2,1}=DELTAZnewgreat;
newgreatcell{3,1}=greatcenterx;
newgreatcell{4,1}=greatcentery;

function [small,smalldelta2]=reducem121(big,bigdelta2,shape);

gs=zeros(5,1);
a=0.4;
gs(3)=a;
gs(2)=0.25;  gs(4)=gs(2);
gs(1)=0.25-a/2; gs(5)=gs(1);

%invsig=1./sqrt(bigdelta2);
invsig2=1./bigdelta2;
weightedbig=big.*invsig2;

blurnominat=conv2(conv2(weightedbig,gs,shape),gs',shape);    %convolution in one line
blurdenomin=conv2(conv2(invsig2,gs,shape),gs',shape);

samples_row=1 : 2 : size(blurnominat,1);     %sample grid in one line
samples_col=1 : 2 : size(blurnominat,2);     %sample grid in one line smallnominat=blurnominat(samples_row,samples_col);    %sampling in one line
smalldenomin=blurdenomin(samples_row,samples_col);    %sampling in one line small=smallnominat./smalldenomin;

%%%%%%%%%%%%%%%%%%%%%%%%%%%%%%%%%%%%%%%%%%%%%%%%%%%%%
```

```
newsig=1./smalldenomin;
%smalldelta2=newsig.^2;
smalldelta2=newsig2;

function [small,smalldelta2]=reducem121_x(big,bigdelta2,shape)

gs=zeros(5,1);
a=0.4;
gs(3)=a;
gs(2)=0.25;   gs(4)=gs(2);
gs(1)=0.25-a/2; gs(5)=gs(1);

%invsig=1./sqrt(bigdelta2);
invsig2=1./bigdelta2;
weightedbig=big.*invsig2;

blurnominat=conv2(weightedbig,gs,shape);     %convolution in one line
blurdenomin=conv2(invsig2,gs,shape);

samples_col=1 : 2 : size(blurnominat,2);     %sample grid in one line smallnominat=blurnominat(:,samples_col);     %sampling in one line
smalldenomin=blurdenomin(:,samples_col);     %sampling in one line small=smallnominat./smalldenomin;
%%%%%%%%%%%%%%%%%%%%%%%%%%%%%%%%%%%%%%%%%%%% newsig2=1./smalldenomin;
%smalldelta2=newsig.^2;
smalldelta2=newsig2;

function [small,smalldelta2]=reducem121_x(big,bigdelta2,shape)

gs=zeros(5,1);
a=0.4;
gs(3)=a;
gs(2)=0.25;   gs(4)=gs(2);
gs(1)=0.25-a/2; gs(5)=gs(1);

%invsig=1./sqrt(bigdelta2);
invsig2=1./bigdelta2;
weightedbig=big.*invsig2;

blurnominat=conv2(weightedbig,gs',shape);    %convolution in one line
blurdenomin=conv2(invsig2,gs',shape);

samples_row=1 : 2 : size(blurnominat,1);     %sample grid in one line smallnominat=blurnominat(samples_row,:);     %sampling in one line
smalldenomin=blurdenomin(samples_row,:);     %sampling in one line small=smallnominat./smalldenomin;

%%%%%%%%%%%%%%%%%%%%%%%%%%%%%%%%%%%%%%%%%%%% newsig2=1./smalldenomin;
%smalldelta2=newsig.^2;
smalldelta2=newsig;
```

```
function Fethsatur=satursmooth7(X,uppersun,lowersun)

SE=ones(3);
mn=eps;

saturated= uint8(X>uppersun);
maybesatur=uint8(X>lowersun);

s=max(saturated(:));

if s==0
    Fethsatur=ones(size(X));
else
    shulaim=uint8(1);
    oldregion=uint8(saturated);
    %k=0;
    while ~(shulaim==0)
        %k=k+1
        dilsaturated=(dilate(oldregion,SE));
        newregion= (dilsaturated & maybesatur);
        added= newregion & (~(oldregion));
        shulaim=max(added(:));
        oldregion=newregion;
    end tmp=ones(size(X));

fact=(1-mn)/(uppersun-(lowersun-1));

for level=lowersun:uppersun,
        badpixels= ((X==level) & newregion);
        badvalue=mn+(uppersun-level)*fact;
        lobeseder=find(badpixels);
        if ~isempty(lobeseder)
            tmp(lobeseder)=badvalue;
        end
    end
    lobeseder=find(saturated);
    tmp(lobeseder)=mn;
    Fethsatur=tmp;
end
```

```
function [enhanced,subenhanced,mnval,mxval]=stretchwin5(X,Y,photo,logphoto)

XS=sort(X);
YS=sort(Y);
L=round(XS(2));
```

```
R=round(XS(3));
D=round(YS(2));
U=round(YS(3));

%       LD      LU      RU      RD      LD
Xp=[L           L       R       R       L];
Yp=[D           U       U       D       D];

X0=(L+R)/2;
Y0=(D+U)/2;

spanx=size(photo,2);
spany=size(photo,1);

[LD_row,LD_col]=xy2ij_brack([L,D],spany);
[RD_row,RD_col]=xy2ij_brack([R,D],spany);
[LU_row,LU_col]=xy2ij_brack([L,U],spany);
[RU_row,RU_col]=xy2ij_brack([R,U],spany);

stam=flipud(photo);
subarea=stam( LD_row:-1:LU_row , LD_col:RD_col );
mn=min(subarea(:));

lemata=subarea-mn;
mx=max(lemata(:));
imx8=(2^8)/mx;
subenhanced=uint8(round(lemata*imx8));

mn=min(logphoto(:));
lemata=double(logphoto)-double(mn);
mx=max(lemata(:));
imx8=(2^8)/mx;

stam=flipud(lemata*imx8);

stam( LD_row:-1:LU_row , LD_col:RD_col )=subenhanced;
enhanced=flipud(stam);

mnval=min(subarea(:));
mxval=max(subarea(:));

% [I,J]=xy2ij_brack(XYcoord,N);
% Converts x-y coordinates to ij coordinates:
%   I is the row-number of the element,
%   J is the column-number ofthe element
%   N is the number of rows in the matrix.

function [I,J]=xy2ij_brack(XYcoord,N);

%XYcoord

X=XYcoord(:,1);
Y=XYcoord(:,2);
```

```
%index in row-number
I=N-Y+1;

%index in cols
J=X;
%IJcoord=[I,J];
```

We claim:

1. A method for imaging, comprising:

a first step of using an imager to perform a first set of measurements for generating a first image value, the first set of measurements including at least one measurement of an intensity of a first radiation ray bundle from a first scene region, the first radiation ray bundle having a first chief ray in a reference frame of the imager, the imager having a first intensity sensitivity characteristic with respect to radiation ray bundles having the first chief ray, and the imager having a first dynamic range with respect to intensities of the radiation ray bundles having the first chief ray;

a second step of using the imager to perform a set of second measurements for generating a second image value, the second set of measurements comprising at least one measurement of an intensity of a second radiation ray bundle emanating from the first scene region, the second radiation ray bundle having a second chief ray in the reference frame of the imager, the second chief ray being different from the first chief ray, the imager having a second intensity sensitivity characteristic with respect to radiation ray bundles having the second chief ray, the second intensity sensitivity characteristic being different from the first intensity sensitivity characteristic, and the imager having a second dynamic range with respect to intensities of the radiation ray bundles having the second chief ray; and applying a mosaicing operation to the first and second image values, for generating a third image value having associated therewith a third dynamic range of the imager with respect to at least one of the intensities of the first and second radiation ray bundles, the third dynamic range being greater than at least one of the first and second dynamic ranges of the imager.

2. A method according to claim 1, wherein the first radiation ray bundle comprises a first electromagnetic radiation ray bundle, the second radiation ray bundle comprising a second electromagnetic radiation ray bundle.

3. A method according to claim 1, further comprising one of:

rotating the imager with respect to the first scene region between the first and second steps; and translating the imager with respect to the first scene region between the first and second steps.

4. A method according to claim 1, further comprising calibrating the imager, the calibrating step comprising:

using the imager to perform measurements of intensities of a first plurality of radiation ray bundles having the first chief ray, for generating a first set of calibration measurement values;

determining a first estimate of the first intensity sensitivity characteristic by determining one of: a) a sum of the first set of calibration measurement values, and b) a mean of the first set of calibration measurement values;

using the imager to perform measurements of intensities of a second plurality of radiation ray bundles having the second chief ray, for generating a second set of calibration measurement values; and determining a second estimate of the second intensity sensitivity characteristic by determining one of: a) a sum of the second set of calibration measurement values, and b) a mean of the second set of calibration measurement values.

5. A method according to claim 1, further comprising calibrating the imager the calibrating step comprising:

using the imager to perform a third set of measurements for generating a fourth image value, the third set of measurements comprising at least one measurement of an intensity of a third radiation ray bundle, the third radiation ray bundle emanating from a second scene region and having the first chief ray;

using the imager to perform a fourth set of measurements for generating a fifth image value, the fourth set of measurements comprising at least one measurement of an intensity of a fourth radiation ray bundle, the fourth radiation ray bundle emanating from the second scene region and having the second chief ray; and estimating a relationship between the first and second intensity sensitivity characteristics, the estimating step comprising determining one of: a) a difference of the fourth and fifth image values, and b) a ratio of the fourth and fifth image values.

6. A method according to claim 1, further comprising:

using the imager to perform a third set of measurements for generating a fourth image value, the third set of measurements comprising at least one measurement of an intensity of at least one selected spectral component of a third radiation ray bundle, the third radiation ray bundle emanating from the first scene region and having a third chief ray in the reference frame of the imager, the imager having a first spectral sensitivity characteristic with respect to radiation ray bundles having the third chief ray, the first spectral sensitivity characteristic comprising a bandpass characteristic having a first wavelength sensitivity band, and the at least one selected spectral component of the third radiation ray bundle having a wavelength within the first wavelength sensitivity band; and using the imager to perform a fourth set of measurements for generating a fifth image value, the fourth set of measurements comprising at least one measurement of an intensity of at least one selected spectral component of a fourth radiation ray bundle, the fourth radiation ray bundle emanating from the first scene region and having a fourth chief ray in the reference frame of the imager, the fourth chief ray being different from the third chief ray, the imager having a second spectral sensitivity characteristic with respect to radiation ray bundles having the fourth chief ray, the second spectral sensitivity characteristic comprising a bandpass characteristic having a second wavelength sensitivity band, the at least one selected spectral component of the fourth radiation ray bundle having a wavelength within the second wavelength sensitivity band, and the second wavelength sensitivity band being different from the first wavelength sensitivity band.

7. A method according to claim 1, further comprising:

using the imager to perform a third set of measurements for generating a fourth image value, the third set of measurements comprising at least one measurement of an intensity of a third radiation ray bundle emanating from the first scene region, the third radiation ray bundle having a third chief ray in the reference frame of the imager, and the imager having a first focal characteristic with respect to radiation ray bundles having the third chief ray, the first focal characteristic comprising a first focal distance; and using the imager to perform a fourth set of measurements for generating a fifth image value, the fourth set of measurements comprising at least one measurement of an intensity of a fourth radiation ray bundle emanating from the first scene region, the fourth radiation ray bundle having a fourth chief ray in the reference frame of the imager, the fourth chief ray being different from the third chief ray, the imager having a second focal characteristic with respect to radiation ray bundles having the fourth chief ray, the second focal characteristic comprising a second focal distance, and the second focal distance being different from the first focal distance.

8. An apparatus for imaging, comprising:
a first imager for performing a first set of measurements for generating a first image value, the first set of measurements comprising at least one measurement of an intensity of a first radiation ray bundle emanating from a first scene region, the first radiation ray bundle having a first chief ray in a reference frame of the imager, the imager having a first intensity sensitivity characteristic with respect to radiation ray bundles having the first chief ray, the imager having a first dynamic range with respect to intensities of the radiation ray bundles having the first chief ray;
a second imager for performing a second set of measurements for generating a second image value, the second set of measurements comprising at least one measurement of an intensity of a second radiation ray bundle emanating from the first scene region, the second radiation ray bundle having a second chief ray in the reference frame of the imager, the second chief ray being different from the first chief ray, the imager having a second intensity sensitivity characteristic with respect to radiation ray bundles having the second chief ray, the second intensity sensitivity characteristic being different from the first intensity sensitivity characteristic, the imager having a second dynamic range with respect to intensities of the radiation signal sets having the second chief ray; and
a processor for applying a mosaicing operation to the first and second measurement values, for generating a third image value having associated therewith a third dynamic range with respect to at least one of the intensities of the first and second radiation ray bundles, the third dynamic range being greater than at least one of the first and second dynamic ranges.

9. An apparatus according to claim 8, wherein the first radiation ray bundle comprises a first electromagnetic radiation ray bundle, the second radiation ray bundle comprising a second electromagnetic radiation ray bundle.

10. An apparatus according to claim 8, wherein the second imager is the first imager, the first set of measurements being performed no later than a first time, the second set of measurements being performed no earlier than a second time, the second time being later than the first time, and the apparatus further comprising one of:
an arrangement for rotating the first imager with respect to the first and second scene regions between the first and second times; and
an arrangement for translating the first imager with respect to the first and second scene regions between the first and second times.

11. An apparatus according to claim 8, further comprising:
a processor for using the imager to measure intensities of a first plurality of radiation ray bundles having the first chief ray, for generating a first set of calibration measurement values;
a processor for determining a first estimate of the first intensity sensitivity characteristic, comprising one of: a) a processor for determining a sum of the first set of calibration measurement values, and b) a processor for determining a mean of the first set of calibration measurement values;
a processor for using the imager to measure intensities of a second plurality of radiation ray bundles having the second chief ray, for generating a second set of calibration measurement values; and
a processor for determining a second estimate of the second intensity sensitivity characteristic, comprising one of: a) a processor for determining a sum of the second set of calibration measurement values, and b) a processor for determining a mean of the second set of calibration measurement values.

12. An apparatus according to claim 8, further comprising:
a third imager for performing a third set of measurements for generating a fourth image value, the third set of measurements comprising at least one measurement of an intensity of a third radiation ray bundle emanating from a second scene region, and the third radiation ray bundle having the first chief ray;
a fourth imager for performing a fourth set of measurements for generating a fifth image value, the fourth set of measurements comprising at least one measurement of an intensity of a fourth radiation ray bundle emanating from the second scene region, the fourth radiation ray bundle having the second chief ray; and
a processor for estimating a relationship between the first and second intensity sensitivity characteristics, comprising one of: a) a processor for determining a difference of the fourth and fifth image values, and b) a processor for determining a ratio of the fourth and fifth image values.

13. An apparatus according to claim 8, further comprising:
a third imager for performing a set of third measurements for generating a fourth image value, the third measurement set comprising at least one measurement of an intensity of at least one selected spectral component of a third radiation ray bundle emanating from the first scene region, the third radiation ray bundle having a third chief ray in the reference frame of the imager, the imager having a first spectral sensitivity characteristic with respect to radiation ray bundles having the third chief ray, the first spectral sensitivity characteristic comprising a bandpass characteristic having a first wavelength sensitivity band, the at least one selected spectral component of the third radiation ray bundle having a wavelength within the first wavelength sensitivity band;
a fourth imager for performing a fourth set of measurements for generating a fifth image value, the fourth set of measurements comprising at least one measurement of an intensity of at least one selected spectral component of a fourth radiation ray bundle emanating from the first scene region, the fourth radiation ray bundle having a fourth chief ray in the reference frame of the imager, the fourth chief ray being different from the third chief ray, the imager having a second spectral sensitivity characteristic with respect to radiation ray bundles having the fourth chief ray, the second spectral sensitivity characteristic comprising a bandpass characteristic having a second wavelength sensitivity band, the at least one selected spectral component of the fourth radiation ray bundle having a wavelength within the second wavelength sensitivity band, and the second wavelength sensitivity band being different from the first wavelength sensitivity band.

14. An apparatus according to claim 11, further comprising:

a third imager for performing a third set of measurements for generating a fourth image value, the third set of measurements comprising at least one measurement of an intensity of a third radiation ray bundle emanating from the first scene region, the third radiation ray bundle having a third chief ray in the reference frame of the imager, and the imager having a first focal characteristic with respect to radiation ray bundles having the third chief ray, the first focal characteristic comprising a first focal distance;

a fourth imager for performing a fourth set of measurements for generating a fifth image value, the fourth set of measurements comprising at least one measurement of an intensity of a fourth radiation ray bundle emanating from the first scene region, the fourth radiation ray bundle having a fourth chief ray in the reference frame of the imager, the fourth chief ray being different from the third chief ray, the imager having a second focal characteristic with respect to radiation ray bundles having the fourth chief ray, the second focal characteristic comprising a second focal distance, and the second focal distance being different from the first focal distance.

* * * * *